United States Patent
Yamamoto et al.

(10) Patent No.: US 8,911,644 B2
(45) Date of Patent: Dec. 16, 2014

(54) OPTICALLY ISOTROPIC LIQUID CRYSTAL MEDIUM AND OPTICAL DEVICE

(75) Inventors: Shin-Ichi Yamamoto, Chiba (JP); Takafumi Kuninobu, Chiba (JP); Koki Sago, Chiba (JP); Yasuhiro Haseba, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/823,746

(22) PCT Filed: Sep. 5, 2011

(86) PCT No.: PCT/JP2011/070100
§ 371 (c)(1),
(2), (4) Date: Mar. 15, 2013

(87) PCT Pub. No.: WO2012/043145
PCT Pub. Date: Apr. 5, 2012

(65) Prior Publication Data
US 2013/0278849 A1    Oct. 24, 2013

(30) Foreign Application Priority Data

Sep. 27, 2010  (JP) .................................. 2010-215366

(51) Int. Cl.
| | | |
|---|---|---|
| C09K 19/34 | (2006.01) | |
| C09K 19/30 | (2006.01) | |
| C09K 19/12 | (2006.01) | |
| C09K 19/02 | (2006.01) | |
| G02F 1/1334 | (2006.01) | |
| G02F 1/1343 | (2006.01) | |
| C09K 19/04 | (2006.01) | |
| G02F 1/137 | (2006.01) | |

(52) U.S. Cl.
CPC .......... *C09K 19/3402* (2013.01); *G02F 1/1334* (2013.01); *G02F 1/1343* (2013.01); *C09K 2019/0466* (2013.01); *C09K 2019/3422* (2013.01); *G02F 2001/13793* (2013.01); *G02F 2201/124* (2013.01)
USPC ............ 252/299.61; 252/299.63; 252/299.66; 349/177; 349/186; 428/1.1

(58) Field of Classification Search
USPC ............... 252/299.01, 299.6, 299.61, 299.63, 252/299.66; 428/1.1; 349/177, 186
See application file for complete search history.

(56) References Cited

U.S. PATENT DOCUMENTS

| | | | | |
|---|---|---|---|---|
| 7,722,783 | B2 * | 5/2010 | Haseba et al. ........... | 252/299.01 |
| 7,846,514 | B2 * | 12/2010 | Shimada ........................ | 428/1.1 |
| 2011/0001089 | A1 | 1/2011 | Wittek et al. | |

FOREIGN PATENT DOCUMENTS

| | | |
|---|---|---|
| JP | 2959526 | 10/1999 |
| JP | 2003-327966 | 11/2003 |
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| WO | 98/23561 | 6/1998 |
| WO | 2005/080529 | 9/2005 |
| WO | 2005/090520 | 9/2005 |
| WO | 2006/063662 | 6/2006 |
| WO | 2008/090780 | 7/2008 |
| WO | 2009/103495 | 8/2009 |
| WO | 2010/058681 | 5/2010 |

OTHER PUBLICATIONS

Kikuchi et al., "Polymer-stabilized liquid crystal blue phases," Nature Materials, Sep. 2, 2002, pp. 64-68, vol. 1.
Hisakado et al., "Large Electro-optic Kerr Effect in Polymer-stabilized Liquid-Crystalline Blue Phases," Advanced Materials, Jan. 6, 2005, pp. 96-98, vol. 17, No. 1.
Haseba et al, "Electro-optic effects of the optically isotropic state induced by the incorporative effects of a polymer network and the chirality of liquid crystal," Journal of the SID, Jun. 2006, pp. 551-556, vol. 14/6.
"International Search Report (Form PCT/ISA/210)", published on Oct. 4, 2011, with English translation thereof, p. 1-p. 4.

* cited by examiner

*Primary Examiner* — Geraldina Visconti
(74) *Attorney, Agent, or Firm* — Jianq Chyun IP Office

(57) ABSTRACT

A liquid crystal medium having stability to heat, light and so forth, a wide temperature range of a liquid crystal phase, a large refractive index anisotropy and a large dielectric anisotropy and an optically isotropic liquid crystal phase is described. A liquid crystal composition is characterized by exhibiting the optically isotropic liquid crystal phase and containing achiral component T containing at least one compound selected from the group of compounds represented by formula (1) as a first component, and a chiral agent:

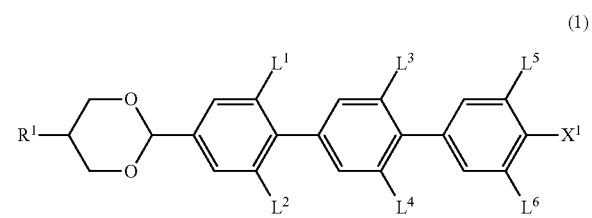

(1)

wherein, for example, $R^1$ is alkyl having 1 to 20 carbons, $L^1$, $L^2$, $L^3$, $L^4$, $L^5$ and $L^6$ are independently hydrogen or fluorine, and $X^1$ is halogen.

37 Claims, 1 Drawing Sheet

Optical System for Measurement
(Use of comb electrode cell)

OPTICALLY ISOTROPIC LIQUID CRYSTAL MEDIUM AND OPTICAL DEVICE

CROSS-REFERENCE TO RELATED APPLICATION

This application is a 371 of international application of PCT application serial no. PCT/JP2011/070100, filed on Sep. 5, 2011, which claims the priority benefit of Japan application no. 2010-215366, filed on Sep. 27, 2010. The entirety of each of the above-mentioned patent applications is hereby incorporated by reference herein and made a part of this specification.

TECHNICAL FIELD

The present invention relates to a liquid crystal medium useful as a material for an optical device. More specifically, the invention relates to a liquid crystal medium having a wide temperature range of a liquid crystal phase, and a large dielectric anisotropy and refractive index anisotropy. In addition, the invention relates to an optical device using the liquid crystal medium. More specifically, the invention relates to a liquid crystal medium that can be used in a wide temperature range and allows low voltage driving, and can achieve a high-speed electro-optic response.

BACKGROUND ART

A liquid crystal display device using a liquid crystal composition is widely utilized for a display of a watch, a calculator, a word processor or the like. The liquid crystal display devices utilize refractive index anisotropy, dielectric anisotropy or the like of a liquid crystal compound. As an operating mode in the liquid crystal display device, a mode mainly using at least one polarizing plate to display an image is known, such as a phase change (PC), twisted nematic (TN), super twisted nematic (STN), bistable twisted nematic (BTN), electrically controlled birefringence (ECB), optically compensated bend (OCB), in-plane switching (IPS), or vertical alignment (VA) mode. Furthermore, a research has been recently conducted actively into a mode for exhibiting electric birefringence by applying an electric field in an optically isotropic liquid crystal phase (Patent literature Nos. 1 to 16, Non-patent literature Nos. 1 to 3).

Furthermore, a proposal has been made for a wavelength variable filter, a wavefront control device, a liquid crystal lens, an aberration correction device, an aperture control device, an optical head device, or the like utilizing electric birefringence in a blue phase as one of the isotropic liquid crystal phases (Patent literature Nos. 10 to 12).

A classification based on a driving mode in the device includes a passive matrix (PM) and an active matrix (AM). The passive matrix (PM) is further classified into static, multiplex and so forth, and the AM is further classified into a thin film transistor (TFT), a metal insulator metal (MIM) and so forth.

The liquid crystal display devices include a liquid crystal composition having suitable physical properties. In order to improve characteristics of the liquid crystal display device, the liquid crystal composition preferably has suitable physical properties. General physical properties necessary for the liquid crystal compound as a component of the liquid crystal composition are as described below:

(1) being chemically stable and physically stable;
(2) having a high clearing point (clearing point: phase transition temperature between a liquid crystal phase and an isotropic phase);
(3) having a low minimum temperature of the liquid crystal phase (a nematic phase, a cholesteric phase, a smectic phase, an optically isotropic phase such a blue phase, or the like);
(4) having an excellent compatibility with other liquid crystal compounds;
(5) having a dielectric anisotropy of a suitable magnitude; and
(6) having a refractive index anisotropy of a suitable magnitude.

In particular, from a viewpoint of reducing a driving voltage, a liquid crystal compound having both a large dielectric anisotropy and a large refractive index anisotropy is preferred in the optically isotropic liquid crystal phase.

If a liquid crystal compound containing a liquid crystal compound being chemically and physically stable as described in property (1) is used in the liquid crystal display device, a voltage holding ratio can be increased.

According to a liquid crystal composition containing a liquid crystal compound having the high clearing point or the low minimum temperature of the liquid crystal phase as described in properties (2) and (3), a temperature range of the nematic phase or the optically isotropic liquid crystal phase can be extended, and the liquid crystal composition can be used in the form of a display device in a wide temperature range. In order to exhibit characteristics that are difficult to be achieved by a single compound, the liquid crystal compound is generally used in the form of a liquid crystal composition prepared by mixing the compound with many other liquid crystal compounds. Accordingly, the liquid crystal compound to be used in the liquid crystal device preferably has the good compatibility with other liquid crystal compounds as described in property (4). In particular, a liquid crystal display device having a higher display performance in characteristics such as contrast, display capacity and response time, has been recently required. Furthermore, a liquid crystal composition having a low driving voltage is required for a liquid crystal material to be used. Moreover, a liquid crystal compound having the large dielectric anisotropy and refractive index anisotropy is preferably used in order to drive at a low voltage the optical device to be driven in the optically isotropic liquid crystal phase.

The liquid crystal composition in which the compound of the invention is used is described in Patent literature Nos. 15 and 16. However, the liquid crystal composition described in Patent literature Nos. 15 and 16 includes nematic liquid crystals, and no optically isotropic liquid crystals are described therein.

On the other hand, an optically isotropic liquid crystal composition containing a compound represented by general formula (1) according to the invention has a feature of being driven at a low voltage. A composition further containing a compound represented by general formula (2) or (3) in addition to the compound represented by general formula (1) is also driven at a low voltage.

CITATION LIST

Patent Literature

Patent literature No. 1: JP 2003-327966 A.
Patent literature No. 2: WO 2005/90520 A.
Patent literature No. 3: JP 2005-336477 A.
Patent literature No. 4: JP 2006-89622 A.
Patent literature No. 5: JP 2006-299084 A.

Patent literature No. 6: JP 2006-506477 A.
Patent literature No. 7: JP 2006-506515 A.
Patent literature No. 8: WO 2006/063662 A.
Patent literature No. 9: JP 2006-225655 A.
Patent literature No. 10: JP 2005-157109 A.
Patent literature No. 11: WO 2005/80529 A.
Patent literature No. 12: JP 2006-127707 A.
Patent literature No. 13: WO 1998/023561 A.
Patent literature No. 14: WO 2010/058681 A.
Patent literature No. 15: JP 2959526 B.
Patent literature No. 16: WO 2009-103495 A.

Non-Patent Literature

Non-patent literature No. 1: Nature Materials, 1, 64 (2002).
Non-patent literature No. 2: Adv. Mater., 17, 96 (2005).
Non-patent literature No. 3: Journal of the SID, 14, 551 (2006).

SUMMARY OF INVENTION

Technical Problem

A first object of the invention is to provide a liquid crystal medium that has an optically isotropic liquid crystal phase, and has stability to heat, light and so forth, a large liquid crystal phase temperature range, a large refractive index anisotropy, and a large dielectric anisotropy. A second object is to provide various optical devices that include the liquid crystal medium, and can be used in a wide temperature range, and have a short response time, a large contrast and a low driving voltage.

Solution to Problem

The invention provides a liquid crystal medium (a liquid crystal composition or a polymer/liquid crystal composite) and an optical device containing the liquid crystal medium, or the like.

The invention also provides a mixture, containing the liquid crystal composition and a polymerizable monomer.

The invention further provides a polymer/liquid crystal composite material, obtained by polymerizing the mixture, and used for a device to be driven in an optically isotropic liquid crystal phase.

The invention still further provides an optical device having a liquid crystal medium arranged between substrates with an electrode arranged on one face or on both faces, and an electric field applying means for applying an electric field to the liquid crystal medium through the electrode, wherein the liquid crystal medium is the liquid crystal composition or the polymer/liquid crystal composite material.

Item 1. A liquid crystal composition that exhibits an optically isotropic liquid crystal phase and contains achiral component T containing at least one compound selected from the group of compounds represented by formula (1) as a first component, and a chiral agent:

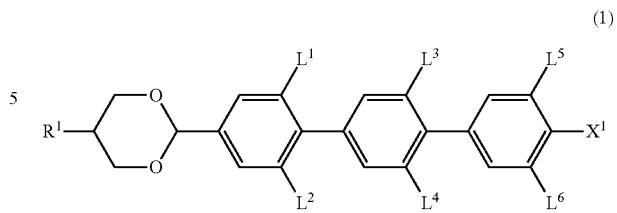

(1)

wherein $R^1$ is hydrogen or alkyl having 1 to 20 carbons, arbitrary —$CH_2$— in the alkyl may be replaced by —O—, —S—, —COO—, —OCO—, —CH=CH—, —CF=CF— or —C≡C—, and arbitrary hydrogen in the alkyl or in a group obtained by replacing arbitrary —$CH_2$— in the alkyl by —O—, —S—, —COO—, —OCO—, —CH=CH—, —CF=CF— or —C≡C— may be replaced by halogen; $L^1$, $L^2$, $L^3$, $L^4$, $L^5$ and $L^6$ are independently hydrogen or fluorine; $X^1$ is hydrogen, halogen, —$SF_5$ or alkyl having 1 to 10 carbons, arbitrary —$CH_2$— in the alkyl may be replaced by —O—, —S—, —CH=CH— or —C≡C—, and hydrogen in the alkyl or in a group obtained by replacing arbitrary —$CH_2$— in the alkyl by —O—, —S—, —COO—, —OCO—, —CH=CH—, —CF=CF— or —C≡C— may be replaced by fluorine.

Item 2. The liquid crystal composition according to item 1, wherein the first component is at least one compound selected from the group of compounds represented by formula (1-1) to formula (1-3):

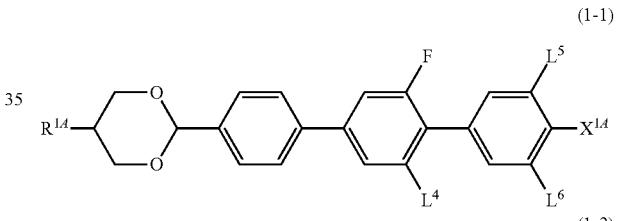

(1-1)

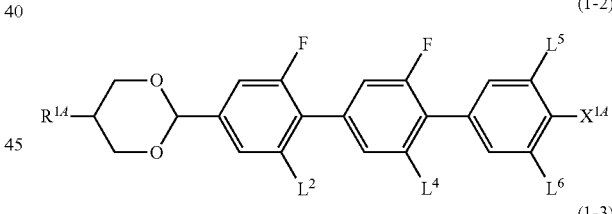

(1-2)

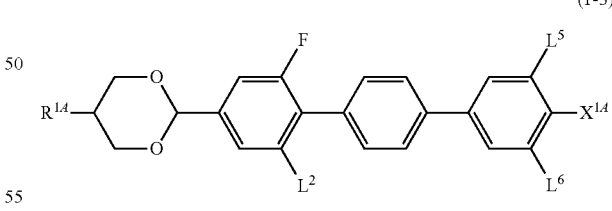

(1-3)

wherein $R^{14}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $L^2$, $L^4$, $L^5$ and $L^6$ are independently hydrogen or fluorine; and $X^{14}$ is fluorine, chlorine, —$CF_3$ or —$OCF_3$.

Item 3. The liquid crystal composition according to item 2, wherein the first component is at least one compound selected from the group of compounds represented by formula (1-2).

Item 4. The liquid crystal composition according to item 1, wherein the first component is at least one compound selected from the group of compounds represented by formulas (1-1-1), (1-1-2), (1-2-1) to (1-2-4), (1-3-1) and (1-3-2):

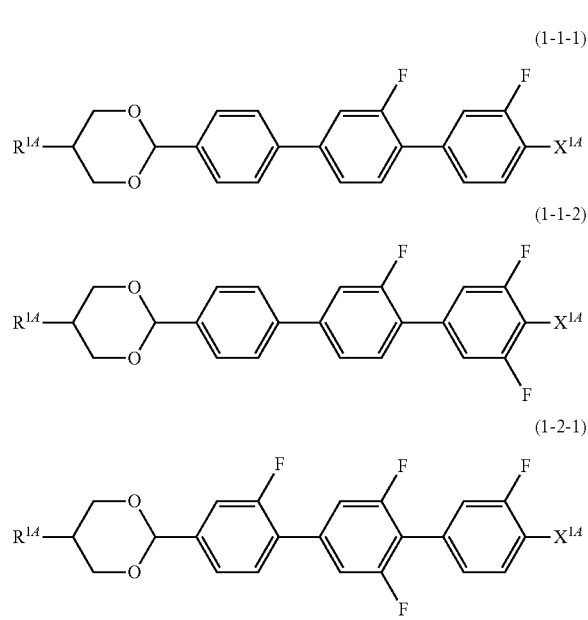

(1-1-1)
(1-1-2)
(1-2-1)

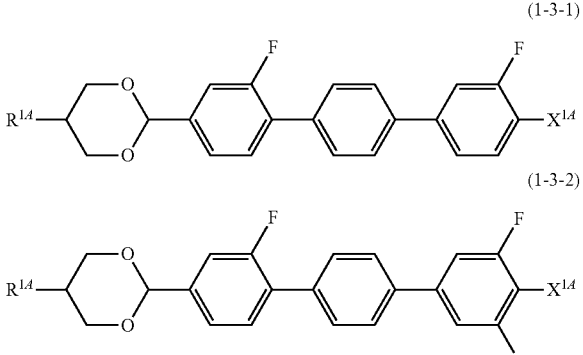

(1-3-1)
(1-3-2)

wherein $R^{14}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; and $X^{14}$ is fluorine, chlorine or —$OCF_3$.

Item 5. The liquid crystal composition according to any one of items 1 to 4, wherein a ratio of the first component is in the range of 0.5% by weight to 50% by weight based on the total weight of achiral component T.

Item 6. The liquid crystal composition according to any one of items 1 to 5, further containing at least one compound selected from the group of compounds represented by formula (2) as a second component:

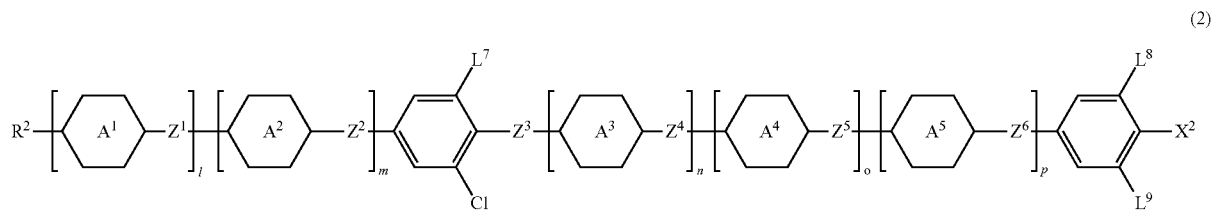

(2)

-continued

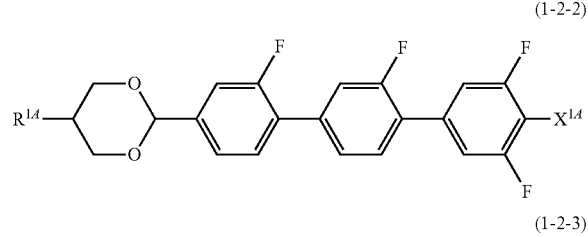

(1-2-2)

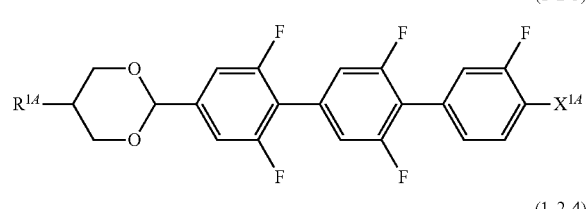

(1-2-3)

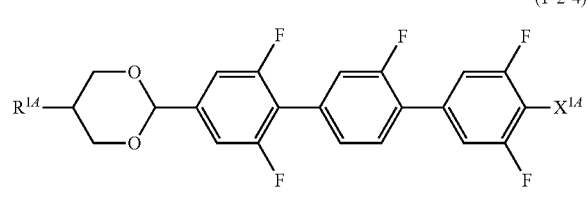

(1-2-4)

wherein $R^2$ is hydrogen or alkyl having 1 to 20 carbons, arbitrary —$CH_2$— in the alkyl may be replaced by —O—, —S—, —COO—, —OCO—, —CH=CH—, —CF=CF— or —C≡C—, and arbitrary hydrogen in the alkyl and in a group obtained by replacing arbitrary —$CH_2$— in the alkyl by —O—, —S—, —COO—, —OCO—, —CH=CH—, —CF=CF— or —C≡C— may be replaced by halogen; ring $A^1$, ring $A^2$, ring $A^3$, ring $A^4$ and ring $A^5$ are independently 1,4-cyclohexylene, 1,3-dioxane-2,5-diyl, 1,4-phenylene, 1,4-phenylene in which one or two of hydrogen is replaced by fluorine, 1,4-phenylene in which two of hydrogen is replaced by fluorine and chlorine, respectively, pyridine-2,5-diyl or pyrimidine-2,5-diyl; $Z^1$, $Z^2$, $Z^3$, $Z^4$, $Z^5$ and $Z^6$ are independently a single bond or alkylene having 1 to 4 carbons, and arbitrary —$CH_2$— in the alkylene may be replaced by —O—, —COO— or —$CF_2$O—; $L^7$, $L^8$ and $L^9$ are independently hydrogen or fluorine; $X^2$ is fluorine, chlorine, —$CF_3$ or —$OCF_3$; and l, m, n, o and p are independently 0 or 1, and satisfy an expression: $2 \le l+m+n+o+p \le 3$.

Item 7. The liquid crystal composition according to item 6, wherein the second component is at least one compound selected from the group of compounds represented by formulas (2-1-1-2), (2-1-2-1), (2-1-3-1), (2-1-3-2), (2-1-4-2) and (2-1-4-3):

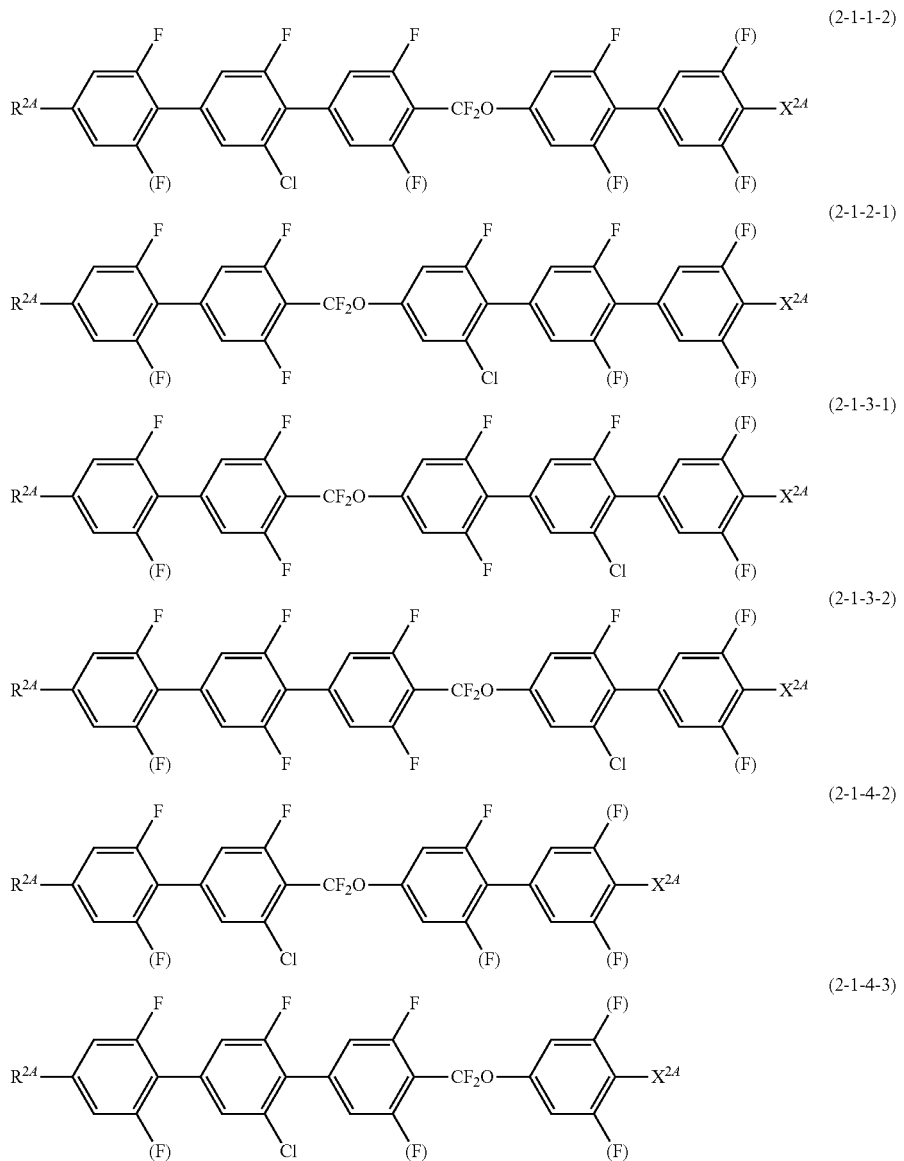

wherein $R^{2A}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; (F) is independently hydrogen or fluorine; and $X^{2A}$ is fluorine, chlorine, —$CF_3$ or —$OCF_3$.

Item 8. The liquid crystal composition according to item 7, wherein the second component is at least one compound selected from the group of compounds represented by formula (2-1-1-2).

Item 9. The liquid crystal composition according to item 7, wherein the second component is at least one compound selected from the group of compounds represented by formula (2-1-4-3).

Item 10. The liquid crystal composition according to item 7, wherein the second component is a mixture of at least one compound selected from the group of compounds represented by formula (2-1-1-2) and at least one compound selected from the group of compounds represented by formula (2-1-4-3).

Item 11. The liquid crystal composition according to any one of items 6 to 10, wherein a ratio of the second component is in the range of 5% by weight to 70% by weight based on the total weight of achiral component T.

Item 12. The liquid crystal composition according to any one of items 1 to 11, further containing at least one compound selected from the group of compounds represented by formula (3) as a third component:

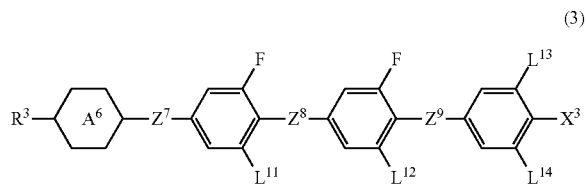

wherein, in formula (3), $R^3$ is hydrogen or alkyl having 1 to 20 carbons, arbitrary —$CH_2$— in the alkyl may be replaced by —O—, —S—, —COO—, —OCO—, —CH=CH—, —CF=CF— or —C≡C—, and arbitrary hydrogen in the alkyl and in a group obtained by replacing arbitrary —$CH_2$— in the alkyl by —O—, —S—, —COO—, —OCO—, —CH=CH—, —CF=CF— or —C≡C— may be replaced by halogen; ring $A^6$ is 1,4-phenylene in which at least one of hydrogen is replaced by fluorine, or 1,3-dioxane-2,5-diyl; $Z^7$, $Z^8$ and $Z^9$ are independently a single bond, —COO— or —$CF_2O$—, but at least one of $Z^7$, $Z^8$ and $Z^9$ is —$CF_2O$—; $L^{11}$, $L^{12}$, $L^{13}$ and $L^{14}$ are independently hydrogen or fluorine; $X^3$ is hydrogen, halogen, —$SF_5$ or alkyl having 1 to 10 carbons, arbitrary —$CH_2$— in the alkyl may be replaced by —O—, —S—, —CH=CH— or —C≡C—, and arbitrary hydrogen in the alkyl and in a group obtained by replacing arbitrary —$CH_2$— in the alkyl by —O—, —S—, —COO—, —OCO—, —CH=CH—, —CF=CF— or —C≡C— may be replaced by fluorine.

Item 13. The liquid crystal composition according to item 12, wherein the third component is at least one compound selected from the group of compounds represented by formula (3-2) to formula (3-5):

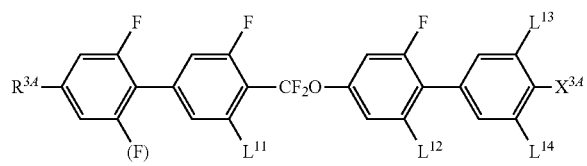
(3-2)

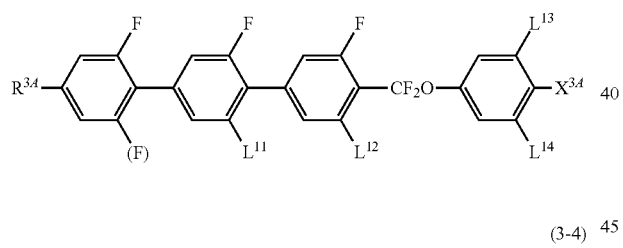
(3-3)

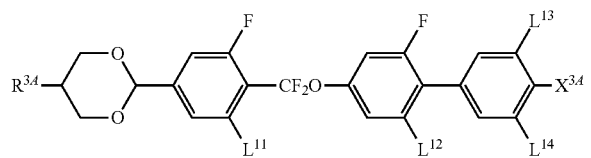
(3-4)

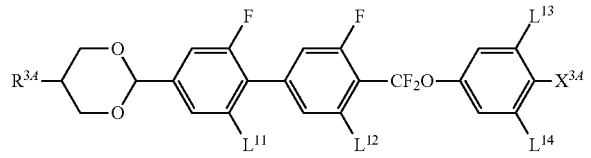
(3-5)

wherein $R^{3A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^{3A}$ is fluorine, chlorine, —$CF_3$ or —$OCF_3$, and $L^{11}$ to $L^{14}$ are independently hydrogen or fluorine.

Item 14. The liquid crystal composition according to item 13, wherein the third component is at least one compound selected from the group of compounds represented by formula (3-2).

Item 15. The liquid crystal composition according to item 13, wherein the third component is at least one compound selected from the group of compounds represented by formula (3-3).

Item 16. The liquid crystal composition according to item 13, wherein the third component is at least one compound selected from the group of compounds represented by formula (3-4).

Item 17. The liquid crystal composition according to item 13, wherein the third component is at least one compound selected from the group of compounds represented by formula (3-5).

Item 18. The liquid crystal composition according to any one of items 12 to 17, wherein a ratio of the third component is in the range of 5% by weight to 70% by weight based on the total weight of achiral component T.

Item 19. The liquid crystal composition according to any one of items 12 to 18, wherein a ratio of the first component is in the range of 1% by weight to 30% by weight, a ratio of the second component is in the range of 10% by weight to 50% by weight, and a ratio of the third component is in the range of 10% by weight to 50% by weight, based on the total weight of achiral component T.

Item 20. The liquid crystal composition according to any one of items 1 to 19, further containing at least one compound selected from the group of compounds represented by formula (4) as a fourth component:

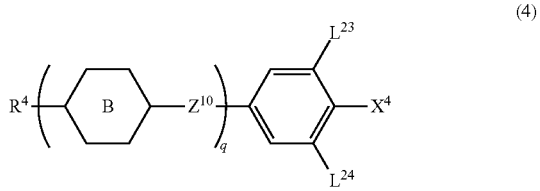
(4)

wherein $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{10}$ is independently a single bond, ethylene, —COO—, —OCO—, —$CF_2O$— or —$OCF_2$—; $L^{23}$ and $L^{24}$ are independently hydrogen or fluorine; $X^4$ is fluorine, chlorine, —$CF_3$ or —$OCF_3$; q is 1, 2, 3 or 4, however, when q is 3 or 4, one of $Z^{10}$ is —$CF_2O$— or —$OCF_2$—; and when q is 3, ring B is not 1,3-dioxane-2,5-diyl, and all of ring B is not fluorine-substituted 1,4-phenylene.

Item 21. The liquid crystal composition according to item 20, wherein the fourth component is at least one compound selected from the group of compounds represented by formula (4-1) to formula (4-9):

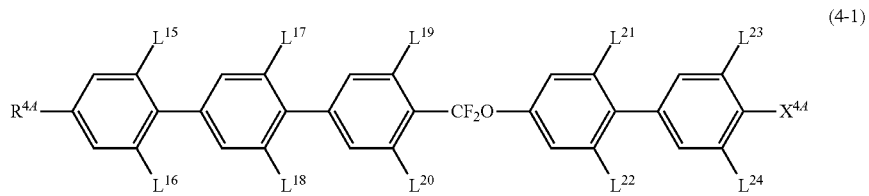
(4-1)
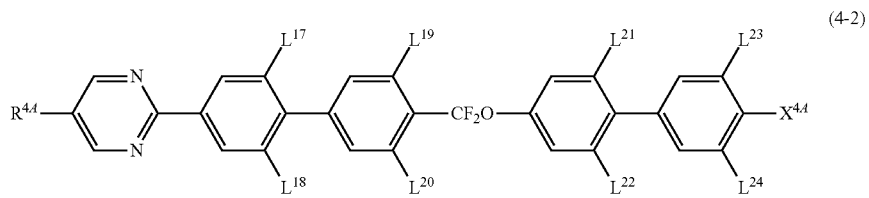
(4-2)
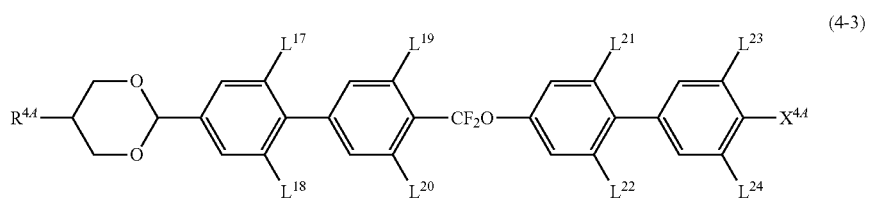
(4-3)
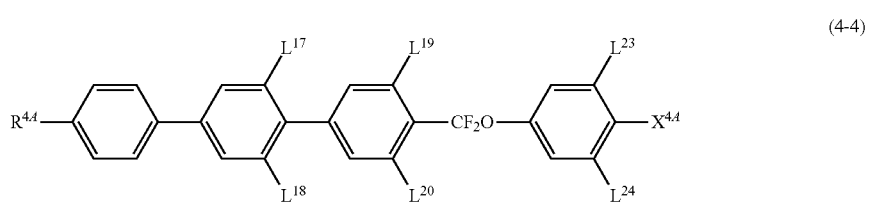
(4-4)
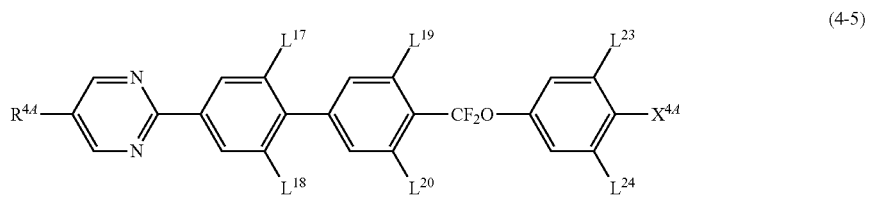
(4-5)
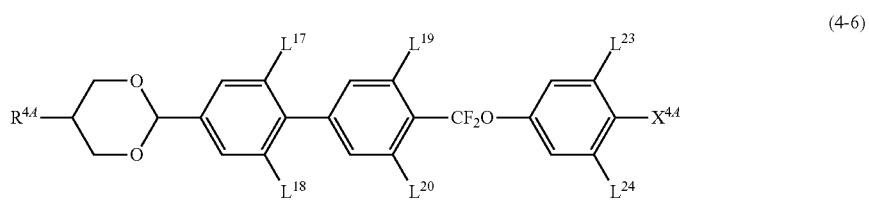
(4-6)
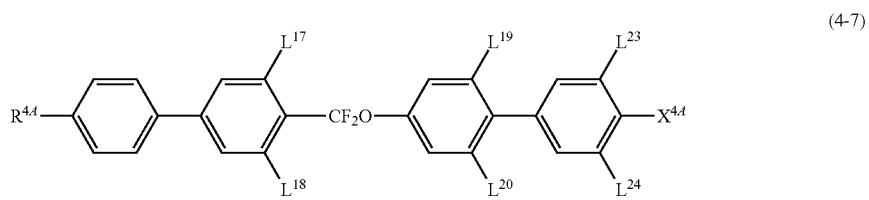
(4-7)
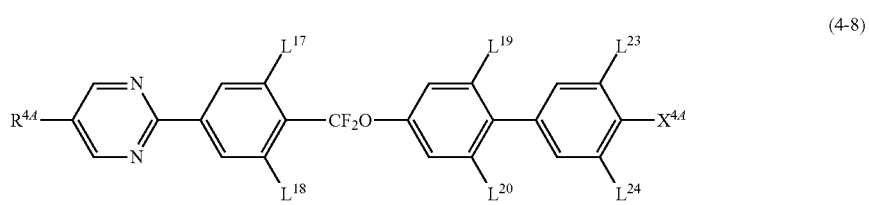
(4-8)

-continued

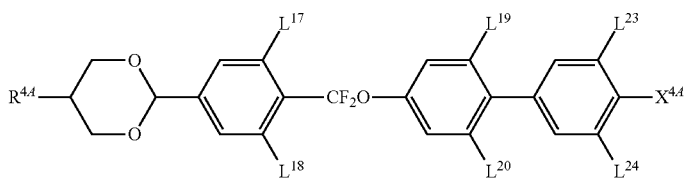

(4-9)

wherein $R^{4A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^{4A}$ is fluorine, chlorine, —$CF_3$ or —$OCF_3$, and $L^{15}$ to $L^{24}$ are independently hydrogen or fluorine.

Item 22. The liquid crystal composition according to any one of items 1 to 21, further containing at least one compound selected from the group of compounds represented by formula (5) as a fifth component:

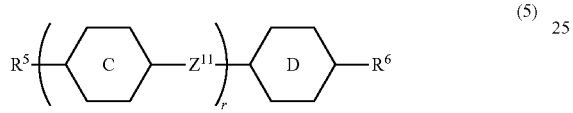

(5)

wherein $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; $Z^{11}$ is independently a single bond, ethylene, —COO— or —OCO—; and r is 1, 2 or 3.

Item 23. The liquid crystal composition according to item 22, wherein the fifth component is at least one compound selected from the group of compounds represented by formula (5-1) to formula (5-13):

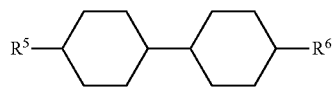

(5-1)

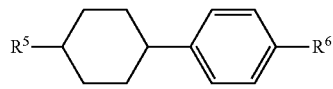

(5-2)

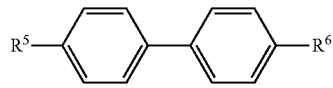

(5-3)

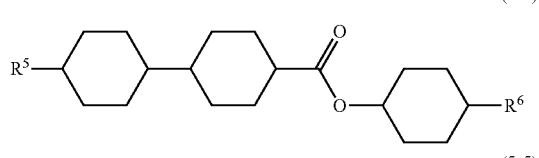

(5-4)

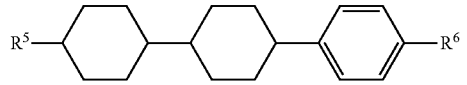

(5-5)

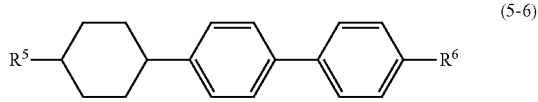

(5-6)

(5-7)

(5-8)

(5-9)

(5-10)

(5-11)

(5-12)

(5-13)

wherein $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 24. The liquid crystal composition according to item 23, wherein the fifth component is at least one compound selected from the group of compounds represented by formula (5-3).

Item 25. The liquid crystal composition according to item 23, wherein the fifth component is at least one compound selected from the group of compounds represented by formula (5-8).

Item 26. The liquid crystal composition according to item 23, wherein the fifth component is at least one compound selected from the group of compounds represented by formula (5-13).

Item 27. The liquid crystal composition according to any one of items 22 to 26, wherein a ratio of the fifth component is in the range of 1% by weight to 20% by weight based on the total weight of the liquid crystal composition.

Item 28. The liquid crystal composition according to any one of items 1 to 27, wherein the chiral agent contains at least one compound selected from the group of compounds represented by each of formula (K1) to formula (K5):

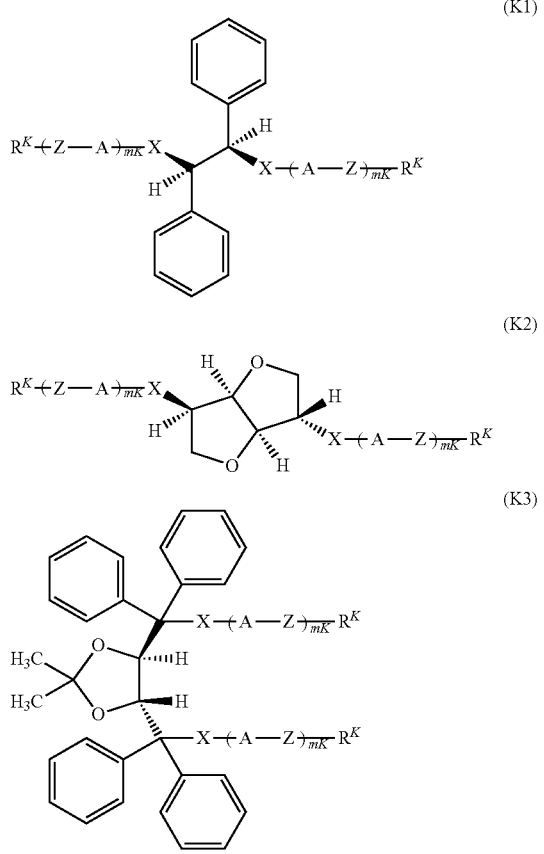

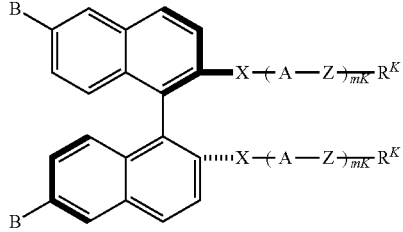

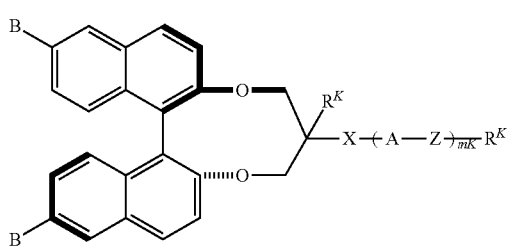

wherein $R^K$ is independently hydrogen, halogen, —C≡N, —N═C═O, —N═C═S or alkyl having 1 to 20 carbons, arbitrary —CH$_2$— in the alkyl may be replaced by —O—, —S—, —COO— or —OCO—, arbitrary —CH$_2$—CH$_2$— in the alkyl may be replaced by —CH═CH—, —CF═CF— or —C≡C—, and arbitrary hydrogen in the alkyl may be replaced by halogen; A is independently an aromatic or non-aromatic three-membered to eight-membered ring, or a condensed ring having 9 or more carbons, arbitrary hydrogen in the rings may be replaced by halogen, alkyl or haloalkyl each having 1 to 3 carbons, —CH$_2$— of the ring may be replaced by —O—, —S— or —NH—, and —CH═ may be replaced by —N═; B is independently hydrogen, halogen, alkyl having 1 to 3 carbons, haloalkyl having 1 to 3 carbons, an aromatic or non-aromatic three-membered to eight-membered ring or a condensed ring having 9 or more carbons, arbitrary hydrogen of the rings may be replaced by halogen, alkyl or haloalkyl each having 1 to 3 carbons, —CH$_2$— may be replaced by —O—, —S— or —NH—, and —CH═ may be replaced by —N═; Z is independently a single bond or alkylene having 1 to 8 carbons, but arbitrary —CH$_2$— may be replaced by —O—, —S—, —COO—, —OCO—, —CSO—, —OCS—, —N═N—, —CH═N— or —N═CH—, arbitrary —CH$_2$—CH$_2$— in the alkyl may be replaced by —CH═CH—, —CF═CF— or —C≡C—, and arbitrary hydrogen may be replaced by halogen; X is a single bond, —COO—, —OCO—, —CH$_2$O—, —OCH$_2$—, —CF$_2$O—, —OCF$_2$— or —CH$_2$CH$_2$—; and mK is an integer from 1 to 4.

Item 29. The liquid crystal composition according to item 28, wherein the chiral agent contains at least one compound selected from the group of compounds represented by each of formulas (K4-1) to (K4-6) and (K5-1) to (K5-3):

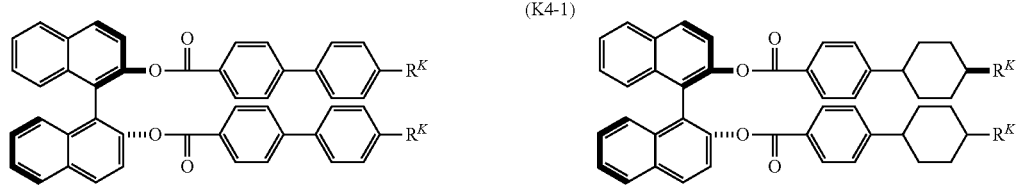

-continued

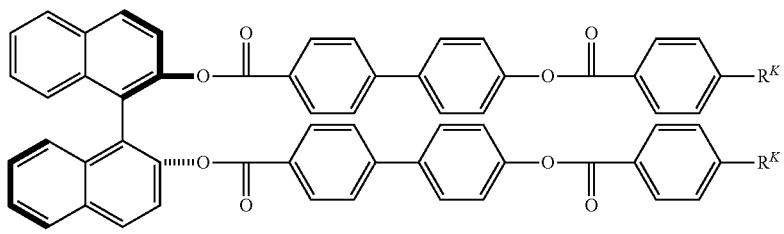
(K4-3)

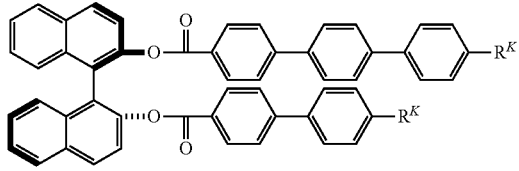
(K4-4)

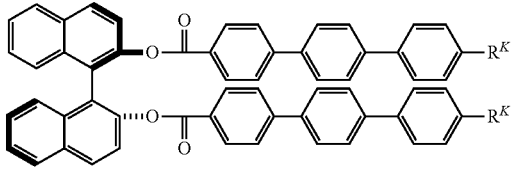
(K4-5)

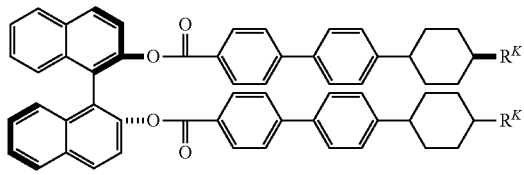
(K4-6)

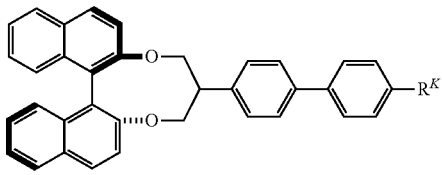
(K5-1)

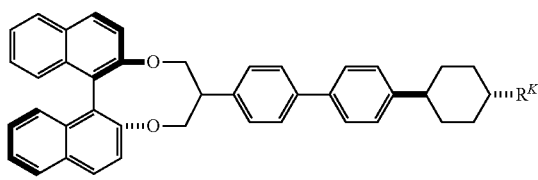
(K5-2)

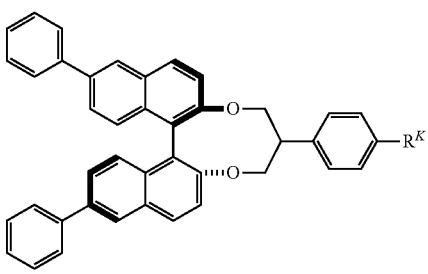
(K5-3)

wherein $R^K$ is independently alkyl having 3 to 10 carbons, alkylic —$CH_2$— adjacent to a ring may be replaced by —O—, and arbitrary —$CH_2$— in the alkyl or in a group obtained by replacing arbitrary alkylic —$CH_2$— adjacent to the ring by —O— may be replaced by —CH=CH—.

Item 30. The liquid crystal composition according to any one of items 1 to 29, wherein a ratio of the chiral agent is in the range of 1% by weight to 40% by weight based on the total weight of the liquid crystal composition.

Item 31. The liquid crystal composition according to any one of items 1 to 30, showing a chiral nematic phase in any one of temperatures from 70 to −20° C., wherein a helical pitch is 700 nanometers or less at least in part of the temperature ranges.

Item 32. The liquid crystal composition according to any one of items 1 to 31, containing at least one antioxidant and/or ultraviolet light absorber.

Item 33. A mixture, containing the liquid crystal composition according to any one of items 1 to 32 and a polymerizable monomer.

Item 34. A polymer/liquid crystal composite material, obtained by polymerizing the mixture according to item 33, and used in a device to be driven in an optically isotropic liquid crystal phase.

Item 35. The polymer/liquid crystal composite material according to item 34, obtained by polymerizing the mixture according to item 33 in a non-liquid crystal isotropic phase or an optically isotropic liquid crystal phase.

Item 36. An optical device having a substrate with an electrode arranged on one face or on both faces of the substrate, a liquid crystal medium arranged between the substrates, and an electric field applying means for applying an electric field to the liquid crystal medium through the electrode, wherein the liquid crystal medium is the liquid crystal composition according to any one of items 1 to 32 or the polymer/liquid crystal composite material according to item 34 or 35.

Item 37. An optical device having a set of substrates, at least one of which is transparent, with an electrode arranged on one face or on both faces thereof, a liquid crystal medium arranged between the substrates, a polarizing plate arranged outside the substrate, and an electric field applying means for applying an electric field to the liquid crystal medium through the electrode, wherein the liquid crystal medium is the liquid crystal composition according to any one of items 1 to 32 or the polymer/liquid crystal composite material according to item 34 or 35.

Item 38. The optical device according to item 36 or 37, wherein the electrodes are constituted so as to allow application of an electric field at least in two directions at least on one substrate of a set of substrates.

Item 39. The optical device according to item 36 or 37, wherein the electrodes are constituted so as to allow application of an electric field at least in two directions on one substrate or both substrates of a set of substrates arranged in parallel to each other.

Item 40. The optical device according to any one of items 36 to 39, wherein the electrodes are arranged in a matrix to constitute pixel electrodes, each pixel has an active device, and the active device is a thin film transistor (TFT).

In the invention, a liquid crystal compound represents a compound having a mesogen, and is not limited to a compound having a liquid crystal phase. The liquid crystal medium is a generic term for the liquid crystal composition and the polymer/liquid crystal composite. Moreover, the optical device means various kinds of devices that perform a function of optical modulation, optical switching or the like by utilizing an electro-optic effect. Specific examples include an optical modulator used for a display device (liquid crystal display device), an optical communication system, optical information processing and various kinds of sensor systems. With regard to optical modulation that utilizes a change of a refractive index by applying voltage to an optically isotropic liquid crystal medium, a Kerr effect is known. The Kerr effect means a phenomenon in which a value of electric birefringence $\Delta n(E)$ is proportional to a square of electric field E, and an equation: $\Delta n(E)=K\lambda E^2$ is satisfied in a material showing the Kerr effect (K: Kerr coefficient (Kerr constant), $\lambda$: wavelength). Herein, the value of electric birefringence means a value of refractive index anisotropy induced when the electric field is applied to an isotropic medium.

Usage of terms herein is as described below. The liquid crystal compound is a generic term for a compound having the liquid crystal phase such as a nematic phase and a smectic phase, and a compound having no liquid crystal phase but being useful as a component of the liquid crystal composition. The chiral agent is an optically active compound, and added for the purpose of providing the liquid crystal composition with a desired twisted alignment of molecules. The liquid crystal display device is a generic term for a liquid crystal display panel and a liquid crystal display module. The liquid crystal compound, the liquid crystal composition and the liquid crystal display device may be occasionally abbreviated as "compound," "composition" and "device," respectively. Moreover, a higher limit of a temperature range of the liquid crystal phase is a phase transition temperature between the liquid crystal phase and an isotropic phase, and may be occasionally abbreviated simply as "clearing point" or "maximum temperature." A lower limit of the temperature range of the liquid crystal phase may be occasionally abbreviated as "minimum temperature." A compound represented by formula (1) may be occasionally abbreviated as "compound (1)." The abbreviation may occasionally apply to a compound represented by formula (2) or the like. In formula (2) to formula (5), a symbol such as $A^1$, B or C surrounded by a hexagonal shape corresponds to ring $A^1$, ring B or ring C, respectively. The amount of compound expressed in terms of percentage is expressed in terms of weight percentage (% by weight) based on the total weight of the composition. A plurality of identical symbols such as ring $A^1$, $Y^1$ and B are described in identical formulas or different formulas, but the symbols may be identical or different.

"Arbitrary" means any of not only positions but also numbers without including a case where the number is 0 (zero). An expression "arbitrary A may be replaced by B, C or D" includes a case where arbitrary A is replaced by B, a case where arbitrary A is replaced by C, and a case where arbitrary A is replaced by D, and also a case where a plurality of A are replaced by at least two of B to D. For example, "alkyl in which arbitrary —CH$_2$— may be replaced by —O—, and arbitrary —CH$_2$—CH$_2$— in the alkyl may be replaced by —CH═CH—" includes alkyl, alkenyl, alkoxy, alkoxyalkyl, alkoxyalkenyl and alkenyloxyalkyl. In the invention, a case where two successive —CH$_2$— is replaced by —O— to form —O—O— is not preferred. Then, a case where —CH$_2$— on a terminal in alkyl is replaced by —O— is not preferred, either. The invention will be further explained below. With regard to a terminal group, a ring, a bonding group or the like in the compound represented by formula (1), a preferred example is also described.

Advantageous Effects of Invention

A liquid crystal composition of the invention shows stability to heat, light and so forth, a high maximum temperature of an optically isotropic liquid crystal phase, and a low minimum temperature, and has a low driving voltage in a device to be driven in the optically isotropic liquid crystal phase. A polymer/liquid crystal composite material having the optically isotropic liquid crystal phase according to the invention shows a high maximum temperature or a low minimum temperature of the optically isotropic liquid crystal phase, and has a low driving voltage in the device to be driven in the optically isotropic liquid crystal phase.

An optical device to be driven in the optically isotropic liquid crystal phase according to the invention has a wide temperature range in which the optical device can be used, a short response time, a large contrast ratio and a low driving voltage.

DESCRIPTION OF EMBODIMENTS 1-1 Compound (1)

Figure 1:
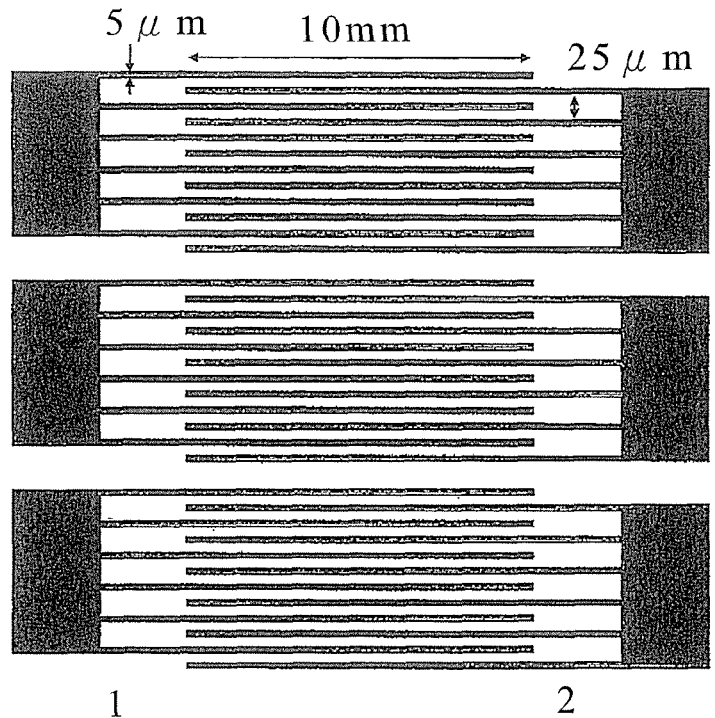
FIG. 1 shows a comb-shaped electrode substrate used in Examples.

A liquid crystal composition having an optically isotropic liquid crystal phase according to the invention contains achiral component T and a chiral agent, and the achiral component T contains a compound represented by formula (1) as a first component. A first embodiment of the liquid crystal composition of the invention is a composition containing the first component and any other component whose component name is not particularly shown herein. First, the compound represented by formula (1) will be explained.

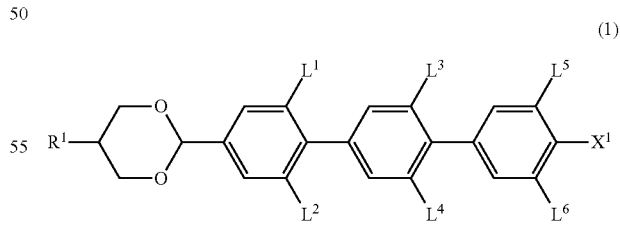

(1)

In formula (1), $R^1$ is hydrogen or alkyl having 1 to 20 carbons, arbitrary —CH$_2$— in the alkyl may be replaced by —O—, —S—, —COO—, —OCO—, —CH═CH—, —CF═CF— or —C≡C—, and arbitrary hydrogen in the alkyl and in a group obtained by replacing arbitrary —CH$_2$— in the alkyl by —O—, —S—, —COO—, —OCO—, —CH═CH—, —CF═CF— or —C≡C— may be replaced by halogen; $L^1$, $L^2$, $L^3$, $L^4$, $L^5$ and $L^6$ are independently hydrogen or fluorine;

and X' is hydrogen, halogen, —$SF_5$ or alkyl having 1 to 10 carbons, arbitrary —$CH_2$— in the alkyl may be replaced by —O—, —S—, —CH═CH— or —C≡C—, and arbitrary hydrogen in the alkyl and in a group obtained by replacing arbitrary —$CH_2$— in the alkyl by —O—, —S—, —COO—, —OCO—, —CH═CH—, —CF═CF— or —C≡C— may be replaced by fluorine.

A preferred configuration of —CH═CH— in alkenyl depends on a position of a double bond. A trans configuration is preferred in alkenyl having a double bond in an odd-numbered position, such as —CH═$CHCH_3$, —CH═$CHC_2H_5$, —CH═$CHC_3H_7$, —CH═$CHC_4H_9$, —$C_2H_4$CH═$CHCH_3$ and —$C_2H_4$CH═$CHC_2H_5$. A cis configuration is preferred in alkenyl having a double bond in an even-numbered position, such as —$CH_2$CH═$CHCH_3$, —$CH_2$CH═$CHC_2H_5$ and —$CH_2$CH═$CHC_3H_7$. An alkenyl compound having the preferred configuration has a high maximum temperature or a wide temperature range of a liquid crystal phase. A detailed description is found in Mol. Cryst. Liq. Cryst., 1985, 131, 109 and Mol. Cryst. Liq. Cryst., 1985, 131, 327.

Specific examples of alkyl include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Specific examples of alkoxy include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Specific examples of alkoxyalkyl include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$ and —$(CH_2)_5$—$OCH_3$.

Specific examples of alkenyl include —CH═$CH_2$, —CH═$CHCH_3$, —$CH_2$CH═$CH_2$, —CH═$CHC_2H_5$, —$CH_2$CH═$CHCH_3$, —$(CH_2)_2$—CH═$CH_2$, —CH═$CHC_3H_7$, —$CH_2$CH═$CHC_2H_5$, —$(CH_2)_2$—CH═$CHCH_3$ and —$(CH_2)_3$—CH═$CH_2$.

Specific examples of alkenyloxy include —$OCH_2$CH═$CH_2$, —$OCH_2$CH═$CHCH_3$ and —$OCH_2$CH═$CHC_2H_5$.

Specific examples of alkynyl include —C≡CH, —C≡$CCH_3$, —$CH_2$C≡CH, —C≡$CC_2H_5$, —$CH_2$C≡$CCH_3$, —$(CH_2)_2$—C≡CH, —C≡$CC_3H_7$, —$CH_2$C≡$CC_2H_5$, —$(CH_2)_2$—C≡$CCH_3$ and —C≡C$(CH_2)_5$.

In formula (1), X' is hydrogen, halogen, —$SF_5$ or alkyl having 1 to 10 carbons, and in the alkyl, arbitrary —$CH_2$— may be replaced by —O—, —S—, —CH═CH— or —C≡C—, and arbitrary hydrogen in the alkyl and in a group obtained by replacing arbitrary —$CH_2$— in the alkyl by —O—, —S—, —COO—, —OCO—, —CH═CH—, —CF═CF— or —C≡C— may be replaced by fluorine or chlorine.

Specific examples of alkyl in which arbitrary hydrogen is replaced by fluorine or chlorine include —$CHF_2$, —$CF_3$, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$ and —$CHFCF_2CF_3$.

Specific examples of alkoxy in which arbitrary hydrogen is replaced by fluorine or chlorine include —$OCHF_2$, —$OCF_3$, —$OCF_2CH_2F$, —$OCF_2CHF_2$, —$OCH_2CF_3$, —O—$(CF_2)_3$—F, —$OCF_2CHFCF_3$ and —$OCHFCF_2CF_3$.

Specific examples of alkenyl in which arbitrary hydrogen is replaced by fluorine or chlorine include —CH═$CF_2$, —CF═CHF, —CH═$CHCH_2F$, —CH═$CHCF_3$, —$(CH_2)_2$—CH═$CF_2$, —$CH_2$CH═$CHCF_3$ and —CH═$CHCF_2CF_3$.

Specific examples of preferred $X^1$ include fluorine, chlorine, —$CF_3$, —$CHF_2$, —$OCF_3$ and —$OCHF_2$. Specific examples of further preferred $X^1$ include fluorine, chlorine, —$CF_3$ and —$OCF_3$. When $X^1$ is chlorine or fluorine, a melting point is low, and compatibility with other liquid crystal compounds is particularly excellent. When $X^1$ is —$CF_3$, —$CHF_2$, —$OCF_3$ and —$OCHF_2$, a particularly large dielectric anisotropy is shown.

In formula (1), preferred compounds are represented by formulas (1-1) to (1-4):

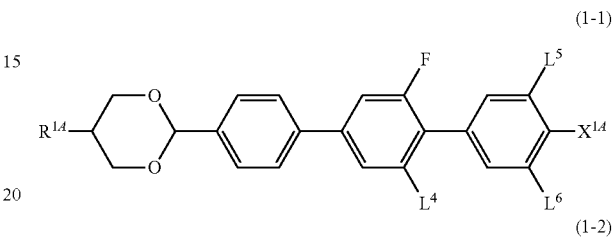

(1-1)

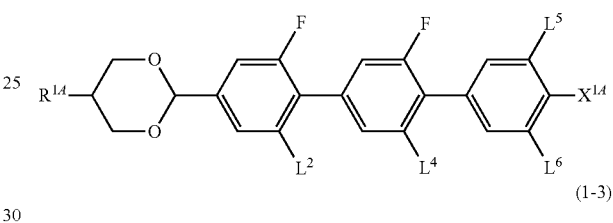

(1-2)

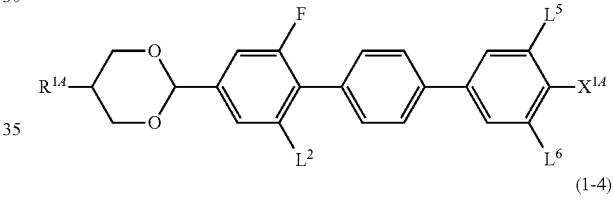

(1-3)

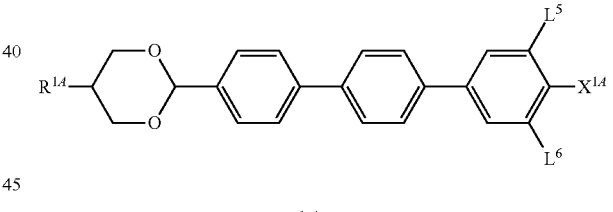

(1-4)

In formulas (1-1) to (1-4), $R^{14}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $L^2$, $L^4$, $L^5$ and $L^6$ are independently hydrogen or fluorine; and $X^{14}$ is fluorine, chlorine, —$CF_3$ or —$OCF_3$.

In compounds represented by formulas (1-1) to (1-4), further preferred compounds are represented by formulas (1-1) to (1-3), and still further preferred compounds are represented by formulas (1-1-1), (1-1-2), (1-2-1) to (1-2-4), (1-3-1) and (1-3-2). Among the compounds, further preferred compounds are represented by formulas (1-2-1), (1-2-2) and (1-3-2).

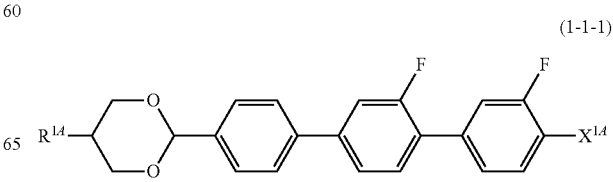

(1-1-1)

-continued (1-1-2)
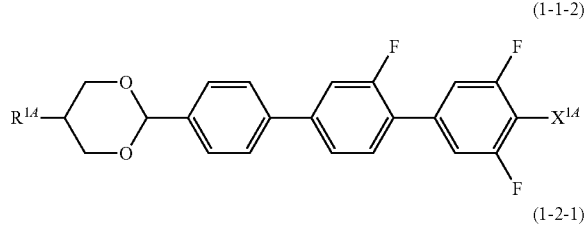

(1-2-1)
(1-2-2)
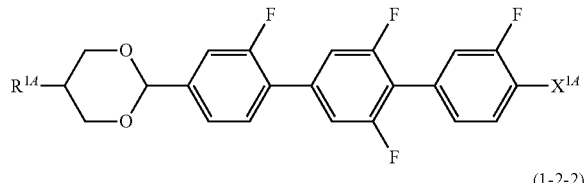

(1-2-3)
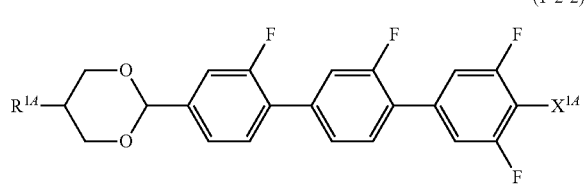

(1-2-4)
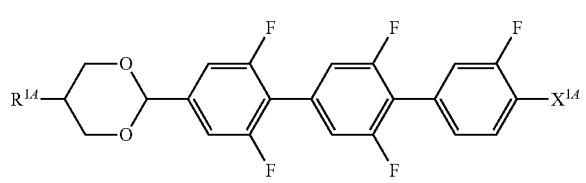

(1-3-1)
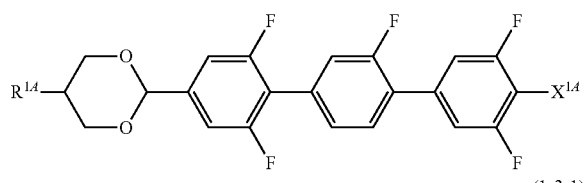

(1-3-2)
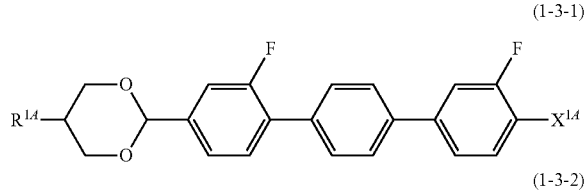

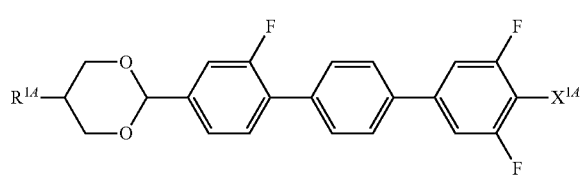

wherein definitions of $R^{1A}$ and $X^{1A}$ are identical with the definitions described above.

1-2 Properties of Compound (1)

Compound (1) used in the invention will be explained in more detail. Compound (1) is a liquid crystal compound having a dioxane ring and three benzene rings. The compound is significantly physically and chemically stable under conditions in which the device is ordinarily used, and has a relatively good compatibility with other liquid crystal compounds even though the clearing point is high. A composition containing the compound is stable under the conditions in which the device is ordinarily used. Accordingly, a temperature range of the optically isotropic liquid crystal phase can be extended in the composition, and the composition can be used in the form of a display device in a wide temperature range. Furthermore, the compound is useful as a component for decreasing a driving voltage of the composition driven in the optically isotropic liquid crystal phase. Moreover, if a blue phase is exhibited in a composition prepared from compound (1) and the chiral agent, a uniform blue phase without coexistence with a N*phase or an isotropic phase is easily formed. More specifically, compound (1) easily exhibits the uniform blue phase.

When right-terminal group $X^1$ is fluorine, chlorine, —$SF_5$, —$CF_3$, —$OCF_3$ or —CH=CH—$CF_3$, compound (1) has a large dielectric anisotropy. When $X^1$ is fluorine, —$CF_3$ or —$OCF_3$, compound (1) is chemically stable.

1-4 Synthesis of Compound (1)

Next, a synthesis of compound (1) will be explained. Compound (1) can be prepared by suitably combining techniques in synthetic organic chemistry. Methods for introducing an objective terminal group, ring and bonding group into a starting material are described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.), or the like.

For example, a compound represented by formula (1) according to the invention can be prepared even by correspondingly applying the method described in Patent literature No. 15.

2-1 Compound (2)

A second embodiment of the liquid crystal composition of the invention is a composition containing a second component including at least one compound selected from the group of compounds represented by formula (2), and the first component.

The compound represented by formula (2) will be explained.

(2)
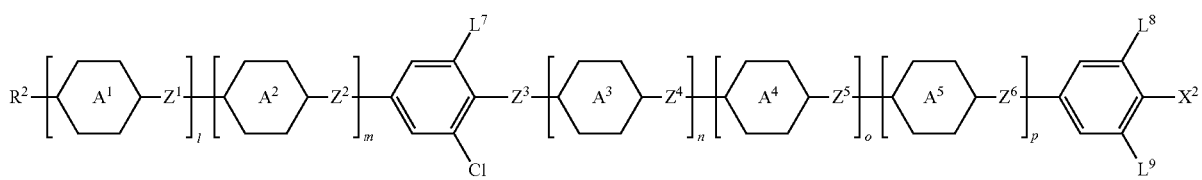

In formula (2), $R^2$ is hydrogen or alkyl having 1 to 20 carbons, arbitrary —$CH_2$— in the alkyl may be replaced by —O—, —S—, —COO—, —OCO—, —CH=CH—, —CF=CF— or —C≡C—, and arbitrary hydrogen in the alkyl and in a group obtained by replacing arbitrary —$CH_2$— in the alkyl by —O—, —S—, —COO—, —OCO—, —CH=CH—, —CF=CF— or —C≡C— may be replaced by halogen; ring $A^1$, ring $A^2$, ring $A^3$, ring $A^4$ and ring $A^5$ are independently 1,4-cyclohexylene, 1,3-dioxane-2,5-diyl, 1,4-phenylene, 1,4-phenylene in which one or two of hydrogen is replaced by fluorine, 1,4-phenylene in which two of hydrogen is replaced by fluorine and chlorine, respectively, pyridine-2,5-diyl or pyrimidine-2,5-diyl; $Z^1$, $Z^2$, $Z^3$, $Z^4$, $Z^5$ and $Z^6$ are independently a single bond or alkylene having 1 to 4 carbons, and arbitrary —$CH_2$— in the alkylene may be replaced by —O—, —COO— or —$CF_2O$—; $L^7$, $L^8$ and $L^9$ are independently hydrogen or fluorine; $X^2$ is fluorine, chlorine, —$CF_3$ or —$OCF_3$; and l, m, n, o and p are independently 0 or 1, and an expression: 2≤l+m+n+o+p≤3 is satisfied.

$R^2$ is preferably alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

When stability and dielectric anisotropy of the compound are taken into consideration, ring $A^1$, ring $A^2$, ring $A^3$, ring $A^4$ and ring $A^5$ are preferably 1,4-phenylene or 1,4-phenylene in which one or two of hydrogen is replaced by fluorine.

$Z^1$, $Z^2$, $Z^3$, $Z^4$, $Z^5$ and $Z^6$ are independently a single bond or alkylene having 1 to 4 carbons, and arbitrary —$CH_2$— in the alkylene may be replaced by —O—, —COO— or —$CF_2O$—. All of $Z^1$, $Z^2$, $Z^3$, $Z^4$, $Z^5$ and $Z^6$ are preferably a single bond or at least one of $Z^1$, $Z^2$, $Z^3$, $Z^4$, $Z^5$ and $Z^6$ is preferably —COO— or —$CF_2O$—. When compatibility with other liquid crystal compounds is thought as important, at least one of $Z^1$, $Z^2$, $Z^3$, $Z^4$, $Z^5$ and $Z^6$ is preferably —$CF_2O$—. Particularly preferably, n is 1, and $Z^4$ is —$CF_2O$—.

$X^2$ is fluorine, chlorine, —$CF_3$, —$CHF_2$, —$CH_2F$, —$OCF_3$, —$OCHF_2$, —$OCH_2F$, —$OCF_2CFHCF_3$ or —CH=$CHCF_3$. $X^2$ is further preferably fluorine, chlorine, —$CF_3$ and —$OCF_3$.

In the compound represented by formula (2), a further preferred compound is represented by formula (2-1).

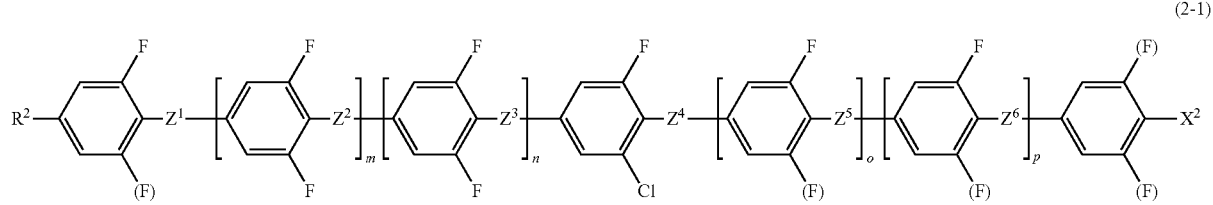

(2-1)

In formula (2-1), $R^2$, $Z^1$ to $Z^6$, m, n, o, p, and $X^2$ in formula (2-1) show meanings similar to the meanings in the formula (2), an expression: 1<m+n+o+p <2 is satisfied, and (F) independently represents hydrogen or fluorine. $R^2$ is preferably alkyl having 1 to 12 carbons, alkoxy having 1 to 12 carbons, alkenyl having 2 to 12 carbons, or alkenyl having 2 to 12 carbons in which arbitrary hydrogen is replaced by fluorine; and $X^2$ is preferably fluorine, chlorine, -$CF_3$ or -$OCF_3$.

A preferred configuration of —CH=CH— in alkenyl depends on a position of a double bond. A trans configuration is preferred in alkenyl having a double bond in an odd-numbered position, such as —CH=$CHCH_3$, —CH=$CHC_2H_5$, —CH=$CHC_3H_7$, —CH=$CHC_4H_9$, —$C_2H_4$CH=$CHCH_3$ and —$C_2H_4$CH=$CHC_2H_5$. A cis configuration is preferred in alkenyl having a double bond in an even-numbered position, such as —$CH_2$CH=$CHCH_3$, —$CH_2$CH=$CHC_2H_5$ and —$CH_2$CH=$CHC_3H_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

$Z^1$, $Z^2$, $Z^3$, $Z^4$, $Z^5$ and $Z^6$ are independently a single bond or —$CF_2O$—. When compatibility with other liquid crystal compounds is thought as important, at least one of $Z^1$, $Z^2$, $Z^3$, $Z^4$, $Z^5$ and $Z^6$ is preferably —$CF_2O$—. Particularly preferably, n is 1, and $Z^4$ is —$CF_2O$—.

In formula (2-1), preferred structures are represented by formulas (2-1-1) to (2-1-5).

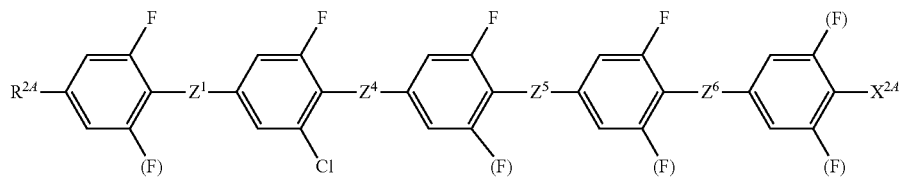

(2-1-1)

(2-1-2)
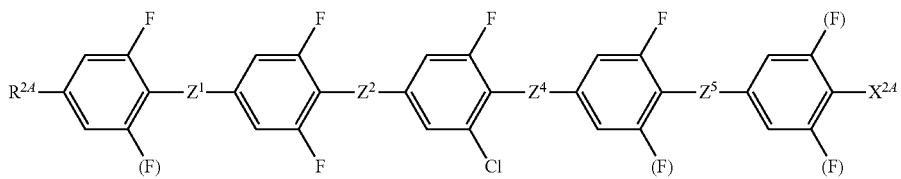

(2-1-3)
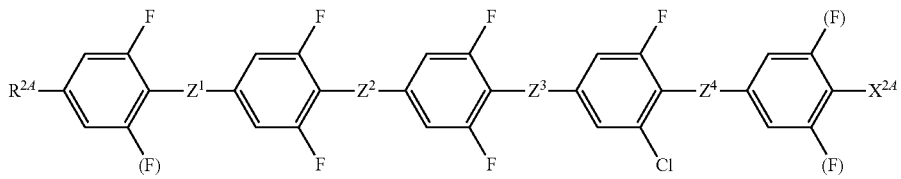

(2-1-4)
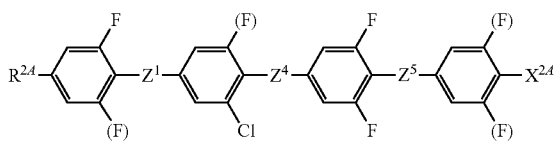

(2-1-5)
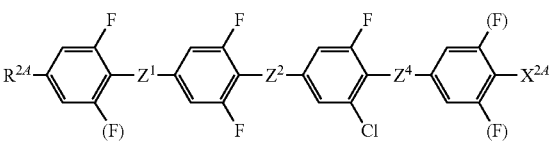

wherein definitions of $Z^1$ to $Z^6$ are identical with the definitions described above.

$R^{2A}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; (F) is independently hydrogen or fluorine; and $X^{2A}$ is fluorine, chlorine, —$CF_3$ or —$OCF_3$.

In compounds represented by formulas (2-1-1) to (2-1-5), further preferred compounds are represented by formulas (2-1-1-1) to (2-1-1-3), (2-1-2-1) to (2-1-2-3), (2-1-3-1) to (2-1-3-3), (2-1-4-1) to (2-1-4-3) and (2-1-5-1) to (2-1-5-3) as described below. Among the compounds, still further preferred compounds are represented by formulas (2-1-1-1) and (2-1-1-2), formulas (2-1-2-1) and (2-1-2-2), and formulas (2-1-3-1), (2-1-3-2), (2-1-4-2), (2-1-4-3) and (2-1-5-3).

(2-1-1-1)
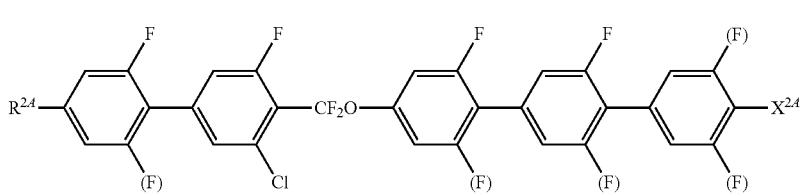

(2-1-1-2)
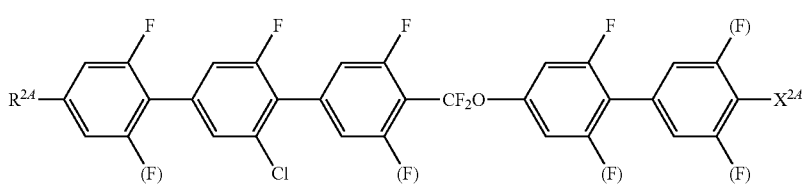

(2-1-1-3)
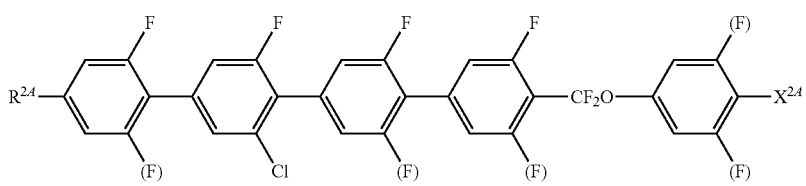

(2-1-2-1)
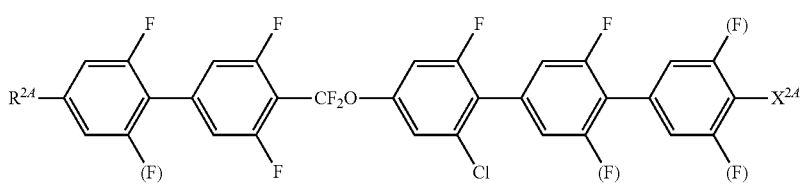

-continued
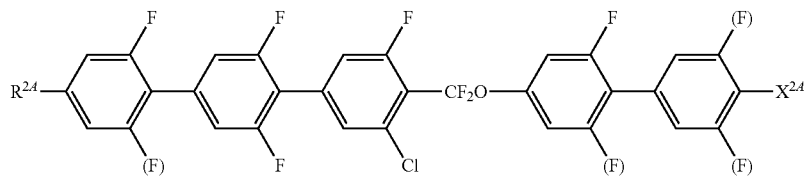
(2-1-2-2)
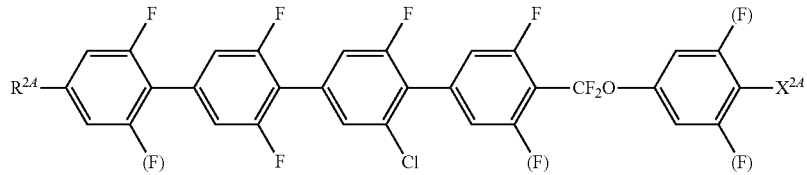
(2-1-2-3)
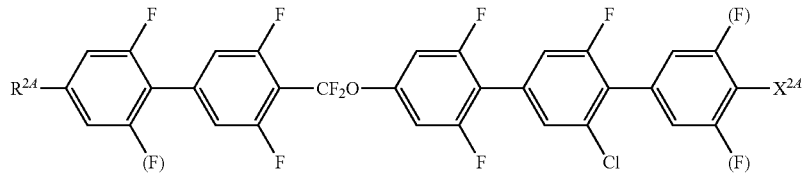
(2-1-3-1)
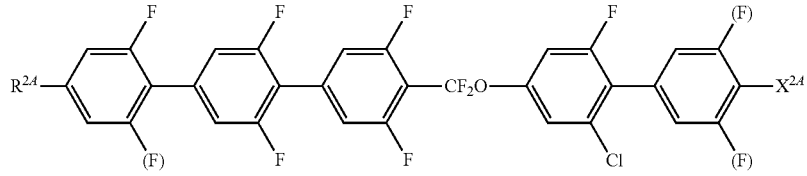
(2-1-3-2)
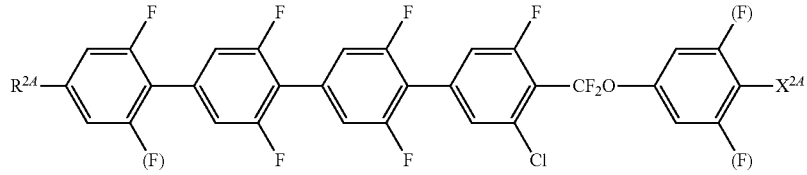
(2-1-3-3)
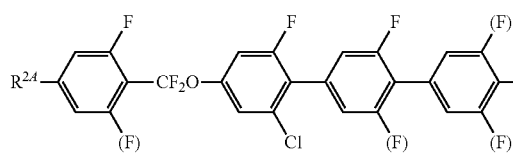
(2-1-4-1)
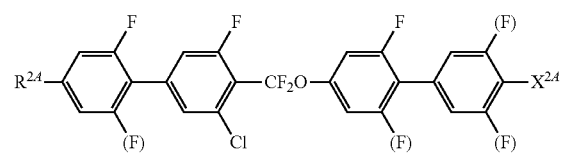
(2-1-4-2)
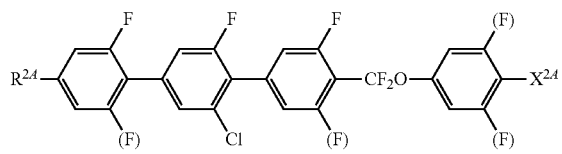
(2-1-4-3)
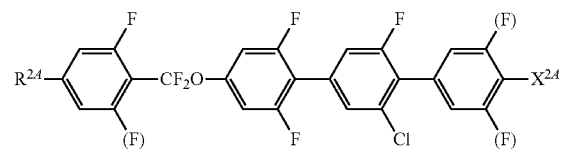
(2-1-5-1)
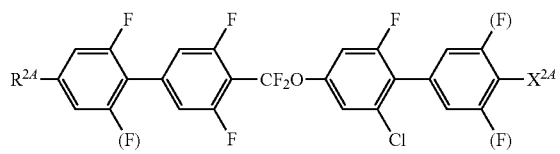
(2-1-5-2)
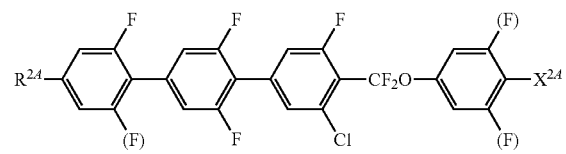
(2-1-5-3)

In the formulas, $R^{2A}$, (F) and $X^{2A}$ have meanings identical with the meanings in the formulas (2-1-1) to (2-1-5).

2-2 Properties of Compound (2-1)

Compound (2-1) used in the invention will be explained in more detail. Compound (2-1) is a liquid crystal compound having a chlorobenzene ring. The compound is significantly physically and chemically stable under conditions in which the device is ordinarily used, and has a good compatibility with other liquid crystal compounds. Furthermore, the compound is hard to exhibit the smectic phase. A composition containing the compound is stable under the conditions in which the device is ordinarily used. Accordingly, a temperature range of a cholesteric phase can be extended in the composition, and the composition can be used in the form of a display device in a wide temperature range. Furthermore, the compound has a large dielectric anisotropy and refractive index anisotropy, and therefore is useful as a component for decreasing a driving voltage and increasing reflectance in the composition to be driven in the cholesteric phase.

Physical properties such as a clearing point, refractive index anisotropy and dielectric anisotropy can be arbitrarily adjusted by suitably selecting a combination of m, n, o and p, left-terminal group $R^2$ and a group on a rightmost benzene ring and a replacement position thereof ((F) and $X^2$), or bonding groups $Z^1$ to $Z^6$ in compound (2-1). An effect of the combination of m, n, o and p, kinds of left-terminal group $R^2$, right-terminal group $X^2$, bonding groups $Z^1$ to $Z^6$, and (F) on the physical properties of compound (2-1) will be explained below.

In general, a compound satisfying an equation: m+n+o+p=2 has a high clearing point and a compound satisfying an equation: m+n+o+p=1 has a low melting point.

When $R^2$ is alkenyl, a preferred configuration depends on a position of a double bond. A trans configuration is preferred in alkenyl having a double bond in an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis configuration is preferred in alkenyl having a double bond in an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Bonding groups $Z^1$ to $Z^6$ are a single bond or —CF$_2$O—. Therefore, compound (2-1) is relatively chemically stable and is relatively hard to cause degradation. Furthermore, when a bonding group is a single bond, compound (2-1) has a small viscosity. Moreover, when a bonding group is —CF$_2$O—, compound (2-1) has a large dielectric anisotropy.

When right-terminal group $X^2$ is fluorine, chlorine, —CF$_3$, —OCF$_3$ or —CH=CH—CF$_3$, compound (2-1) has a large dielectric anisotropy. When $X^2$ is fluorine, —OCF$_3$ or —CF$_3$, compound (2-1) is chemically stable.

When (F) is hydrogen, compound (2-1) has a low melting point, and when (F) is fluorine, compound (2-1) has a large dielectric anisotropy.

As described above, a compound having objective physical properties can be obtained by suitably selecting kinds of ring structures, terminal groups, bonding groups or the like.

3-1 Compound (3)

A third embodiment of the liquid crystal composition of the invention is a composition containing a third component including at least one compound selected from the group of compounds represented by formula (3), and the first component. The liquid crystal composition may further contain the second component in addition to the third component and the first component.

A compound represented by formula (3) will be explained.

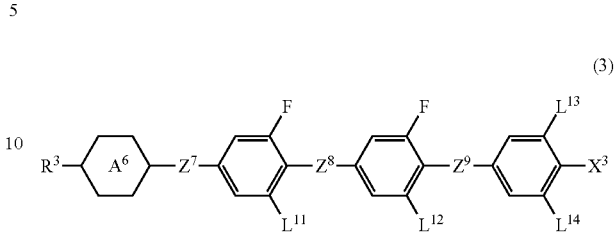

(3)

In formula (3), $R^3$ is hydrogen or alkyl having 1 to 20 carbons, arbitrary —CH$_2$— in the alkyl may be replaced by —O—, —S—, —COO—, —OCO—, —CH=CH—, —CF=CF— or —C≡C—, and arbitrary hydrogen in the alkyl and in a group obtained by replacing arbitrary —CH$_2$— in the alkyl by —O—, —S—, —COO—, —OCO—, —CH=CH—, —CF=CF— or —C≡C— may be replaced by halogen; ring $A^6$ is 1,4-phenylene in which at least one of hydrogen is replaced by fluorine, or 1,3-dioxane-2,5-diyl; $Z^7$, $Z^8$ and $Z^9$ are independently a single bond, —COO— or —CF$_2$O—, but at least one of $Z^7$, $Z^8$ and $Z^9$ is —CF$_2$O—; $L^{11}$, $L^{12}$, $L^{13}$ and $L^{14}$ are independently hydrogen or fluorine; $X^3$ is hydrogen, halogen, —SF$_5$ or alkyl having 1 to 10 carbons, and in the alkyl, arbitrary —CH$_2$— may be replaced by —O—, —S—, —CH=CH— or —C≡C—, and arbitrary hydrogen in the alkyl and in a group obtained by replacing arbitrary —CH$_2$— in the alkyl by —O—, —S—, —COO—, —OCO—, —CH=CH—, —CF=CF— or —C≡C— may be replaced by fluorine.

A preferred configuration of —CH=CH— in alkenyl depends on a position of a double bond. A trans configuration is preferred in alkenyl having a double bond in an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis configuration is preferred in alkenyl having a double bond in an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Specific examples of alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

Specific examples of alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

Specific examples of alkoxyalkyl include —CH$_2$OCH$_3$, —CH$_2$OC$_2$H$_5$, —CH$_2$OC$_3$H$_7$, —(CH$_2$)$_2$—OCH$_3$, —(CH$_2$)$_2$—OC$_2$H$_5$, —(CH$_2$)$_2$—OC$_3$H$_7$, —(CH$_2$)$_3$—OCH$_3$, —(CH$_2$)$_4$—OCH$_3$ and —(CH$_2$)$_5$—OCH$_3$.

Specific examples of alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

Specific examples of alkenyloxy include —OCH$_2$CH=CH$_2$, —OCH$_2$CH=CHCH$_3$ and —OCH$_2$CH=CHC$_2$H$_5$.

Specific examples of alkynyl include —C≡CH, —C≡CCH$_3$, —CH$_2$C≡CH, —C≡CC$_2$H$_5$, —CH$_2$C≡CCH$_3$, (CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$.

In formula (3), ring A$^6$ is 1,4-phenylene in which at least one of hydrogen is replaced by fluorine, or 1,3-dioxane-2,5-diyl. In order to increase refractive index anisotropy, 1,4-phenylene in which at least one of hydrogen is replaced by fluorine is preferred, and in order to improve compatibility with other liquid crystal compounds, 1,3-dioxane-2,5-diyl is preferred.

In formula (3), Z$^7$, Z$^8$ and Z$^9$ are independently a single bond, —COO— or —CF$_2$O—, but at least one of Z$^7$, Z$^8$ and Z$^9$ is —CF$_2$O—.

Preferred examples of Z$^7$, Z$^8$ and Z$^9$ include a single bond and —CF$_2$O—.

In formula (3), L$^{11}$, L$^{12}$, L$^{13}$ and L$^{14}$ are independently hydrogen or fluorine. When Z$^8$ is —COO— or —CF$_2$O—, L$^{11}$, L$^{13}$ and L$^{14}$ are preferably fluorine, and when Z$^9$ is —COO— or —CF$_2$O—, L$^{12}$, L$^{13}$ and L$^{14}$ are preferably fluorine.

In formula (3), X$^3$ is hydrogen, halogen, —SF$_5$ or alkyl having 1 to 10 carbons, and in the alkyl, arbitrary —CH$_2$— may be replaced by —O—, —S—, —CH═CH— or —C≡C—, and arbitrary hydrogen in the alkyl and in a group obtained by replacing arbitrary —CH$_2$— in the alkyl by —O—, —S—, —COO—, —OCO—, —CH═CH—, —CF═CF— or —C≡C— may be replaced by fluorine.

Specific examples of alkyl in which arbitrary hydrogen is replaced by halogen include —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F and —(CF$_2$)$_5$—F.

Specific examples of alkoxy in which arbitrary hydrogen is replaced by halogen include —OCH$_2$F, —OCHF$_2$, —OCF$_3$, —O—(CH$_2$)$_2$—F, —OCF$_2$CH$_2$F, —OCF$_2$CHF$_2$, —OCH$_2$OF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F and —O—(CF$_2$)$_5$—F.

Specific examples of alkenyl in which arbitrary hydrogen is replaced by halogen include —CH═CHF, —CH═CF$_2$, —CF═CHF, —CH═CHCH$_2$F, —CH═CHCF$_3$, —(CH$_2$)$_2$—CH═CF$_2$, —CH$_2$CH═CHCF$_3$, —CH═CHCF$_3$ and —CH═CHCF$_2$CF$_3$.

Preferred examples of X$^3$ are fluorine, chlorine, —CF$_3$, —CHF$_2$, —OCF$_3$ and —OCHF$_2$. Most preferred examples of X$^3$ are fluorine, chlorine, —CF$_3$ and —OCF$_3$.

Preferred structures in formula (3) are represented by formulas (3-1) to (3-5). Further preferred structures are represented by formulas (3-2) to (3-5).

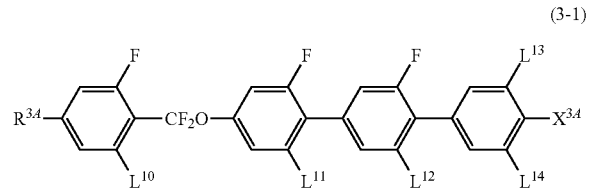

(3-1)

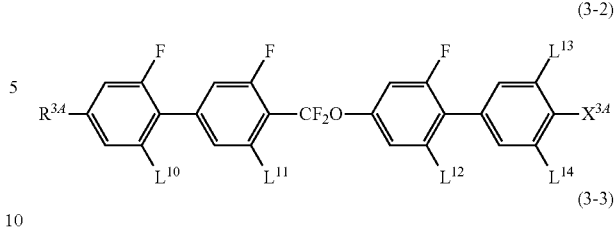

(3-2)

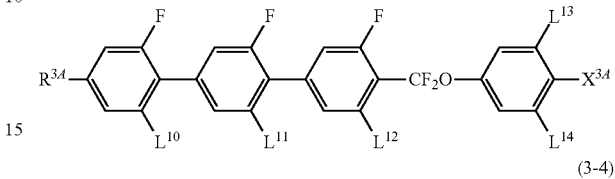

(3-3)

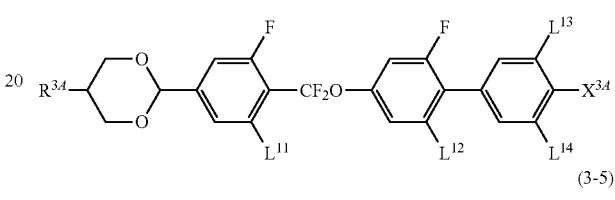

(3-4)

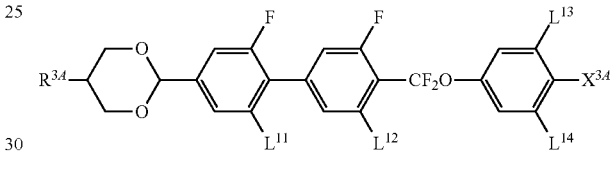

(3-5)

In the formulas, R$^{3A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, X$^{3A}$ is fluorine, chlorine, —CF$_3$ or —OCF$_3$, and L$^{10}$ to L$^{14}$ are independently hydrogen or fluorine.

3-2 Properties of Compound (3)

Compound (3) used in the invention will be explained in more detail. Compound (3) has four benzene rings, or one dioxane ring and three benzene rings, and at least one —CF$_2$O— linking group. The compound is significantly physically and chemically stable under conditions in which the device is ordinarily used, and has a good compatibility with other liquid crystal compounds. A composition containing the compound is stable under the conditions in which the device is ordinarily used. Accordingly, a temperature range of a cholesteric phase can be extended in the composition, and the composition can be used in the form of a display device in a wide temperature range. Furthermore, the compound has a large dielectric anisotropy and refractive index anisotropy, and therefore is useful as a component for decreasing a driving voltage and increasing reflectance in the composition to be driven in the cholesteric phase.

Physical properties such as a clearing point, refractive index anisotropy and dielectric anisotropy can be arbitrarily adjusted by suitably selecting left-terminal group R$^3$, groups (L$^{10}$ to L$^{14}$, and X$^3$) on benzene rings, or bonding groups Z$^7$ to Z$^9$ in compound (3). An effect of kinds of left-terminal group R$^3$, groups (L$^{10}$ to L$^{14}$, and X$^3$) on the benzene rings, or bonding groups Z$^7$ to Z$^9$ on the physical properties of compound (3) will be explained below.

When R$^3$ is alkenyl, a preferred configuration of —CH═CH— in the alkenyl depends on a position of a double bond. A trans configuration is preferred in alkenyl having a double bond in an odd-numbered position, such as —CH=CHCH₃, —CH=CHC₂H₅, —CH=CHC₃H₇, —CH=CHC₄H₉, —C₂H₄CH=CHCH₃ and —C₂H₄CH=CHC₂H₅. A cis configuration is preferred in alkenyl having a double bond in an even-numbered position, such as —CH₂CH=CHCH₃, —CH₂CH=CHC₂H₅ and —CH₂CH=CHC₃H₇. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

When bonding groups $Z^7$, $Z^8$ and $Z^9$ are a single bond or —CF₂O—, compound (3) has a small viscosity. When bonding groups $Z^7$, $Z^8$ and $Z^9$ are —CF₂O—, compound (3) has a large dielectric anisotropy. When $Z^1$, $Z^2$ and $Z^3$ are a single bond or —CF₂O—, compound (3) is relatively chemically stable and relatively hard to cause degradation.

When right-terminal group $X^3$ is fluorine, chlorine, —SF₅, —CF₃, —CHF₂, —CH₂F, —OCF₃, —OCHF₂ or —OCH₂F, compound (3) has a large dielectric anisotropy. When $X^1$ is fluorine, —OCF₃ or —CF₃, compound (3) is chemically stable.

When the number of fluorine in $L^{10}$ to $L^{14}$ is large, compound (3) has a large dielectric anisotropy. When $L^{10}$ is hydrogen, compound (3) has an excellent compatibility with other liquid crystals. When both $L^{13}$ and $L^{14}$ are fluorine, compound (3) has a particularly large dielectric anisotropy.

As described above, a compound having objective physical properties can be obtained by suitably selecting kinds of terminal groups, bonding groups or the like.

3-3 Specific Examples of Compound (3)

Preferred examples of compound (3) include compounds represented by formulas (3-1) to (3-5). Specific examples of further preferred compounds include compounds represented formulas (3-2A) to (3-2H), (3-3A) to (3-3D), (3-4A) to (3-4F), and (3-5A) to (3-5F). Specific examples of still further preferred compounds include compounds represented by formulas (3-2A) to (3-2D), (3-3A), (3-3B), (3-4A) to (3-4E), (3-5A) to (3-5C) and (3-5E). Specific examples of most preferred compounds include compounds represented by formulas (3-2A), (3-2C), (3-3A), (3-4A), (3-4D) and (3-5B).

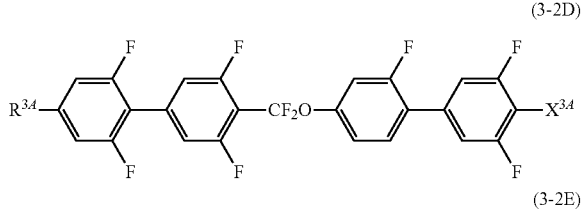

(3-2A)

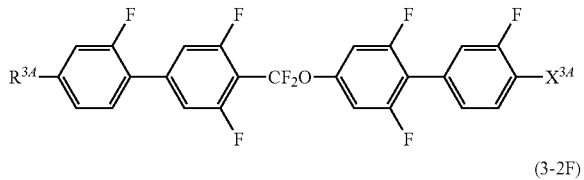

(3-2B)

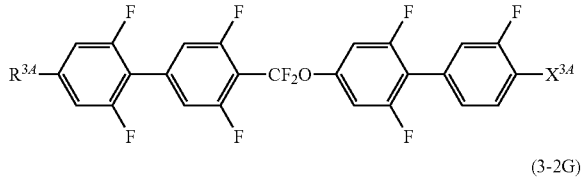

(3-2C)

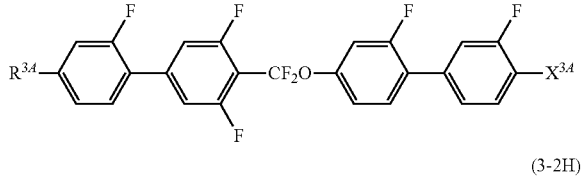

(3-2D)

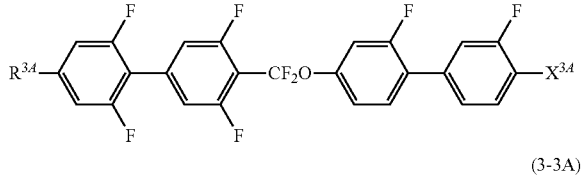

(3-2E)

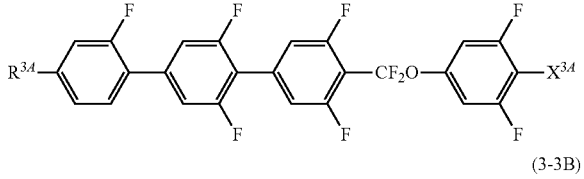

(3-2F)

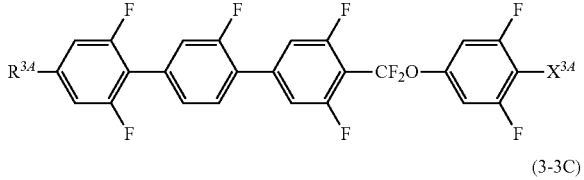

(3-2G)

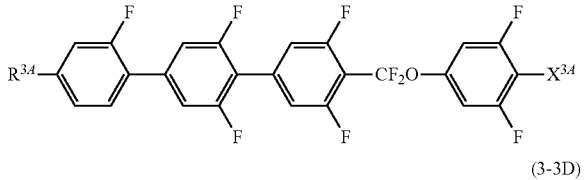

(3-2H)

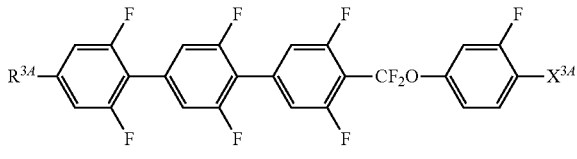

(3-3A)

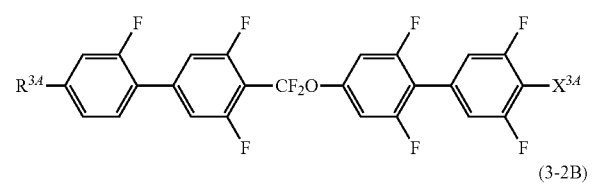

(3-3B)

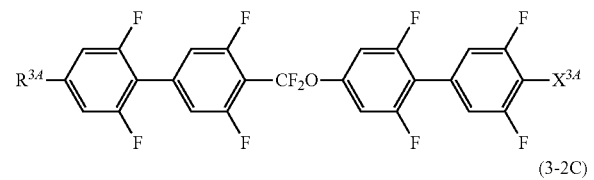

(3-3C)

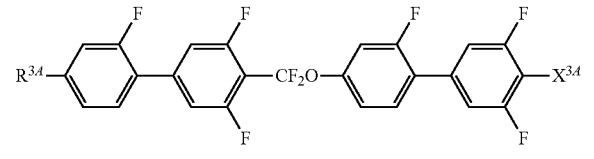

(3-3D)

(3-4A) 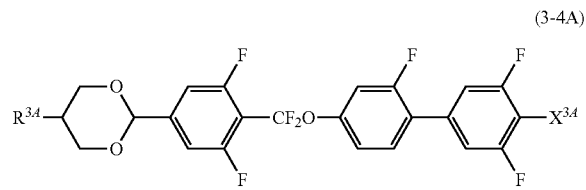

(3-4B) 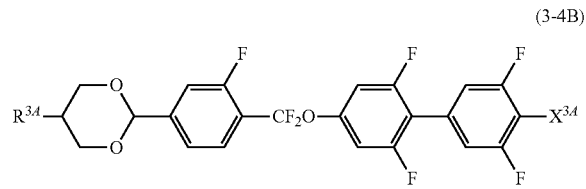

(3-4C) 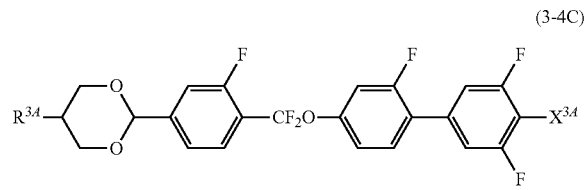

(3-4D) 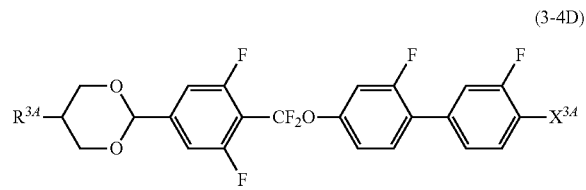

(3-4E) 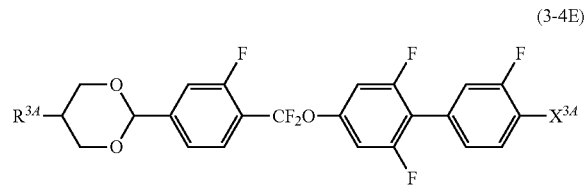

(3-4F) 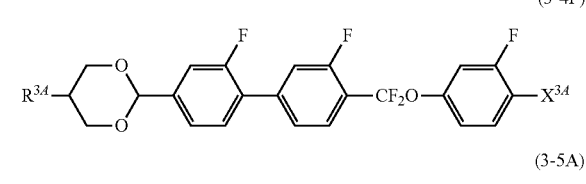

(3-5A) 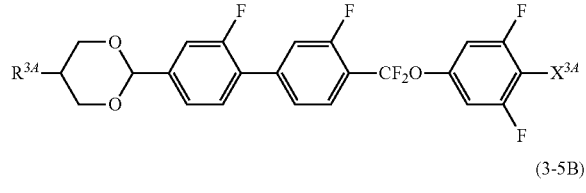

(3-5B) 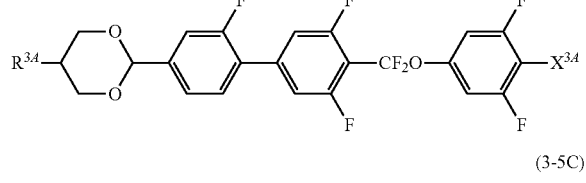

(3-5C) 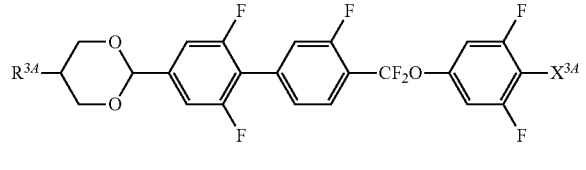

(3-5D) 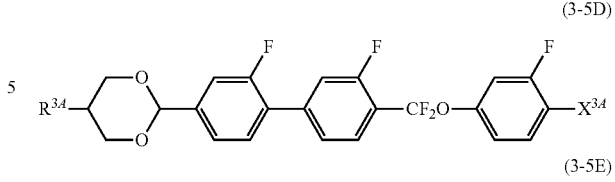

(3-5E) 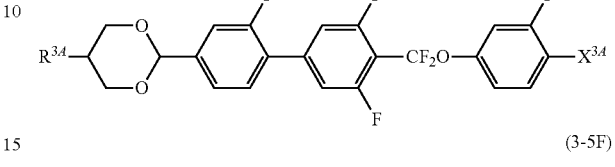

(3-5F) 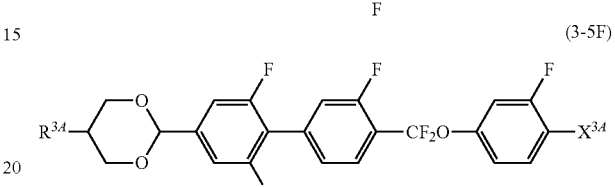

In the formulas, $R^{3A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, and $X^{3A}$ is fluorine, chlorine, —$CF_3$ or —$OCF_3$.

4 Compound (4)

A fourth embodiment of the invention is a composition containing component A including the compound represented by formula (1) and as an addition component the compounds represented by formulas (2) and (3), and a fourth component including at least one compound selected from the group of compounds represented by the formula (4). The compound represented by formula (4) will be explained.

(4) 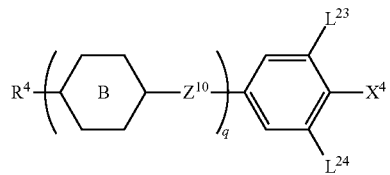

In formula (4), $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{10}$ is independently a single bond, ethylene, —COO—, —OCO—, —$CF_2O$— or —$OCF_2$—; $L^{23}$ and $L^{24}$ are independently hydrogen, fluorine or chlorine; $X^4$ is fluorine, chlorine, —$CF_3$ or —$OCF_3$; q is 1, 2, 3 or 4, however, when q is 3 or 4, one of $Z^{10}$ is —$CF_2O$— or —$OCF_2$—; when q is 3, ring B is not 1,3-dioxane-2,5-diyl, and all of ring B are not fluorine-substituted 1,4-phenylene.

The fourth component is suitable for preparation of a composition having a large dielectric anisotropy. Preferred content of the fourth component is approximately 5% by weight or more for increasing the dielectric anisotropy, and approximately 40% by weight or less for decreasing the minimum temperature of the liquid crystal phase, based on the total weight of component T. A further preferred ratio is in the range of approximately 5% by weight to approximately 30% by weight. A particularly preferred ratio is in the range of approximately 5% by weight to approximately 20% by weight.

$R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Preferred $R^4$ is alkyl having 1 to 12 carbons for increasing the stability to ultraviolet light or the stability to heat. Preferred $R^4$ is alkenyl having 2 to 12 carbons for decreasing the viscosity, and alkyl having 1 to 12 carbons for increasing the stability to ultraviolet light or the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. For decreasing the viscosity, trans is preferred in alkenyl such as 1-propenyl, 1-butenyl, 1-pentenyl, 1-hexenyl, 3-pentenyl and 3-hexenyl. C is preferred in alkenyl such as 2-butenyl, 2-pentenyl and 2-hexenyl. In the alkenyl, straight-chain alkenyl is preferred to branched alkenyl.

Preferred examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples are 2,2-difluorovinyl and 4,4-difluoro-3-butenyl for decreasing the viscosity.

Alkyl does not include cyclic alkyl. Alkoxy does not include cyclic alkoxy. Alkenyl does not include cyclic alkenyl. Alkenyl in which arbitrary hydrogen is replaced by fluorine does not include cyclic alkenyl in which arbitrary hydrogen is replaced by fluorine.

Ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene, or pyrimidine-2,5-diyl, and two of arbitrary ring B when q is 2 or more may be identical or different. Preferred ring B is 1,4-phenylene or 3-fluoro-1,4-phenylene for increasing the optical anisotropy, and 1,4-cyclohexylene for decreasing the viscosity.

$Z^{10}$ is independently a single bond, ethylene, —COO—, —OCO—, —CF$_2$O— or —OCF$_2$—, however, one of $Z^{10}$ when q is 3 or 4 is —CF$_2$O—. Two of arbitrary $Z^{10}$ when q is 2 or more may be identical or different. Preferred $Z^{10}$ is a single bond for decreasing the viscosity. Preferred $Z^{10}$ is —CF$_2$O— for increasing the dielectric anisotropy or improving the compatibility.

$L^{23}$ and $L^{24}$ are independently hydrogen or fluorine, and both $L^{23}$ and $L^{24}$ are preferably fluorine for increasing the dielectric anisotropy, and both $L^{23}$ and $L^{24}$ are preferably hydrogen for increasing the clearing point.

$X^4$ is fluorine, chlorine, —CF$_3$ or —OCF$_3$. $X^4$ is preferably —CF$_3$ for increasing the dielectric anisotropy, fluorine or —OCF$_3$ for improving the compatibility, and chlorine for increasing the refractive index anisotropy.

Compounds represented by formula (4) are preferably represented by formulas (4-1) to (4-9).

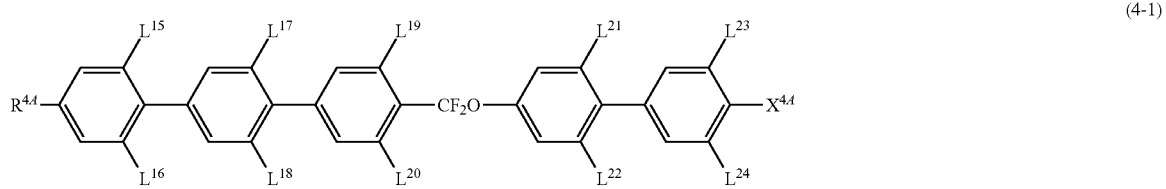

(4-1)

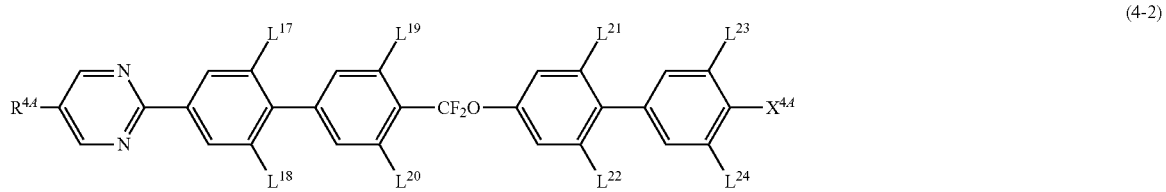

(4-2)

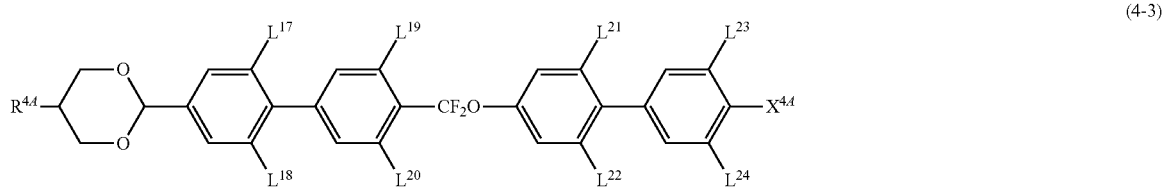

(4-3)

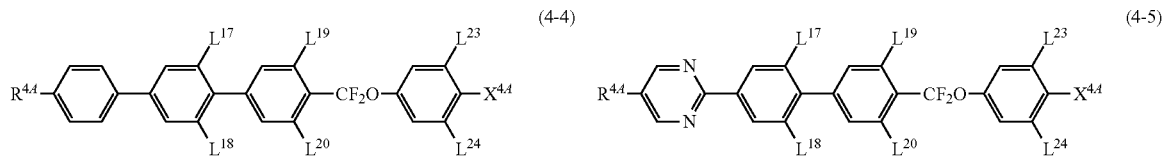

(4-4) (4-5)

-continued (4-6)
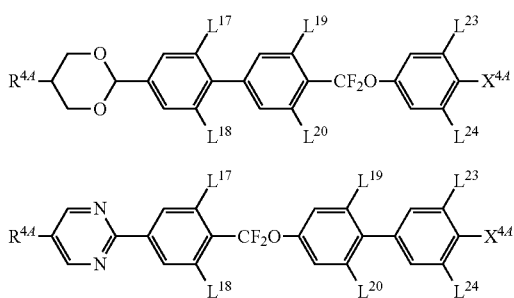

(4-7)
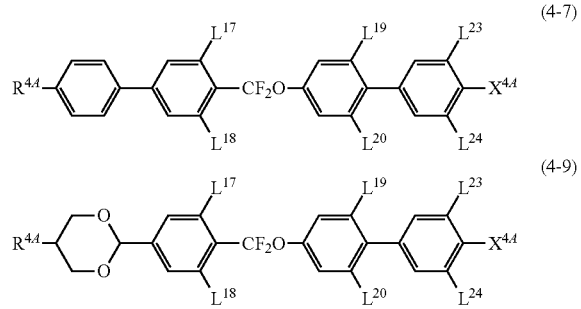

(4-8)

(4-9)

In the formulas (4-1) to (4-9), $R^{4A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^{4A}$ is fluorine, chlorine, —$CF_3$ or —$OCF_3$, and $L^{15}$ to $L^{24}$ are independently hydrogen or fluorine. Compounds represented by formulas (4-1) to (4-3) have a high clearing point, and an excellent compatibility as a compound having five rings. Compounds represented by formulas (4-4) to (4-6) have a high clearing point, and compounds represented by formulas (4-7) to (4-9) have an excellent compatibility. In $L^{15}$ to $L^{24}$, as the number of fluorine is larger, the dielectric anisotropy is larger.

5 Compound (5)

A fifth embodiment of the invention is a composition containing component A including the compound represented by formula (1) and as the addition component the compounds represented by formulas (2) and (3), and a fifth component including at least one compound selected from the group of compounds represented by the formula (5). In addition, the composition may further contain the fourth component.

A compound represented by formula (5) will be explained.

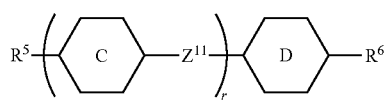
(5)

In formula (5), $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; $Z^{11}$ is independently a single bond, ethylene, —COO— or —OCO—; and r is 1, 2 or 3.

The fifth component is a compound having a small absolute value of dielectric anisotropy, and being close to neutrality. In formula (5), a compound in which r is 1 is mainly effective in adjusting the viscosity or a value of refractive index anisotropy. In formula (5), a compound in which r is 2 or 3 is effective in extending the temperature range of the optically isotropic liquid crystal phase, such as increasing the clearing point, or effective in adjusting the value of refractive index anisotropy.

If content of the compound represented by formula (5) is increased, the driving voltage of the liquid crystal composition increases, and the viscosity decreases. Therefore, the content is desirably as small as possible from a viewpoint of the driving voltage, as long as a required value of viscosity of the liquid crystal composition is satisfied. The content of the fifth component is preferably approximately 40% by weight or less, further preferably, approximately 20% by weight or less, based on the total weight of component T.

$R^5$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Preferred $R^5$ is alkyl having 1 to 12 carbons for increasing the stability to ultraviolet light or the stability to heat. Preferred $R^5$ is alkenyl having 2 to 12 carbons for decreasing the viscosity, and alkyl having 1 to 12 carbons for increasing the stability to ultraviolet light or the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

A preferred configuration of —CH=CH— in alkenyl depends on a position of a double bond. A trans configuration is preferred in alkenyl having a double bond in an odd-numbered position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$. A cis configuration is preferred in alkenyl having a double bond in an even-numbered position, such as —CH$_2$CH=CHCH$_3$, —CH$_2$CH=CHC$_2$H$_5$ and —CH$_2$CH=CHC$_3$H$_7$. An alkenyl compound having the preferred configuration has a high maximum temperature or a wide temperature range of the liquid crystal phase. The detailed description is found in Mol. Cryst. Liq. Cryst., 1985, 131, 109 and Mol. Cryst. Liq. Cryst., 1985, 131, 327.

Preferred examples of alkenyl in which arbitrary hydrogen is replaced by fluorine are 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples are 2,2-difluorovinyl and 4,4-difluoro-3-butenyl for decreasing the viscosity.

Ring C and ring D are independently 1,4-cyclohexylene, 1,4-phenylene, 2-fluoro-1,4-phenylene, 3-fluoro-1,4-phenylene or 2,5-difluoro-1,4-phenylene, two of arbitrary ring C when r is 2 or more may be identical or different. Preferred ring C and ring D are 1,4-phenylene or 3-fluoro-1,4-phenylene for increasing the optical anisotropy, and 1,4-cyclohexylene for decreasing the viscosity.

$Z^{11}$ is independently a single bond, ethylene or —COO— or —OCO—, and two of arbitrary $Z^{11}$ when r is 2 or more may be identical or different. Preferred $Z^{11}$ is a single bond for decreasing the viscosity.

Compounds represented by formula (5) are preferably represented by formulas (5-1) to (5-13).

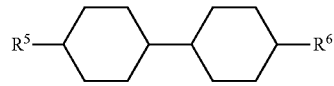 (5-1)

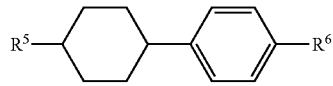 (5-2)

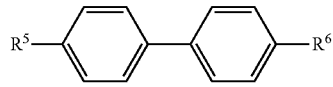 (5-3)

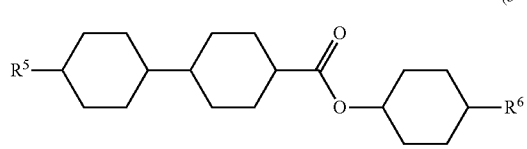 (5-4)

 (5-5)

 (5-6)

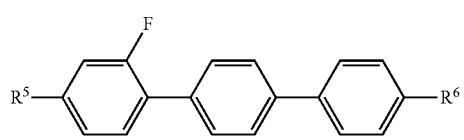 (5-7)

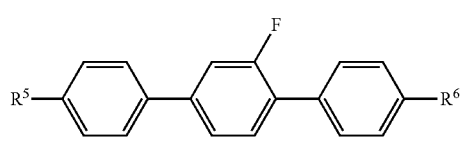 (5-8)

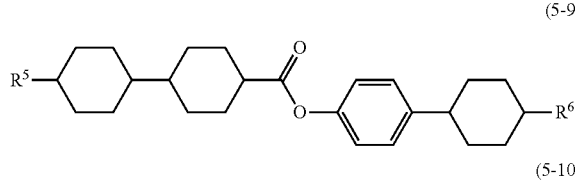 (5-9)

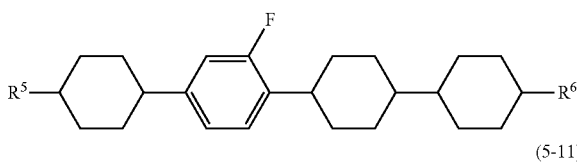 (5-10)

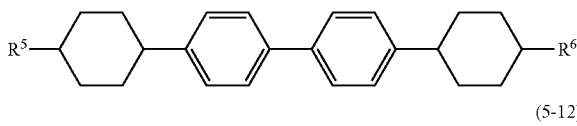 (5-11)

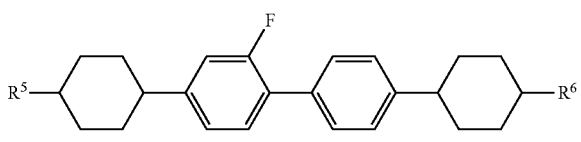 (5-12)

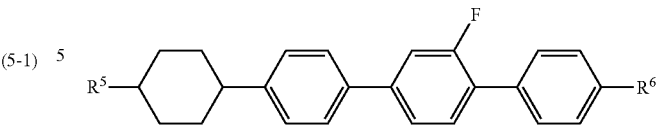 (5-13)

In formulas (5-1) to (5-13), $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Compounds represented by formulas (5-1) to (5-3) have a low viscosity, compounds represented by formulas (5-4) to (5-8) have a high clearing point, and compounds represented by formulas (5-9) to (5-13) have a significantly high clearing point.

The liquid crystal composition of the invention is generally prepared by a publicly known method, for example, a method for dissolving necessary components under a high temperature, or the like.

6 Composition Having Optically Isotropic Liquid Crystal Phase 6.1 Formulation of Composition Having Optically Isotropic Liquid Crystal Phase A sixth embodiment of the invention is a composition containing achiral component T and the chiral agent, and is the liquid crystal composition that can be used in the optical device to be driven in the optically isotropic liquid crystal phase. Achiral component T contains component A including the compound represented by formula (1) and as the addition component the compounds represented by formula (2) or (3). Achiral component T contains, in addition to component A, the compound selected from the group of the fourth component represented by formula (4), and the fifth component represented by formula (5), as required. The liquid crystal composition exhibits the optically isotropic liquid crystal phase.

The compound represented by formula (1) has a high clearing point, a large dielectric anisotropy and a large refractive index anisotropy. Therefore, the content may be approximately 0.5 to approximately 50% by weight, and is preferably, approximately 1 to approximately 30% by weight, further preferably, approximately 5 to approximately 20% by weight, based on the total weight of component T.

The compound represented by formula (2) has a good compatibility, a large dielectric anisotropy and a large refractive index anisotropy. Therefore, the content may be approximately 0.5 to approximately 90% by weight, and is preferably, approximately 5 to approximately 70% by weight, further preferably, approximately 10 to approximately 50% by weight, based on the total weight of component T.

The compound represented by formula (3) has a relatively high clearing point, a large dielectric anisotropy and a large refractive index anisotropy. Therefore, the content may be approximately 0.5 to approximately 90% by weight, and is preferably, approximately 5 to approximately 70% by weight, further preferably, approximately 10 to approximately 50% by weight, based on the total weight of component T.

Preferred content of the fourth component represented by formula (4) and the fifth component represented by formula (5) is as described above.

The chiral agent is preferably contained by approximately 1 to approximately 40% by weight, further preferably, approximately 3 to approximately 25% by weight, most preferably, approximately 5 to approximately 15% by weight, based on the total weight of the liquid crystal composition. A liquid crystal composition containing the chiral agent in the range easily has the optically isotropic liquid crystal phase, and thus the range is preferred.

One kind or two or more kinds of the chiral agents may be contained in the liquid crystal composition.

6.2 Chiral Agent

The chiral agent contained in the optically isotropic liquid crystal composition is an optically active compound, and as the chiral agent, preferable is a compound having a large helical twisting power. In the compound having the large helical twisting power, an amount of addition required for obtaining a desired pitch can be reduced. Therefore a rise in the driving voltage can be suppressed, and the compound is advantageous in practical use. Specifically, compounds represented by formulas (K1) to (K5) as described below are preferred.

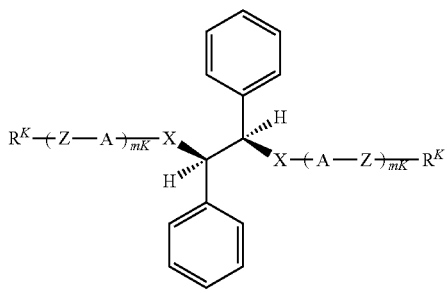
(K1)

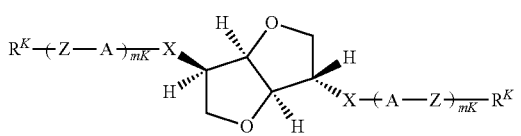
(K2)

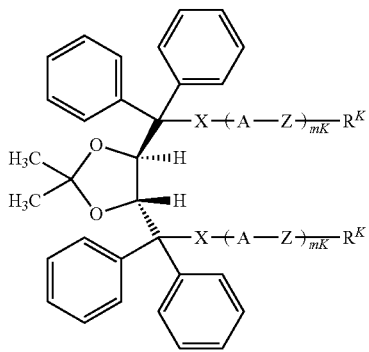
(K3)

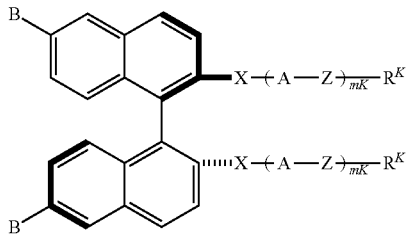
(K4)

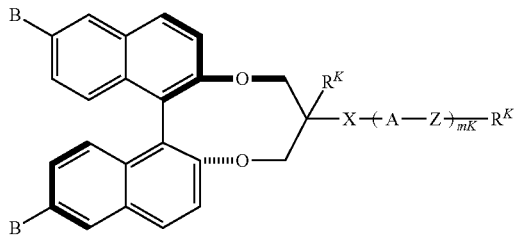
(K5)

In formulas (K1) to (K5), $R^K$ is independently hydrogen, halogen, —C≡N, —N═C═O, —N═C═S or alkyl having 1 to 20 carbons, arbitrary —CH$_2$— in the alkyl may be replaced by —O—, —S—, —COO— or —OCO—, arbitrary —CH$_2$—CH$_2$— in the alkyl may be replaced by —CH═CH—, —CF═CF— or —C≡C—, and arbitrary hydrogen in the alkyl may be replaced by halogen; A is independently an aromatic or non-aromatic three-membered to eight-membered ring, or a condensed ring having 9 or more carbons, arbitrary hydrogen of the rings may be replaced by halogen, alkyl or haloalkyl each having 1 to 3 carbons, —CH$_2$— may be replaced by —O—, —S— or —NH—, and —CH═ may be replaced by —N═; B is independently hydrogen, halogen, alkyl having 1 to 3 carbons, haloalkyl having 1 to 3 carbons, an aromatic or non-aromatic three-membered to eight-membered ring, or a condensed ring having 9 or more carbons, arbitrary hydrogen of the rings may be replaced by halogen, alkyl or haloalkyl each having 1 to 3 carbons, —CH$_2$— may be replaced by —O—, —S— or —NH—, and —CH═ may be replaced by —N═; Z is independently a single bond or alkylene having 1 to 8 carbons, but arbitrary —CH$_2$— may be replaced by —O—, —S—, —COO—, —OCO—, —CSO—, —OCS—, —N═N—, —CH═N— or —N═CH—, arbitrary —CH$_2$—CH$_2$— in the alkyl may be replaced by —CH═CH—, —CF═CF— or and arbitrary hydrogen may be replaced by halogen; X is a single bond, —COO—, —OCO—, —CH$_2$O—, —OCH$_2$—, —CF$_2$O—, —OCF$_2$— or —CH$_2$CH$_2$—; and mK is 1 to 4.

Among the compounds, the chiral agent to be added to the liquid crystal composition include preferably compounds represented by formula (K2-1) to formula (K2-8) included in formula (K2), and compounds represented by formula (K4-1) to formula (K4-6) included in formula (K4), further preferably, compounds represented by formula (K5-1) to formula (K5-3) included in formula (K5), still further preferably, compounds represented by formula (K4-1) to formula (K4-6) and formula (K5-1) to formula (K5-3).

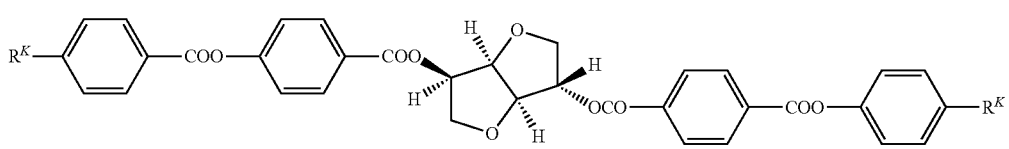
(K2-1)

-continued
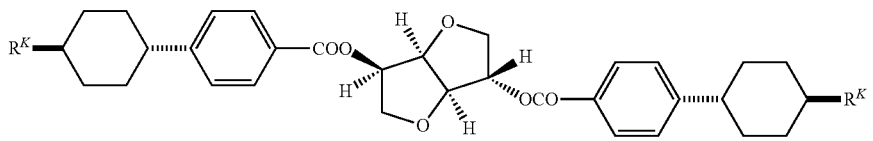
(K2-2)
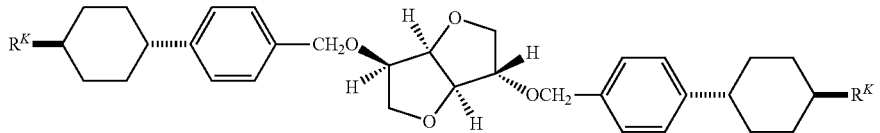
(K2-3)
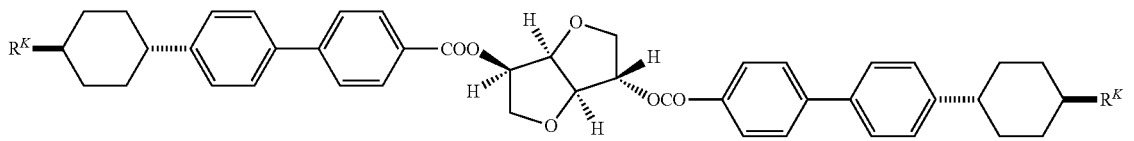
(K2-4)
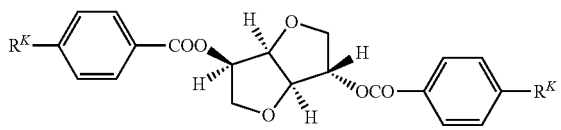
(K2-5)
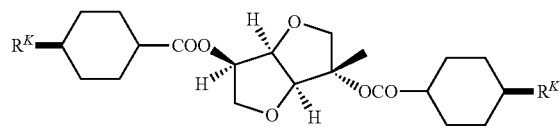
(K2-6)
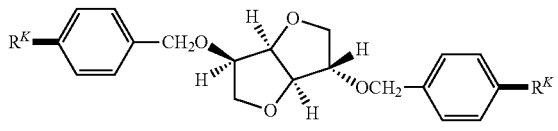
(K2-7)
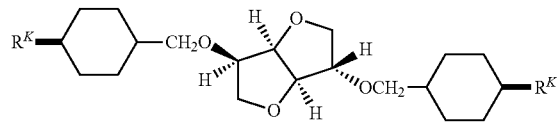
(K2-8)
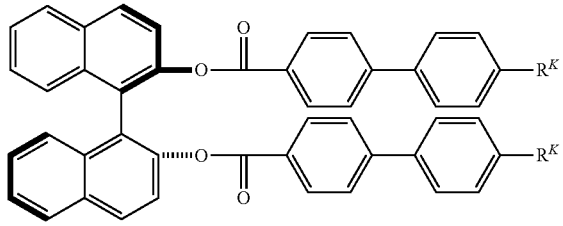
(K4-1)
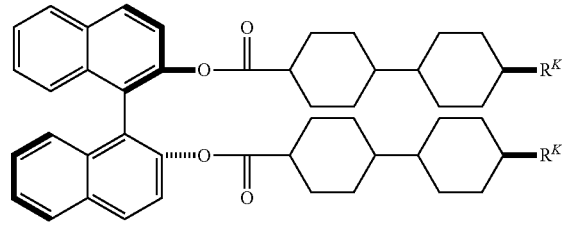
(K4-2)
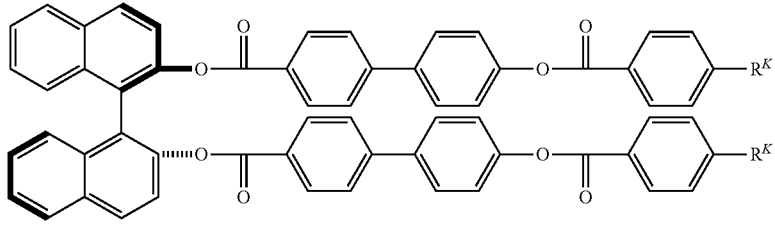
(K4-3)
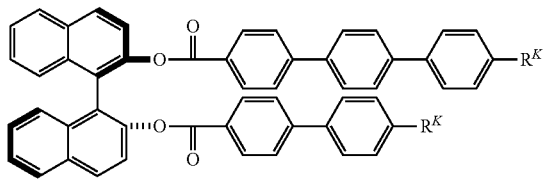
(K4-4)
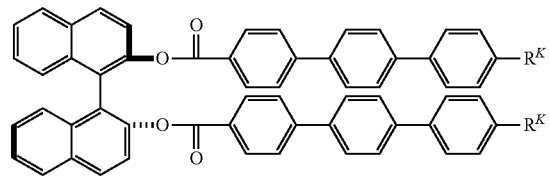
(K4-5)

-continued (K4-6)
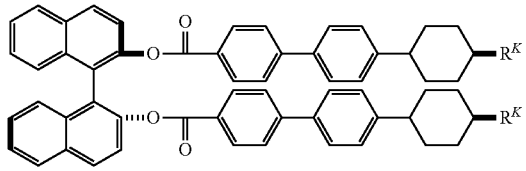

(K5-1)
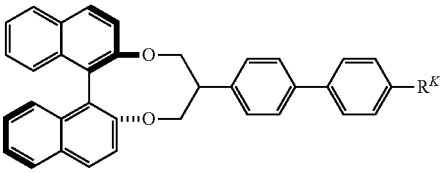

(K5-2)
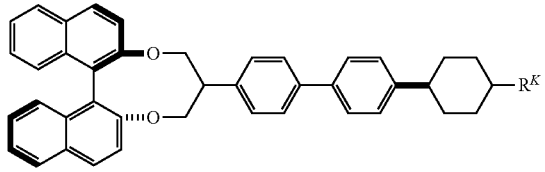

(K5-3)
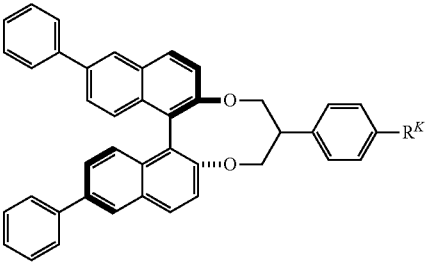

wherein $R^K$ is independently alkyl having 3 to 10 carbons, alkylic —$CH_2$— adjacent to a ring may be replaced by —O—, and arbitrary —$CH_2$—$CH_2$— may be replaced by —CH=CH—.

6.3 Optically Isotropic Liquid Crystal Phase

An expression "liquid crystal composition has optical isotropy" means that the liquid crystal composition shows the optical isotropy macroscopically because alignment of liquid crystal molecules is isotropic, in which liquid crystal order is present microscopically. "Pitch based on the liquid crystal order that the liquid crystal composition microscopically has (hereinafter, occasionally referred to as a pitch)" is preferably approximately 700 nanometers or less, further preferably, approximately 500 nanometers or less, most preferably, approximately 350 nanometers or less.

Herein, "non-liquid crystal isotropic phase" means a generally defined isotropic phase, more specifically, a disordered phase, and an isotropic phase in which, even if an area in which a local order parameter is not zero is produced, the area is caused by a fluctuation. For example, the isotropic phase exhibited on a side of a higher temperature of the nematic phase corresponds to the non-liquid crystal isotropic phase herein. A similar definition is applied to chiral liquid crystals herein. Then, "optically isotropic liquid crystal phase" herein represents a phase that exhibits the optically isotropic liquid crystal phase, and not by the fluctuation. One example includes a phase that exhibits a platelet texture (blue phase in a narrow sense).

In the optically isotropic liquid crystal composition of the invention, the platelet texture typical to the blue phase is occasionally not observed under observation by means of a polarizing microscope, although the liquid crystal composition has the optically isotropic phase. Then, the phase that exhibits the platelet texture is herein referred to as the blue phase, and the optically isotropic liquid crystal phase including the blue phase is referred to as the optically isotropic liquid crystal phase. More specifically, the blue phase is included in the optically isotropic liquid crystal phase.

In general, the blue phases are classified into three kinds, blue phase I, blue phase II and blue phase III, all of the three kinds of blue phases are optically active, and isotropic. In the blue phase of blue phase I or blue phase II, two or more kinds of diffracted light resulting from Bragg reflection from different lattice planes are observed. The blue phase is generally observed between the non-liquid crystal isotropic phase and a chiral nematic phase.

"State in which the optically isotropic liquid crystal phase does not show diffracted light having two or more colors" means that the optically isotropic liquid crystal phase has almost monochrome in everywhere in which the platelet texture to be observed in blue phase I and blue phase II is not observed. In the optically isotropic liquid crystal phase that shows no diffracted light having two or more colors, uniformity of contrast in the plane is unnecessary.

The optically isotropic liquid crystal phase that shows no diffracted light having two or more colors has advantages that intensity of reflected light by Bragg reflection is suppressed, or reflection is shifted to a side of a lower wavelength.

Moreover, in a liquid crystal material that reflects visible light, color may occasionally become a problem when the liquid crystal material is utilized in the form of the display device. However, in the liquid crystals that show no diffracted light having two or more colors, a reflection wavelength is shifted to a side of a lower wavelength. Therefore, reflection of visible light can be caused to disappear by a pitch longer than a pitch of the blue phase in a narrow sense (phase that exhibits the platelet texture).

The optically isotropic liquid crystal composition of the invention can be obtained by adding the chiral agent to the composition having the nematic phase. On the occasion, the chiral agent is preferably added in the concentration in which the pitch becomes approximately 700 nanometers or less. In addition, the composition having the nematic phase contains the compound represented by formula (1), and as required, any other component. The optically isotropic liquid crystal composition of the invention also has the chiral nematic phase, and can also be obtained by adding the chiral agent to the composition having no optically isotropic liquid crystal phase. In addition, the composition having the chiral nematic phase and no optically isotropic liquid crystal phase contains the compound represented by formula (1), the optically active compound, and as required, any other component. On the occasion, the optically active compound is added in the concentration in which the pitch becomes approximately 700 nanometers or more in order to avoid exhibition of the optically isotropic liquid crystal phase. Herein, as the optically active compound to be added, compounds represented by formulas (K1) to (K5) as the compound having a large helical twisting power can be used, further preferably, compounds represented by formulas (K2-1) to (K2-8), formulas (K4-1) to (K4-6) or formulas (K5-1) to (K5-3) can be used. Moreover, the optically active compound to be added may have helical twisting power being not so large. Specific examples of such an optically active compound include a compound to be added to the liquid crystal composition for use in a device to be driven in the nematic phase (a TN mode or an STN mode).

Specific examples of the optically active compound having the helical twisting power being not so large include optically active compounds (Op-1) to (Op-13) as described below.

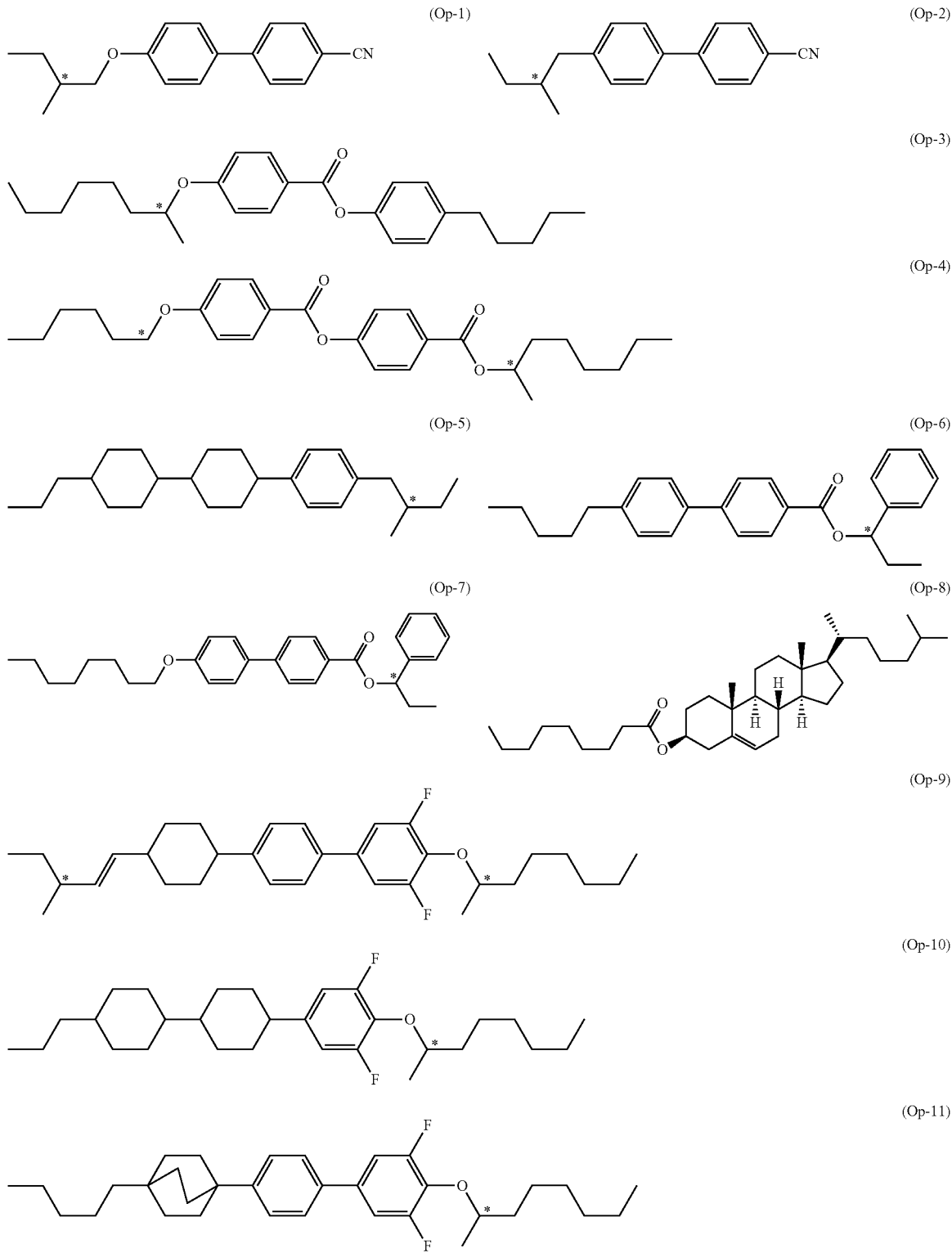

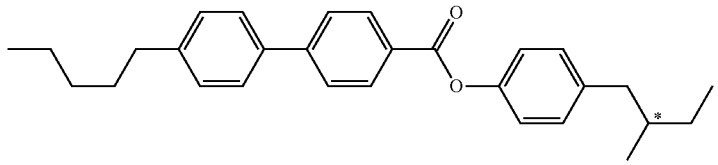
(Op-12)

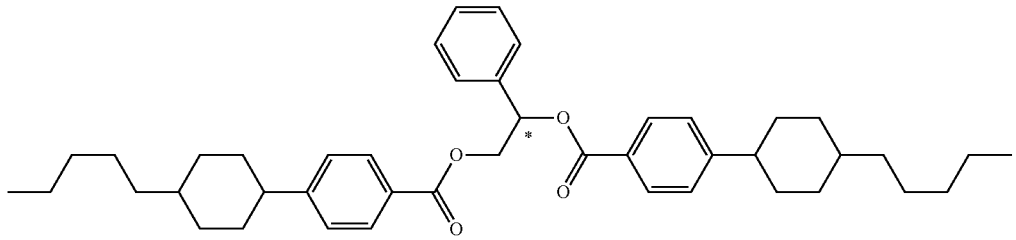
(Op-13)

A temperature range of the optically isotropic liquid crystal composition of the invention can be extended by adding the chiral agent to the liquid crystal composition having a wide temperature range in which the nematic phase or the chiral nematic phase and the isotropic phase coexist, and exhibiting the optically isotropic liquid crystal phase. For example, the composition that exhibits the optically isotropic liquid crystal phase in the wide temperature range can be prepared by mixing a liquid crystal compound having a high clearing point and a liquid crystal compound having a low clearing point to prepare a liquid crystal composition having a wide temperature range in which the nematic phase and the isotropic phase coexist, and adding the chiral agent thereto.

As the liquid crystal composition having the wide temperature range in which the nematic phase or the chiral nematic phase and the isotropic phase coexist, a liquid crystal composition having a difference between a maximum temperature and a minimum temperature in which the chiral nematic phase and the non-liquid crystal isotropic phase coexist is approximately 3 to approximately 150° C. is preferred, and a liquid crystal composition having a difference in the range of approximately 5 to approximately 150° C. is further preferred. Moreover, a compound having a difference between a maximum temperature and a minimum temperature in which the nematic phase and the non-liquid crystal isotropic phase coexist is approximately 3 to approximately 150° C. is preferred.

If an electric field is applied to a liquid crystal medium of the invention in the optically isotropic liquid crystal phase, electric birefringence is caused, but the birefringence does not necessarily result from a Kerr effect.

The electric birefringence in the optically isotropic liquid crystal phase becomes larger as the pitch becomes longer. Therefore, the electric birefringence can be increased by setting a long pitch by adjusting a kind and content of the chiral agent, as long as a demand for other optical characteristics (transmittance, a diffraction wavelength or the like) is satisfied.

6.4 Any Other Component

Any other compound such as a polymer material may be further added to the optically isotropic liquid crystal composition of the invention within the range in which the characteristics of the composition are not adversely affected. The liquid crystal composition of the invention may contain, for example, a dichroic dye and a photochromic compound in addition to the polymer material. Specific examples of the dichroic dye include a merocyanine type, a styryl type, an azo type, an azomethine type, an azoxy type, a quinophthalone type, an anthraquinone type and a tetrazine type.

7. Optically Isotropic Polymer/Liquid Crystal Composite Material

A seventh embodiment of the invention is a composite material of the polymer and the liquid crystal composition containing the compound represented by formula (1) and the chiral agent, and the composite material showing the optical isotropy. The composite material includes the optically isotropic polymer/liquid crystal composite material that can be used for the optical device to be driven in the optically isotropic liquid crystal phase. Such a polymer/liquid crystal composite material is constituted of the polymer and the liquid crystal composition according to any one of items 1 to 31 (liquid crystal composition CLC), for example.

"Polymer/liquid crystal composite material" of the invention is not particularly limited, if the composite material contains both the liquid crystal material and the polymer compound, but may be in a state in which the polymer and the liquid crystal material cause phase separation in a state in which the polymer is not partially or wholly dissolved into the liquid crystal material. In addition, unless otherwise noted, the nematic phase herein means the nematic phase in a narrow sense without including the chiral nematic phase.

The optically isotropic polymer/liquid crystal composite material according to a preferred embodiment of the invention can exhibit the optically isotropic liquid crystal phase in a wide temperature range. Moreover, the polymer/liquid crystal composite material according to a preferred embodiment of the invention has a significantly high response speed. Moreover, the polymer/liquid crystal composite material according to a preferred embodiment of the invention can be suitably used for the optical device such as the display device, based on the effects.

7.2 Polymer

The composite material of the invention can be manufactured by mixing the optically isotropic liquid crystal composition and the polymer obtained by allowing polymerization in advance, but is preferably manufactured by mixing a low molecular weight monomer, macro monomer, oligomer or the like (hereinafter, collectively referred to as "monomer or the like") to be the polymer material, and the liquid crystal composition CLC, and then performing a polymerization reaction in the mixture. The mixture containing the monomer or the like and the liquid crystal composition is referred to as "polymerizable monomer/liquid crystal mixture" herein. "Polymerizable monomer/liquid crystal mixture" may contain, as required, a polymerization initiator, a curing agent, a catalyst, a stabilizer, a dichroic dye or a photochromic compound as described later in the range in which advantageous effects of the invention are not adversely affected. For example, the polymerizable monomer/liquid crystal mixture of the invention may contain, as required, approximately 0.1 to approximately 20 parts by weight of the polymerization initiator based on 100 parts by weight of the polymerizable monomer.

A polymerization temperature includes preferably temperature at which the polymer/liquid crystal composite material shows a high transparency and isotropy. The polymerization temperature includes further preferably temperature at which the mixture of the monomer and the liquid crystal material exhibits the isotropic phase or the blue phase, and polymerization is terminated in the isotropic phase or the optically isotropic liquid crystal phase. More specifically, the polymerization temperature includes preferably temperature at which, after polymerization, the polymer/liquid crystal composite material does not substantially scatter light on a side of a wavelength longer than a wavelength of visible light, and exhibits an optically isotropic state.

As a raw material of the polymer that constitutes the composite material of the invention, a low molecular weight monomer, macro monomer or oligomer can be used, for example. A raw material monomer of the polymer herein is used in the meaning including the low molecular weight monomer, macro monomer or oligomer. Moreover, the polymer obtained preferably has a three-dimensional crosslinking structure, and therefor a polyfunctional monomer having two or more polymerizable functional groups is preferably used as the raw material monomer of the polymer. The polymerizable functional group is not particularly limited. Specific examples include an acrylic group, a methacrylic group, a glycidyl group, an epoxy group, an oxetanyl group and a vinyl group, preferably, an acrylic group and a methacrylic group from a viewpoint of a rate of polymerization. Among the raw material monomers of the polymer, content of a monomer having two or more polymerizable functional groups in the range of approximately 10% by weight or more in the monomer is preferred because a high transparency and isotropy are easily exhibited in the composite material of the invention.

In order to obtain a suitable composite material, the polymer has preferably a mesogen moiety, and a raw material monomer having the mesogen moiety can be partially or wholly used as the raw material monomer of the polymer.

7.2.1 Monofunctional or Bifunctional Monomer Having Mesogen Moiety

A monofunctional or bifunctional monomer having the mesogen moiety is not particularly limited structurally, but specific examples include a compound represented by formula (M1) or formula (M2) as described below.

$$R^a\text{—}Y\text{-}(A^M\text{-}Z^M)_{m1}\text{-}A^M\text{-}Y\text{—}R^b \quad (M1)$$

$$R^b\text{—}Y\text{-}(A^M\text{-}Z^M)_{m1}\text{-}A^M\text{-}Y\text{—}R^b \quad (M2)$$

(M3-1)

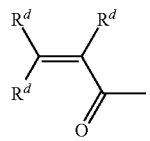
(M3-2)

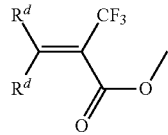
(M3-3)

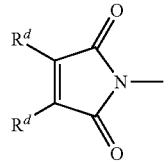
(M3-4)

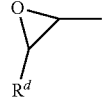
(M3-5)

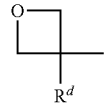
(M3-6)

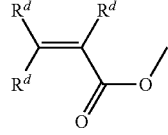
(M3-7)

In formula (M1), $R^a$ is hydrogen, halogen, —C≡N, —N═C═O, —N═C═S or alkyl having 1 to 20 carbons, arbitrary —CH$_2$— in the alkyl may be replaced by —O—, —S—, —CO—, —COO— or —OCO—, arbitrary —CH$_2$—CH$_2$— in the alkyl may be replaced by —CH═CH—, —CF═CF— or —C≡C—, and arbitrary hydrogen in the alkyl may be replaced by halogen or —C≡N. $R^b$ is each independently a polymerizable group represented by formula (M3-1) to formula (M3-7).

Preferred $R^a$ is hydrogen, halogen, —C≡N, —CF$_3$, —CF$_2$H, —CFH$_2$, —OCF$_3$, —OCF$_2$H, alkyl having 1 to 20 carbons, alkoxy having 1 to 19 carbons, alkenyl having 2 to 21 carbons, and alkynyl having 2 to 21 carbons. Particularly preferred $R^a$ is —C≡N, alkyl having 1 to 20 carbons, and alkoxy having 1 to 19 carbons.

In formula (M2), $R^b$ is each independently a polymerizable group represented by formula (M3-1) to formula (M3-7).

Herein, $R^d$ in formulas (M3-1) to (M3-7) is each independently hydrogen, halogen or alkyl having 1 to 5 carbons, and arbitrary hydrogen in the alkyl may be replaced by halogen. Preferred $R^d$ is hydrogen, halogen and methyl. Particularly preferred $R^d$ is hydrogen, fluorine and methyl.

A monomer represented by formula (M3-2), formula (M3-3), formula (M3-4) or formula (M3-7) is suitably polymerized according to radical polymerization. A monomer represented by formula (M3-1), formula (M3-5) or formula (M3-6) is suitably polymerized according to cationic polymerization. Any polymerization progresses in the form of living polymerization, and therefore polymerization starts if a small amount of radicals or cation active species is generated in a reaction system. A polymerization initiator can be used in order to accelerate generation of active species. For example, light or heat can be used for generation of active species.

In formulas (M1) and (M2), $A^M$ is each independently an aromatic or non-aromatic five-membered ring or six-membered ring, or a condensed ring having 9 or more carbons, and —$CH_2$— in the ring may be replaced by —O—, —S—, —NH— or —$NCH_3$—, —CH= in the ring may be replaced by —N=, and a hydrogen atom on the ring may be replaced by halogen, and alkyl or alkyl halide each having 1 to 5 carbons. Specific examples of preferred $A^M$ include 1,4-cyclohexylene, 1,4-cyclohexenylene, 1,4-phenylene, naphthalene-2,6-diyl, tetrahydronaphthalene-2,6-diyl, fluorene-2,7-diyl or bicyclo[2.2.2]octane-1,4-diyl, arbitrary —$CH_2$— in the rings may be replaced by —O—, arbitrary —CH= may be replaced by —N=, and arbitrary hydrogen in the rings may be replaced by halogen, alkyl having 1 to 5 carbons or alkyl halide having 1 to 5 carbons.

In consideration of stability of the compound, —$CH_2$—O—$CH_2$—O— in which oxygen and oxygen are not adjacent is preferred to —$CH_2$—O—O—$CH_2$— in which oxygen and oxygen are adjacent. A similar explanation is applied also to sulfur.

Among types of $A^M$, particularly preferred $A^M$ is 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalene-2,6-diyl, tetrahydronaphthalene-2,6-diyl, fluorene-2,7-diyl, 9-methylfluorene-2,7-diyl, 1,3-dioxane-2,5-diyl, pyridine-2,5-diyl and pyrimidine-2,5-diyl. In addition, with regard to a configuration of 1,4-cyclohexylene and 1,3-dioxane-2,5-diyl described above, trans is preferred to cis.

Then, 2-fluoro-1,4-phenylene is structurally identical with 3-fluoro-1,4-phenylene, and specific examples are not shown for the latter. The rule is also applied to a relationship between 2,5-difluoro-1,4-phenylene and 3,6-difluoro-1,4-phenylene, or the like.

In formulas (M1) and (M2), Y is each independently a single bond or alkylene having 1 to 20 carbons. In the alkylene, arbitrary —$CH_2$— may be replaced by —O— or —S—, and arbitrary —$CH_2$—$CH_2$— in the alkyl may be replaced by —CH=CH—, —C≡C—, —COO— or —OCO—. Preferred Y is a single bond, —$(CH_2)_{m2}$—, —$O(CH_2)_{m2}$— and —$(CH_2)_{m2}O$— (In the formulas, m2 is an integer from 1 to 20.). Particularly preferred Y is a single bond, —$(CH_2)_{m2}$—, —$O(CH_2)_{m2}$— and —$(CH_2)_{m2}O$— (In the formulas, m2 is an integer from 1 to 10.). In consideration of stability of the compound, —Y—$R^a$ and —Y—$R^b$ preferably does not have —O—O—, —O—S—, —S—O— or —S—S— in the groups.

In formulas (M1) and (M2), $Z^M$ is each independently a single bond, —$(CH_2)_{m3}$—, —$O(CH_2)_{m3}$—, —$(CH_2)_{m3}O$—, —$O(CH_2)_{m3}O$—, —CH=CH—, —C≡C—, —COO—, —OCO—, —$(CF_2)_2$—, —$(CH_2)_2$—COO—, —OCO—$(CH_2)_2$—, —CH=CH—COO—, —OCO—CH=CH—, —C≡C—COO—, —OCO—C≡C—, —CH=CH—$(CH_2)_2$—, —$(CH_2)_2$—CH=CH—, —CF=CF—, —C≡C—CH=CH—, —CH=CH—C≡C—, —$OCF_2$—$(CH_2)_2$—, —$(CH_2)_2$—$CF_2O$—, —$OCF_2$— or —$CF_2O$— (In the formulas, m3 is an integer from 1 to 20.).

Preferred $Z^M$ is a single bond, —$(CH_2)_{m3}$—, —$O(CH_2)_{m3}$—, —$(CH_2)_{m3}O$—, —CH=CH—, —C≡C—, —COO—, —OCO—, —$(CH_2)_2$—COO—, —OCO—$(CH_2)_2$—, —CH=CH—COO—, —OCO—CH=CH—, —$OCF_2$— and —$CF_2O$—.

In formulas (M1) and (M2), m1 is an integer from 1 to 6. Preferred m1 is an integer from 1 to 3. When m1 is 1, the monomer is a two-ring compound having two rings such as a six-membered ring. When m1 is 2 and 3, the monomers are a three-ring compound and a four-ring compound, respectively. For example, two of $A^M$ when m1 is 1 may be identical or different. For example, three of $A^M$ (or two of $Z^M$) when m1 is 2 may also be identical or different. When m1 is 3 to 6, a same rule is applied. A same rule is also applied to $R^a$, $R^b$, $R^d$, $Z^M$, $A^M$ and Y.

If compound (M1) represented by formula (M1) and compound (M2) represented by formula (M2) contain an isotope such as $^2H$ (deuterium) and $^{13}C$ in an amount higher than an amount of natural abundance, compound (M1) and compound (M2) have characteristics in a manner similar to compound (M1) and compound (M2) each having the isotope in the amount of natural abundance, and therefore compound (M1) and compound (M2) containing even a higher amount of isotope can be preferably used.

Further preferred examples of compound (M1) and compound (M2) include compounds (M1-1) to (M1-41) and compounds (M2-1) to (M2-27) as represented by formulas (M1-1) to (M1-41) and (M2-1) to (M2-27), respectively. In the compounds, meanings of $R^a$, $R^b$, $R^d$, $Z^M$ and Y are identical with the meanings in formulas (M1) and (M2) as described in the embodiment of the invention.

A partial structure as described below in compounds (M1-1) to (M1-41) and (M2-1) to (M2-27) will be explained. Partial structure (a1) represents 1,4-phenylene in which arbitrary hydrogen is replaced by fluorine. Partial structure (a2) represents 1,4-phenylene in which arbitrary hydrogen may be replaced by fluorine. Partial structure (a3) represents 1,4-phenylene in which arbitrary hydrogen may be replaced by either fluorine or methyl. Partial structure (a4) represents fluorene in which hydrogen on 9-position may be replaced by methyl.

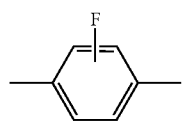

(a1)

(a2)

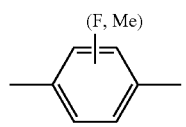

(a3)

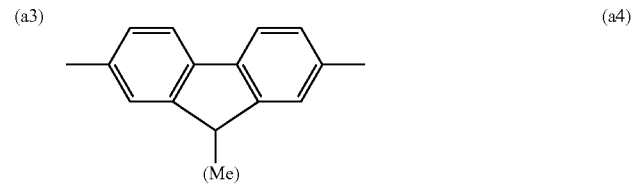

(a4)

-continued
(M1-1)
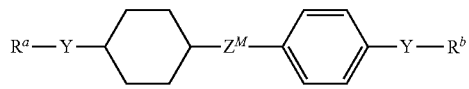
(M1-2)
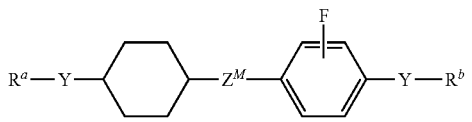
(M1-3)
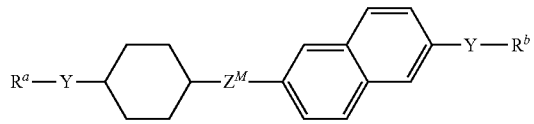
(M1-4)
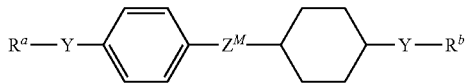
(M1-5)
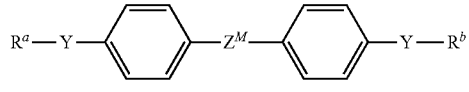
(M1-6)
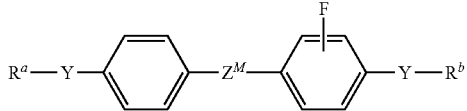
(M1-7)
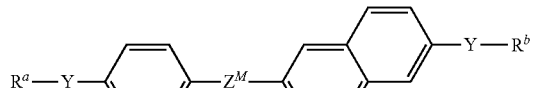
(M1-8)
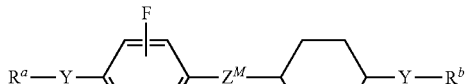
(M1-9)
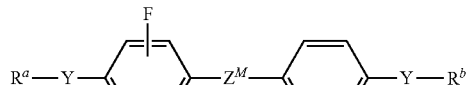
(M1-10)
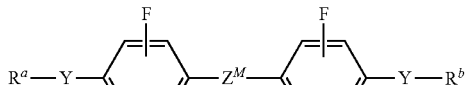
(M1-11)
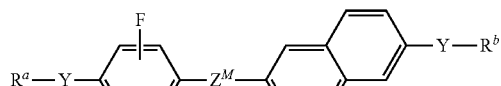
(M1-12)
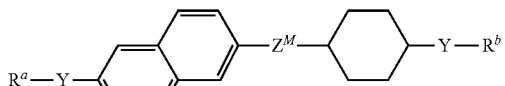
(M1-13)
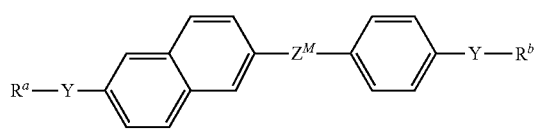
(M1-14)
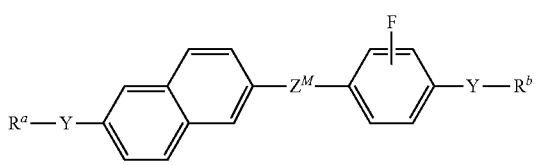
(M1-15)
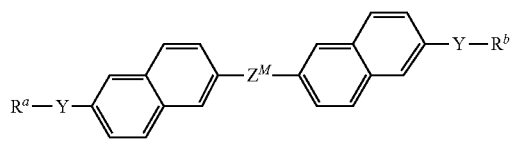
(M1-16)
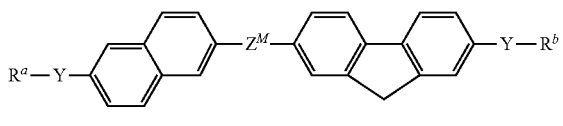
(M1-17)
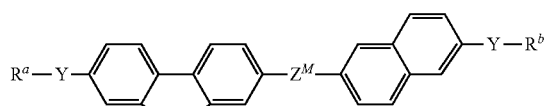
(M1-18)
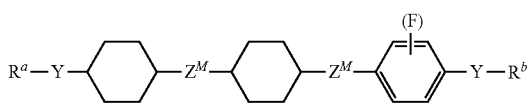
(M1-19)
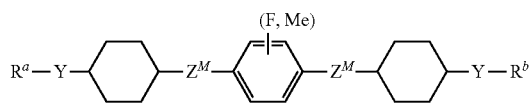
(M1-20)
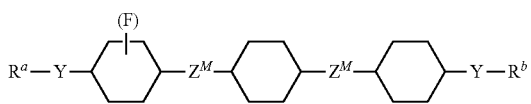
(M1-21)
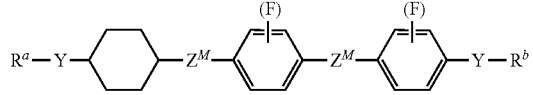
(M1-22)
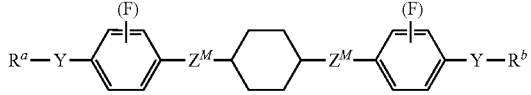

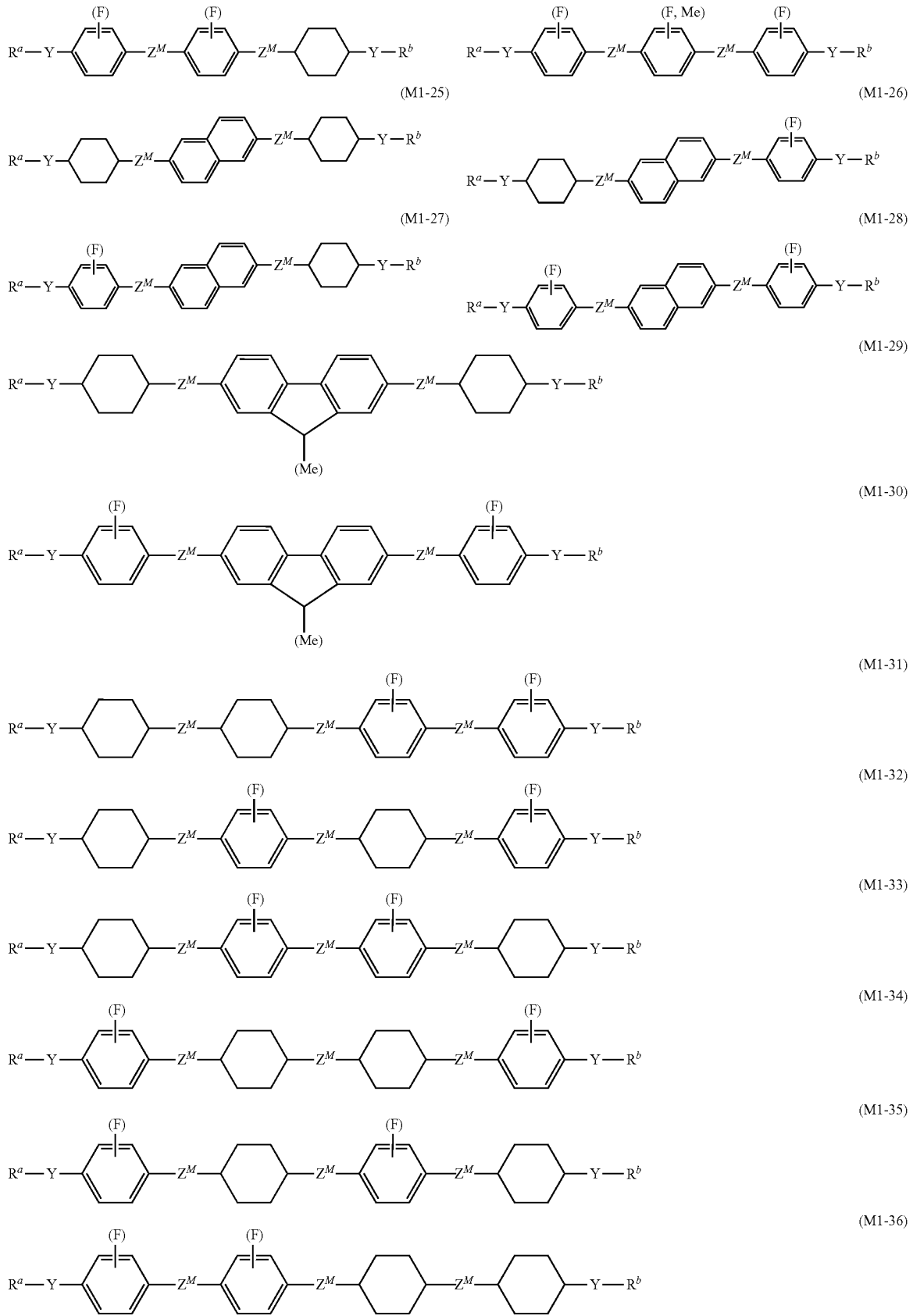

(M1-37)
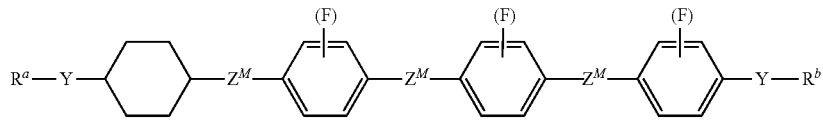
(M1-38)
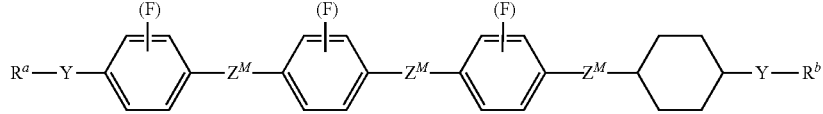
(M1-39)
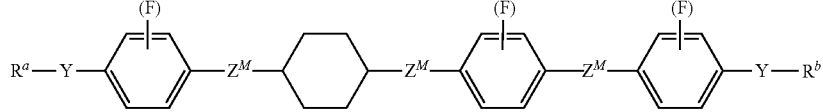
(M1-40)
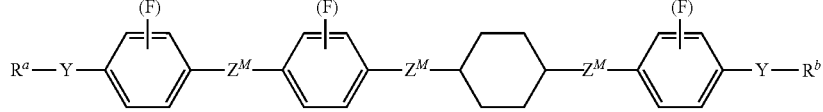
(M1-41)
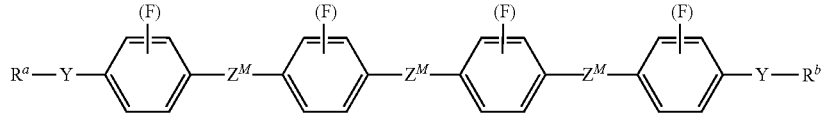
(M2-1)
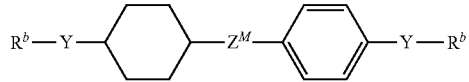
(M2-2)
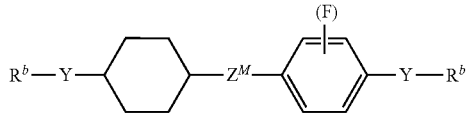
(M2-3)
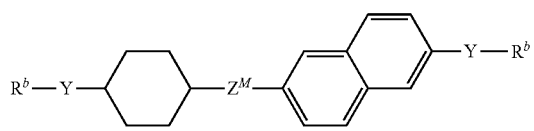
(M2-4)
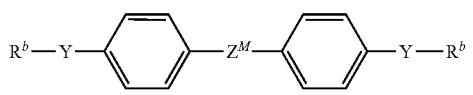
(M2-5)
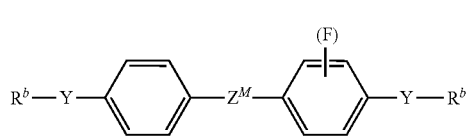
(M2-6)
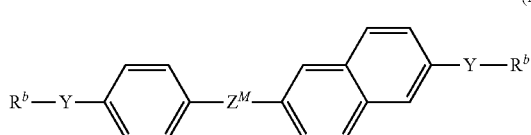
(M2-7)
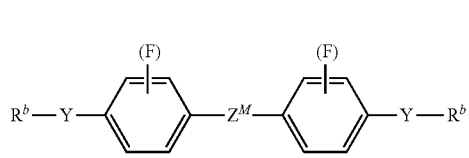
(M2-8)
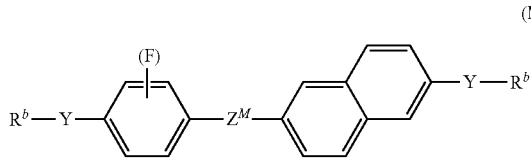
(M2-9)
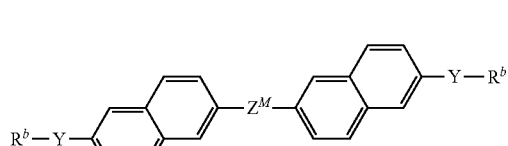
(M2-10)
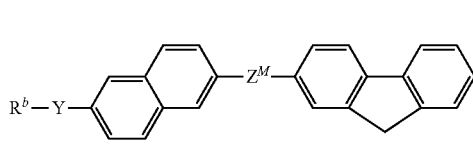
(M2-11)
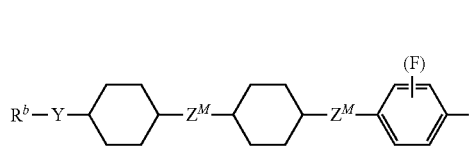
(M2-12)
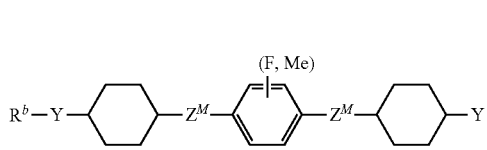

-continued
(M2-13)
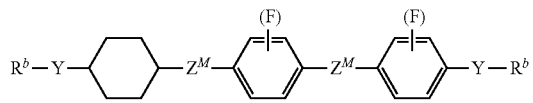
(M2-14)
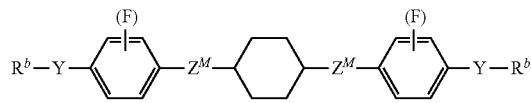
(M2-15)
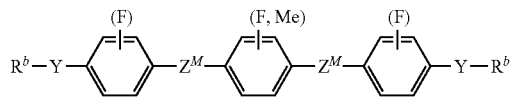
(M2-16)
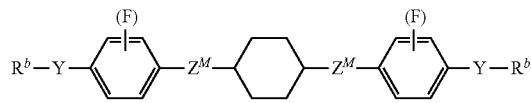
(M2-17)
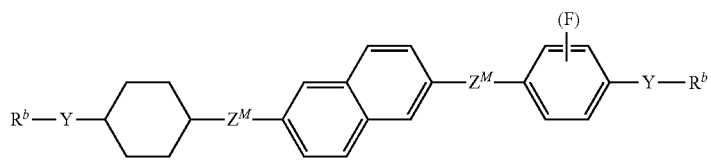
(M2-18)
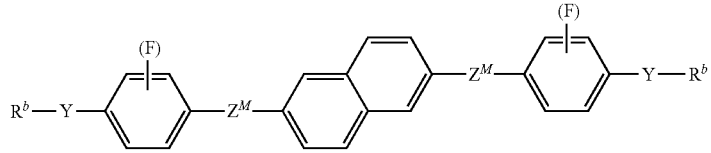
(M2-19)
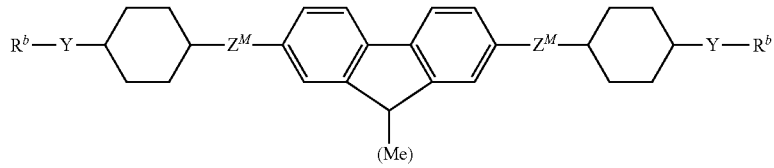
(M2-20)
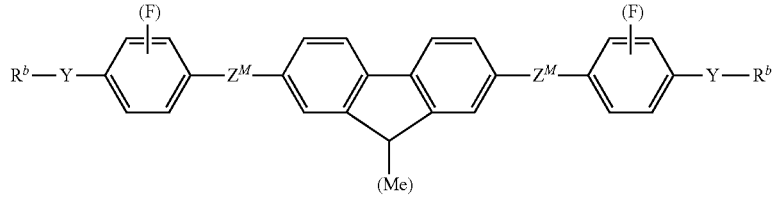
(M2-21)
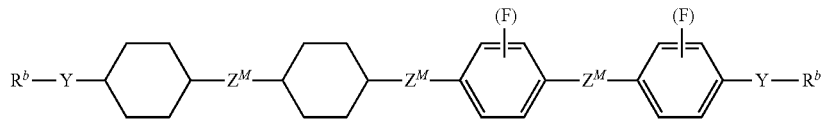
(M2-22)
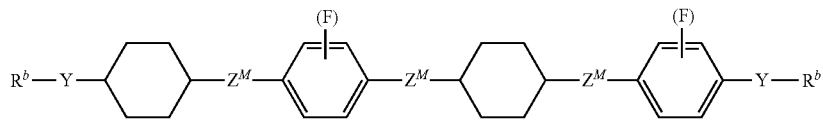
(M2-23)
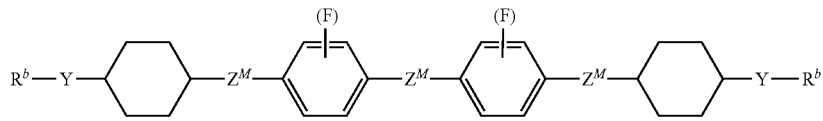
(M2-24)
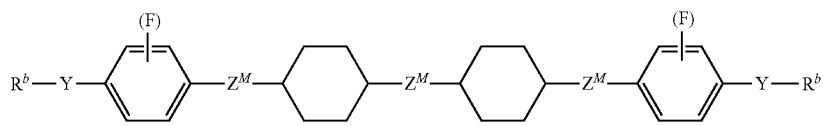

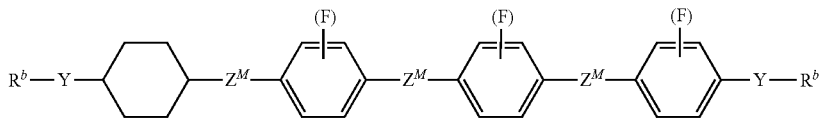

(M2-25)

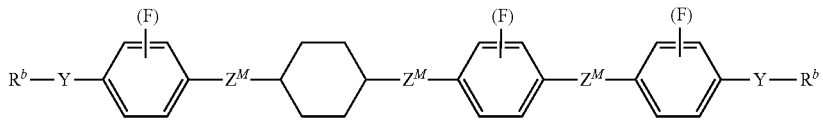

(M2-26)

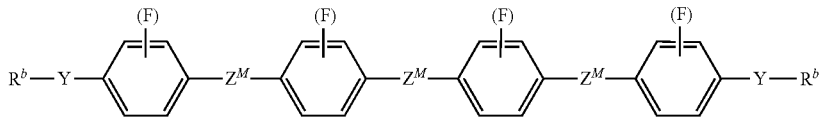

(M2-27)

A polymerizable compound other than the monomer having no mesogen moiety, and monomer (M1) and (M2) both having the mesogen moiety as described above can be used as required.

For the purpose of optimizing the optical isotropy of the polymer/liquid crystal composite material of the invention, a monomer having a mesogen moiety and three or more polymerizable functional groups can also be used. As the monomer having the mesogen moiety and three or more polymerizable functional groups, a publicly known compound can be suitably used. Specific examples include compounds represented by formulas (M4-1) to (M4-3), further specific examples include compounds described in JP 2000-327632 A, JP 2004-182949 A and JP 2004-59772 A. However, in formulas (M4-1) to (M4-3), $R^b$, $Z^M$, Y and (F) show meanings identical with the meanings as described above.

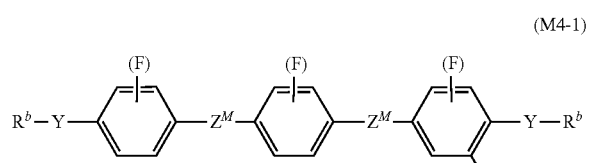

(M4-1)

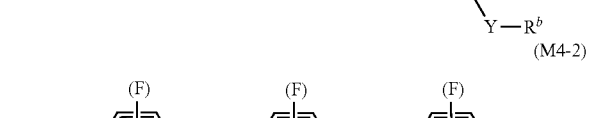

(M4-2)

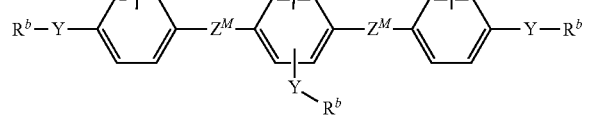

(M4-3)

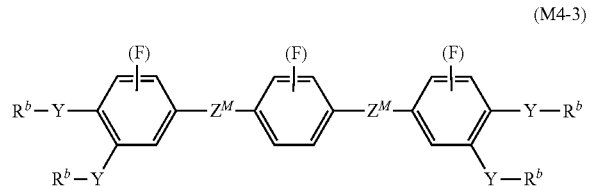

7.2.2 Monomer Having Polymerizable Functional Group and No Mesogen Moiety

Specific examples of monomers having a polymerizable functional group and no mesogen moiety include straight-chain or branched acrylate having 1 to 30 carbons, straight-chain or branched diacrylate having 1 to 30 carbons, or as a monomer having three or more functional groups, glycerol propoxylate (1PO/OH) triacrylate, pentaerythritol propoxylate triacrylate, pentaerythritol triacrylate, trimethylolpropane ethoxylated triacrylate, trimethylolpropane propoxylate triacrylate, trimethylolpropane triacrylate, di(trimethylolpropane) tetraacrylate, pentaerythritol tetraacrylate, di(pentaerythritol) pentaacrylate, di(pentaerythritol) hexaacrylate and trimethylolpropane triacrylate, but are not limited thereto.

7.2.3 Polymerization Initiator

The polymerization reaction in manufacturing the polymer constituting the composite material according to the invention is not particularly limited. For example, photoradical polymerization, thermal radical polymerization, photocationic polymerization or the like is performed.

Specific examples of a photoradical polymerization initiator that can be used in the photoradical polymerization include DAROCUR (registered tradename) 1173 and 4265 (both being trade names, BASF Japan Ltd.) and IRGACURE (registered tradename) 184, 369, 500, 651, 784, 819, 907, 1300, 1700, 1800, 1850 and 2959 (all being trade names, BASF Japan Ltd.).

Specific examples of a preferred initiator for thermal radical polymerization by heat that can be used in the thermal radical polymerization include benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl-2,2'-azobisisobutyrate (MAIB), di-t-butyl peroxide (DTBPO), azobisisobutyronitrile (AIBN) and azobiscyclohexanecarbonitrile (ACN).

Specific examples of a photocationic polymerization initiator that can be used in the photocationic polymerization include diaryliodonium salt (hereinafter, referred to as "DAS") and a triarylsulfonium salt (hereinafter, referred to as "TAS").

Specific examples of DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenyphenyliodonium tetrafluoroborate, 4-methoxyphenyphenyliodonium hexafluorophosphonate, 4-methoxyphenyphenyliodonium hexafluoroarsenate, 4-methoxyphenyphenyliodonium trifluoromethanesulfonate, 4-methoxyphenylphenyliodonium trifluoroacetate and 4-methoxyphenyphenyliodonium p-toluenesulfonate.

An improvement in sensitivity can be achieved by adding a photosensitizer such as thioxanthone, phenothiazine, chlorothioxanthone, xanthone, anthracene, diphenylanthracene and rubrene to DAS.

Specific examples of TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium-p-toluenesulfonate, triphenylsulfonium tetra(pentafluorophenyl)borate, 4-methoxyphenydiphenylsulfonium tetrafluoroborate, 4-methoxyphenydiphenylsulfonium hexafluorophosphonate, 4-methoxyphenydiphenylsulfonium hexafluoroarsenate, 4-methoxyphenyldiphenylsulfonium trifluoromethanesulfonate, 4-methoxyphenyldiphenylsulfonium trifluoroacetate, and 4-methoxyphenydiphenylsulfonium-p-toluenesulfonate.

Specific examples of trade names of the photocationic polymerization initiator include Cyracure (registered tradename) UVI-6990, Cyracure UVI-6974 and Cyracure UVI-6992 (each being a trade name, UCC), Adekaoptomer SP-150, SP-152, SP-170 and SP-172 (each being a trade name, ADEKA Corporation) and Rhodorsil Photoinitiator 2074 (trade name, Rhodia Japan, Ltd.), IRGACURE (registered tradename) 250 (a trade name, BASF Japan Ltd.) and UV-9380C (a trade name, GE Toshiba Silicones Co., Ltd.).

7.2.4 Curing Agent or the Like

In manufacturing the polymer constituting the composite material according to the invention, one kind or two or more kinds of other suitable components, for example, the curing agent, the catalyst and the stabilizer, may be added in addition to the monomer or the like and the polymerization initiator.

As the curing agent, a publicly known latent curing agent that has been used as a curing agent for an epoxy resin so far can be ordinarily used. Specific examples of the latent curing agent for the epoxy resin include an amine curing agent, a novolak resin curing agent, an imidazole curing agent and an acid anhydride curing agent. Specific examples of the amine curing agent include aliphatic polyamine such as diethylenetriamine, triethylenetetramine, tetraethylenepentamine, m-xylenediamine, trimethylhexamethylenediamine, 2-methylpentamethylenediamine and diethylaminopropylamine, alicyclic polyamine such as isophoronediamine, 1,3-bisaminomethylcyclohexane, bis(4-aminocyclohexyl)methane, norbornenediamine, 1,2-diaminocyclohexane and laromine, and aromatic polyamine such as diaminodiphenylmethane, diaminodiphenylethane and metaphenylenediamine.

Specific examples of the novolak resin curing agent include a phenol novolak resin and a bisphenol novolak resin. Specific examples of the imidazole curing agent include 2-methylimidazole, 2-ethylhexylimidazole, 2-phenylimidazole and 1-cyanoethyl-2-phenylimidazolium-trimellitate.

Specific examples of the acid anhydride curing agent include tetrahydrophthalic anhydride, hexahydrophthalic anhydride, methyltetrahydrophthalic anhydride, methylhexahydrophthalic anhydride, methylcyclohexenetetracarboxylic dianhydride, phthalic anhydride, trimellitic anhydride, pyromellitic anhydride and benzophenonetetracarboxylic dianhydride.

Moreover, a curing accelerator for accelerating a curing reaction between a polymerizable compound having a glycidyl group, an epoxy group and an oxetanyl group and the curing agent may be further used. Specific examples of the curing accelerator include tertiary amines such as benzyldimethyl amine, tris(dimethylaminomethyl)phenol and dimethylcyclohexylamine, imidazoles such as 1-cyanoethyl-2-ethyl-4-methylimidazole and 2-ethyl-4-methylimidazole, an organic phosphorus compound such as triphenyl phosphine, quaternary phosphonium salts such as tetraphenylphosphonium bromide, diazabicycloalkenes such as 1,8-diazabicyclo[5.4.0]undecene-7 and an organic acid salt thereof, a quaternary ammonium salt such as tetraethylammonium bromide and tetrabutylammonium bromide, and a boron compound such as boron trifluoride and triphenyl borate. The curing accelerators can be used alone or by mixing two or more kinds.

In order to prevent unwanted polymerization during storage, for example, the stabilizer is preferably added. As the stabilizer, all the compounds known by those skilled in the art can be used. Representative examples of the stabilizer include 4-ethoxyphenol, hydroquinone and butylated hydroxytoluene (BHT).

7.3 Content of Liquid Crystal Composition or the Like

The content of the liquid crystal composition in the polymer/liquid crystal composite material according to the invention is preferably as high as possible, as long as the composite material can exhibit the optically isotropic liquid crystal phase. The reason is that a value of electric birefringence of the composite material of the invention becomes larger as the content of the liquid crystal composition is higher.

In the polymer/liquid crystal composite material of the invention, the content of the liquid crystal composition is preferably in the range of approximately 60 to approximately 99% by weight, further preferably, in the range of approximately 60 to approximately 95% by weight, particularly preferably, in the range of approximately 65 to approximately 95% by weight, based on the composite material. The content of the polymer is preferably in the range of approximately 1 to approximately 40% by weight, further preferably, in the range of approximately 5 to approximately 40% by weight, particularly preferably, in the range of approximately 5 to approximately 35% by weight, based on the composite material. 7.4 Any other component The polymer/liquid crystal composite material of the invention may contain, for example, a dichroic dye and a photochromic compound in the range in which the advantageous effects of the invention are not adversely affected. 8 Optical device An eighth embodiment of the invention is an optical device including the liquid crystal composition or the polymer/liquid crystal composite material (hereinafter, the liquid crystal composition and the polymer/liquid crystal composite material according to the invention may be occasionally referred to generically as the liquid crystal medium) and to be driven in the optically isotropic liquid crystal phase.

The liquid crystal medium is optically isotropic during no application of electric field, but when the electric field is applied, optical anisotropy is caused in the liquid crystal medium to allow optical modulation by the electric field.

Specific examples of a structure of the liquid crystal display device include, as shown in FIG. 1, a structure in which electrode 1 extended from a left side and electrode 2 extended from a right side are alternately arranged in electrodes of a comb-shaped electrode substrate. When a potential difference exists between electrode 1 and electrode 2, a state in which electric fields of two directions, namely, an upward direction and a downward direction on a diagram, can be provided on the comb-shaped electrode substrate as shown in FIG. 1, if attention is paid to one electrode.

Hereafter, the invention will be explained in more detail by way of Examples, but the invention is not limited by the Examples. In addition, unless otherwise noted, "%" is expressed in terms of "% by weight."

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Because a compound obtained was identified on the basis of a nuclear magnetic resonance spectrum obtained by means of $^1$H-NMR analysis, a gas chromatogram obtained by means of gas chromatography (GC) analysis and so forth, analytical methods will be explained first.

$^1$H-NMR Analysis: As a measuring apparatus, DRX-500 (made by Bruker BioSpin Corporation) was used. A sample prepared in Examples and so forth was dissolved into a deuterated solvent such as $CDCl_3$ in which the sample was soluble, and measurement was carried out under the conditions of room temperature, 500 MHz and 24 times of accumulation. In the explanation of the nuclear magnetic resonance spectrum obtained, s, d, t, q and m stand for a singlet, a doublet, a triplet, a quartet and a multiplet, respectively. Tetramethylsilane (TMS) was used for a reference material for a zero point of chemical shifts (δ values).

GC Analysis: As a measuring apparatus, GC-14B Gas Chromatograph made by Shimadzu Corporation was used. A capillary column CBP1-M25-025 (length 25 m, bore 0.22 mm, film thickness 0.25 micrometer; dimethylpolysiloxane as a stationary liquid phase; non-polar) made by Shimadzu Corporation was used. Helium was used as a carrier gas, and a flow rate was adjusted at 1 milliliter per minute. Temperature in a sample injector was set at 300° C. and temperature of a detector (FID) part was set at 300° C.

A sample was dissolved into toluene to prepare a 1% solution, and then 1 microliter of the solution obtained was injected into the sample injector.

As a recorder, C-R6A Chromatopac made by Shimadzu Corporation or an equivalent thereof was used. The resultant gas chromatogram showed a retention time of a peak and a value of a peak area corresponding to each of component compounds.

As a solvent for diluting the sample, chloroform or hexane, for example, may also be used. Moreover, as the column, capillary column DB-1 (length 30 m, bore 0.32 mm, film thickness 0.25 μm) made by Agilent Technologies Inc., HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, BP-1 (length 30 m, bore 0.32 mm, film thickness 0.25 μm) made by SGE International Pty. Ltd. and so forth may be used.

A ratio of the peak areas in the gas chromatogram corresponds to a ratio of the component compounds. In general, weight percent of each of the component compounds in an analytical sample is not completely identical with a percentage of each of the peak areas in the analytical sample. However, when the column described above was used in the invention, the weight percent of each of the component compounds in the analytical sample substantially corresponds to the percentage of each of the peak areas in the analytical sample because a correction coefficient is essentially 1 (one). The reason is that no significant difference exists among the correction coefficients of the component compounds. In order to more accurately determine a composition ratio of the liquid crystal compounds in the liquid crystal composition by the chromatogram, an internal standard method by the chromatogram is applied. Each component (test-component) of the liquid crystal compounds and a liquid crystal compound as a standard (standard reference material) as weighed accurately in a fixed amount are simultaneously measured by means of gas chromatography, and relative intensity is calculated in advance relative to a ratio of a peak area of the test-component to a peak area of the standard reference material. When correction is performed using the relative intensity of the peak area of each component to the peak area of the standard reference material, the composition ratio of the liquid crystal compounds in the liquid crystal composition can be more accurately determined from the gas chromatographic analysis.

Sample for Determining Values of Physical Properties of Liquid Crystal Compound or the Like A sample for determining values of physical properties of the liquid crystal compound is used in two types of cases: a case where a compound per se is used as the sample, and a case where the compound is mixed with mother liquid crystals to be used as the sample.

In the latter case where the sample prepared by mixing the compound with the mother liquid crystals is used, measurement is carried out according to the method described below. First, a sample is prepared by mixing 15% of the liquid crystal compound obtained and 85% of the mother liquid crystals. Then, according to an extrapolation method based on an equation as described below, extrapolated values are calculated from measured values of the sample obtained. The extrapolated values are described as the values of physical properties of the compound.

(Extrapolated value)={100×(measured value of a sample)−(% of mother liquid crystals)×(measured value of the mother liquid crystals)}/(% of the compound).

When a smectic phase or crystals precipitated at 25° C. even at the above ratio of the compound to the mother liquid crystals, a ratio of the compound to the mother liquid crystals was changed in the order of (10%:90%), (5%:95%) and (1%:99%). The physical properties of the sample were measured using a composition at a ratio in which the smectic phase or the crystals did not precipitate at 25° C. The extrapolated values were determined according to the above equation, and described as the values of physical properties of the compound.

As the mother liquid crystals used for measurement, various kinds exist. For example, a composition (%) of mother liquid crystals A is as described below.

Mother Liquid Crystals A:

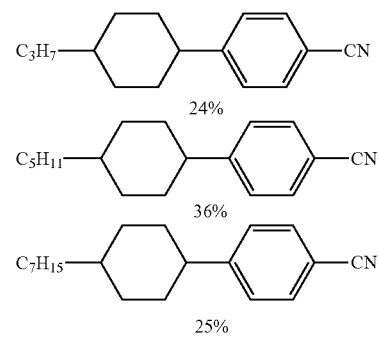

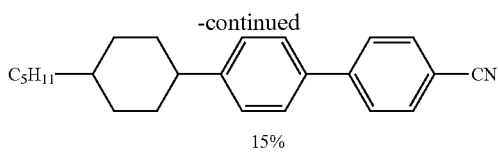

15%

Method for Determining Values of Physical Properties of Liquid Crystal Compound or the Like Values of physical properties were determined according to the methods described below. Most of the measuring methods are described in EIAJ ED-2521A of the Standard of Electronic Industries Association of Japan, or modified thereon. Moreover, no TFT was attached to a TN device used for measurement.

Among measured values, in the case where the liquid crystal compound per se was used as the sample, values obtained were described as experimental data. In the case where a mixture of the liquid crystal compound with the mother liquid crystals was used as the sample, values obtained according to the extrapolation method were described as experimental data.

Phase Structure and Phase Transition Temperature (° C.): Measurement was carried out according to method (1) and method (2) as described below.

(1) A compound was placed on a hot plate of a melting point apparatus (FP52 Hot Stage made by Mettler Toledo International Inc.) equipped with a polarizing microscope, and a state of phase and a change thereof were observed with the polarizing microscope while the compound was heated at a rate of 3° C. per minute, and a kind of the liquid crystal phase was specified.

(2) A sample was heated and then cooled at a rate of 3° C. per minute using a differential scanning calorimeter, DSC-7 System or Diamond DSC System, made by PerkinElmer, Inc. A starting point (on set) of an endothermic peak or an exothermic peak caused by a phase change of the sample was determined by extrapolation, and thus a phase transition temperature was determined.

Hereinafter, the crystals were expressed as K, and when the crystals were further distinguishable, each of the crystals was expressed as $K_1$ or $K_2$. The smectic phase was expressed as Sm and a nematic phase as N. A liquid (1sotropic) was expressed as I.

When smectic B phase or smectic A phase was distinguishable among the smectic phases, the phases were expressed as SmB or SmA, respectively. BP stands for a blue phase or an optically isotropic phase. Coexistence state of the two phases may be occasionally expressed in the form of (N*+I) or (N*+BP). Specifically, (N*+I) stands for a phase in which a non-liquid crystal isotropic phase and a chiral nematic phase coexist, and (N*+BP) stands for a phase in which the BP phase or the optically isotropic liquid crystal phase and the chiral nematic phase coexist. Un stands for an unidentified phase that is not optically anisotropic. As an expression of the phase transition temperature, for example, "K 50.0 N 100.0 I" shows that a phase transition temperature (KN) from the crystals to the nematic phase is 50.0° C., and a phase transition temperature (NI) from the nematic phase to the liquid is 100.0° C. A same rule applied to other expressions.

Maximum Temperature of a Nematic Phase ($T_{NI}$; ° C.): A sample (a mixture of a liquid crystal compound and mother liquid crystals) was placed on a hot plate of a melting point apparatus (FP52 Hot Stage made by Mettler Toledo International Inc.) equipped with a polarizing microscope, and was observed with the polarizing microscope while heating the sample at a rate of 1° C. per minute. Temperature when part of the sample changed from the nematic phase to the isotropic liquid was described as a maximum temperature of the nematic phase. Hereinafter, a higher limit of a temperature range of the nematic phase may be occasionally abbreviated simply as "maximum temperature."

Compatibility at a Low Temperature: Samples prepared by mixing a liquid crystal compound with mother liquid crystals to be 20%, 15%, 10%, 5%, 3% and 1% in an amount of the liquid crystal compound were put in glass vials. After the glass vials were kept in freezers at −10° C. or −20° C. for a predetermined period of time, whether or not the crystals or the smectic phase precipitated was observed.

Viscosity (η; measured at 20° C.; mPa·s): A mixture of liquid crystal compound and mother liquid crystals was measured with a cone-plate (E type) viscometer.

Refractive Index Anisotropy (n): Measurement was carried out by means of Abbe refractometer with a polarizing plate mounted on an ocular by using light at a wavelength of 589 nanometers at a temperature of 25° C. A surface of a main prism was rubbed in one direction, and then a sample (a mixture of a liquid crystal compound and mother liquid crystals) was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of refractive index anisotropy (Δn) was calculated from an equation: Δn=n∥−n⊥.

Dielectric Anisotropy (Δ∈; measured at 25° C.): A sample (a mixture of a liquid crystal compound and mother liquid crystals) was put in a liquid crystal cell in which a distance (gap) between two glass substrates was about 9 micrometers and a twist angle was 80 degrees. A voltage of 20 V was applied to the cell, and a dielectric constant (∈∥) in the major axis direction of liquid crystal molecules was measured. A voltage of 0.5 V was applied to the cell, and a dielectric constant (∈⊥) in the minor axis direction of the liquid crystal molecules was measured. Values of dielectric anisotropy were calculated from an equation: Δ∈=∈∥−∈⊥.

Pitch (P; measured at 25° C.; nm)

A pitch length was measured using selective reflection (Handbook of Liquid Crystals (Ekisho Binran in Japanese), page 196, issued in 2000, Maruzen Co., Ltd.). A relational expression: <n>p/λ=1 applies for selective reflection wavelength λ. Herein, <n> represents an average refractive index and is provided by the following expression: $<n>=\{(n_\parallel^2+n_\perp^2)/2\}^{1/2}$. The selective reflection wavelength was measured with a microspectrophotometer (trade name: MSV-350, JEOL Co., Ltd.). The pitch was determined by dividing the reflection wavelength obtained by the average refractive index. A pitch of cholesteric liquid crystals having a reflection wavelength in a region of wavelength longer than a wavelength of visible light is proportional to the reciprocal number of concentration of an optically active compound in a region in which a concentration of the optically active compound is low. Thus, the pitch length of liquid crystals having a selective reflection wavelength in a visible light region was measured in several points, and the pitch was determined according to a linear extrapolation method. "Optically active compound" corresponds to a chiral agent in the invention.

Synthesis Example 1

Synthesis of Compound Represented by Formula (S1-4)

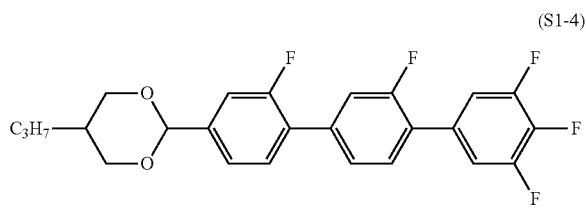

K 109.2 SB 115.4 SA 162.3 N 182.7 I (° C.)
A synthesis scheme is shown in the following diagram:

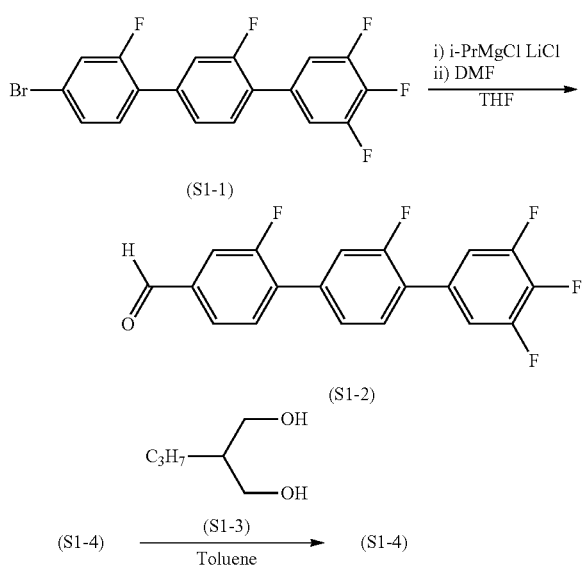

Synthesis of Compound (S1-2)

To a reaction vessel under a nitrogen atmosphere, 100 mL of tetrahydrofuran (THF) solution of 1.3 mol/L of isopropylmagnesium chloride lithium chloride salt was added, and 41.6 g of (S1-1) was gradually added thereto at room temperature. The resultant mixture was agitated for 90 minutes at temperature as was, a reaction mixture was cooled to 0° C., and a THF (30 mL) solution of 15.2 g of dimethylformamide was added dropwise, and the resultant mixture was agitated at room temperature for 12 hours. To a reaction mixture, 2 N-hydrochloric acid (200 mL) was added dropwise, 1 L of mixed solvent of toluene/diethyl ether (=1/1 in a volume ratio) was added thereto, a product was extracted, and an organic layer was washed with water. The resultant organic layer was dried over magnesium sulfate, and a solvent was distilled off under reduced pressure. A residue was purified by means of silica gel column chromatography by using toluene/ethyl acetate (=5/1 in a volume ratio) as an eluent, a solvent was distilled off under reduced pressure, and thus 19.9 g of (S1-2) was obtained. A yield of (S1-2) based on (S1-1) was 55%.

Synthesis of Compound (S1-4)

To a reaction vessel under a nitrogen atmosphere, 10.0 g of (S1-2), 4.14 g of 2-propyl-1,3-propanediol (S1-3), 0.30 g of p-toluenesulfonic acid monohydrate and 80 mL of toluene were added, and the resultant mixture was refluxed for 2 hours while removing water using a Dean-Stark apparatus. A reaction mixture was cooled to room temperature, the resultant product was extracted with toluene, and the resultant organic layer was washed with water, sodium hydrogencarbonate water and water. The resultant organic layer was dried over magnesium sulfate, and then a solvent was distilled off under reduced pressure. A residue was purified by means of silica gel column chromatography by using toluene as an eluent, further recrystallized from Solmix/ethyl acetate (=1/1 in a volume ratio), and thus 4.9 g of (S1-4) was obtained. A yield of (S-4) based on (S1-2) was 38%.

A phase transition temperature of compound (S1-4) obtained was as described below.

Phase transition temperature (° C.): K 109.2 SB 115.4 SA 162.3 N 182.7 I.

Physical Properties of Liquid Crystal Compound (S1-4)

Mother liquid crystals A having a nematic phase were prepared by mixing four compounds described above as mother liquid crystals A. Physical properties of the mother liquid crystals A were as described below.

Maximum temperature ($T_{NI}$)=71.7° C.; dielectric anisotropy ($\Delta \in$)=11.0; refractive index anisotropy ($\Delta n$)=0.137.

Liquid crystal composition Z including 85% of mother liquid crystals A and 15% of (S1-4) obtained in Example 1 was prepared. Values of physical properties of liquid crystal composition Z obtained were determined, and extrapolated values of physical properties of liquid crystal compound (S1-4) were calculated by extrapolating measured values. The values were as described below.

Maximum temperature ($T_{NI}$)=136.4° C.; dielectric anisotropy ($\Delta \in$)=32.6; refractive index anisotropy ($\Delta n$)=0.197.

The findings show that liquid crystal compound (S1-4) has a high clearing point, a large dielectric anisotropy ($\Delta \in$) and refractive index anisotropy ($\Delta n$).

In the invention, values of characteristics of the liquid crystal composition can be determined according to the methods described below. Most of the measuring methods are described in EIAJ ED-2521A of the Standard of Electronic Industries Association of Japan, or modified thereon. No TFT was attached to a TN device used for measurement.

Maximum Temperature of a Nematic Phase (NI; ° C.): A sample was placed on a hot plate of a melting point apparatus equipped with a polarizing microscope, and heated at a rate of 1° C. per minute. Temperature when part of the sample changed from the nematic phase to the isotropic liquid was measured. An upper limit of a temperature range of the nematic phase may be occasionally abbreviated as "maximum temperature."

Minimum Temperature of a Nematic Phase ($T_c$; ° C.): Samples each having a nematic phase were kept in freezers at 0° C., −10° C., −20° C., −30° C. and −40° C. for 10 days, and then liquid crystal phases were observed. For example, when a sample maintained the nematic phase at −20° C. and changed to crystals (or a smectic phase) at −30° C., $T_c$ was expressed as $T_c \leq -20°$ C. A lower limit of the temperature range of the nematic phase may be occasionally abbreviated as "minimum temperature."

Transition Temperature of an Optically Isotropic Liquid Crystal Phase: A sample was placed on a hot plate of a melting point apparatus equipped with a polarizing microscope, and in a state of a crossed nicol, first heated until the sample reached temperature at which the sample became a non-liquid crystal isotropic phase, and cooled at a rate of 1° C. per minute to completely exhibit a chiral nematic phase or an optically isotropic liquid crystal phase. Temperature at which a phase transition was caused in a cooling process was measured, and then temperature was increased at a rate of 1° C. per minute, and temperature at which a phase transition was caused in a heating process was measured. In the invention, unless otherwise noted, the temperature at which the phase transition was caused in the heating process was described as a phase transition temperature. When judgment of the phase transition temperature was difficult in a dark field under the crossed nicol in the optically isotropic liquid crystal phase, the phase transition temperature was measured by shifting a polarizing plate by 1 to 10° from the state of the crossed nicol.

Viscosity ($\eta$; measured at 20° C.; mPa·s): A cone-plate (E type) viscometer was used for measurement.

Rotational Viscosity ($\gamma 1$; measured at 25° C.; mPa·s):

(1) Sample having a positive dielectric anisotropy: Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. A voltage was stepwise applied to the device in the range of 16 V to 19.5 V at an increment of 0.5 V. After a period of 0.2 second with no voltage application, a voltage was applied repeatedly under the conditions of only one of rectangular waves (rectangular pulse; 0.2 second) and no voltage application (2 seconds). A peak current and a peak time of a transient current generated by the applied voltage were measured. A value of rotational viscosity was obtained from the measured values and a calculation equation (8) on page 40 of the paper presented by M. Imai et al. A value of dielectric anisotropy necessary for the calculation was determined according to a method as described below by using the device used for measuring the rotational viscosity.

(2) Sample having a negative dielectric anisotropy: Measurement was carried out according to the method described in M. Imai et al., Molecular Crystals and Liquid Crystals, Vol. 259, p. 37 (1995). A sample was put in a VA device in which a distance (cell gap) between two glass substrates was 20 micrometers. A voltage was stepwise applied to the device in the range of 30 V to 50 V at an increment of 1 V. After a period of 0.2 second with no voltage application, a voltage was applied repeatedly under the conditions of only one of rectangular waves (rectangular pulse; 0.2 second) and no voltage application (2 seconds). A peak current and a peak time of a transient current generated by the applied voltage were measured. A value of rotational viscosity was obtained from the measured values and a calculation equation (8) on page 40 of the paper presented by M. Imai et al. As for dielectric anisotropy necessary for the calculation, a value of dielectric anisotropy measured as described below was used.

Refractive Index Anisotropy ($\Delta n$; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index ($n\|$) was measured when the direction of polarized light was parallel to the direction of rubbing. A refractive index ($n\perp$) was measured when the direction of polarized light was perpendicular to the direction of rubbing. A value of refractive index anisotropy was calculated from an equation: $\Delta n = n\| - n\perp$. When the sample was a composition, the refractive index anisotropy was measured according to the method.

Dielectric Anisotropy ($\Delta\epsilon$; measured at 25° C.)

(1) Composition having a positive dielectric anisotropy: A sample was put in a liquid crystal cell in which a distance (gap) between two glass substrates was about 9 micrometers and a twist angle was 80 degrees. A voltage of 20 V was applied to the device, and a dielectric constant ($\epsilon\|$) in the major axis direction of liquid crystal molecules was measured. A voltage of 0.5 V was applied to the device, and a dielectric constant ($\epsilon\perp$) in the minor axis direction of the liquid crystal molecules was measured. A value of dielectric anisotropy was calculated from an equation: $\Delta\epsilon = \epsilon\| - \epsilon\perp$.

(2) Composition having a negative dielectric anisotropy: A sample was put in a liquid crystal cell subjected to treatment in homeotropic alignment, a voltage of 0.5 V was applied to the cell, and a dielectric constant ($\epsilon\|$) was measured. A sample was put in a liquid crystal cell subjected to treatment in homogeneous alignment, a voltage of 0.5 V was applied to the cell, and a dielectric constant ($\epsilon\perp$) was measured. A value of dielectric anisotropy was calculated from an equation: $\Delta\epsilon = \epsilon\| - \epsilon\perp$.

Threshold Voltage (Vth; measured at 25° C.; V):

(1) Composition having a positive dielectric anisotropy: A sample was put in a normally white mode liquid crystal display device in which a distance (gap) between two glass substrates (cell gap) was ($0.5/\Delta n$) micrometers and a twist angle was 80 degrees. Herein, $\Delta n$ is a value of refractive index anisotropy measured according to the method described above. Rectangular waves having a frequency of 32 Hz were applied to the device. A voltage of rectangular waves was increased, and a value of voltage at 90% transmittance of light passing through the device was measured.

(2) Composition having a negative dielectric anisotropy: A sample was put in a normally black mode liquid crystal display device subjected to treatment in homeotropic alignment in which a distance (gap) between two glass substrates (cell gap) was about 9 micrometers. Rectangular waves having a frequency of 32 Hz were applied to the device. A voltage of rectangular waves was increased, and a value of voltage at 10% transmittance of light passing through the device was measured.

Voltage Holding Ratio (VHR; measured at 25° C.; %): A TN device used for measurement had a polyimide alignment film, and a distance (cell gap) between two glass substrates was 6 micrometers. A sample was put in the device, and then the device was sealed with an ultraviolet-polymerizable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Helical Pitch (measured at 20° C.; μm): For measuring a helical pitch, a Cano's wedge cell method was applied. A sample was injected into a Cano's wedge cell, and a gap between disclination lines (a; unit: μm) as observed from the cell was measured. The helical pitch (P) was calculated according to an equation: $P = 2 \times a \times \tan\theta$, in which $\theta$ is an angle between two glass plates in the wedge cell.

Alternatively, a pitch length was measured using selective reflection (Handbook of Liquid Crystals (Ekisho Binran in Japanese), page 196, issued in 2000, Maruzen Co., Ltd.). A relational expression: $\langle n \rangle p/\lambda = 1$ applies for selective reflection wavelength λ. Herein, <n> represents an average refractive index and is provided by the following expression: $<n>=\{(n_\parallel 2\ n_\perp^2)/2\}^{1/2}$. The selective reflection wavelength was measured with a microspectrophotometer (trade name: MSV-350, JEOL Co., Ltd.). The pitch was determined by dividing the reflection wavelength obtained by the average refractive index.

A pitch of cholesteric liquid crystals having a reflection wavelength in a region of wavelength longer than a wavelength of visible light is proportional to the reciprocal number of concentration of chiral gent in a region in which a concentration of the chiral agent is low. Thus, the pitch length of liquid crystals having a selective reflection wavelength in a visible light region was measured in several points, and the pitch was determined according to a linear extrapolation method.

A ratio (percentage) of components or liquid crystal compounds is expressed in terms of weight percent (% by weight) based on the total weight of the liquid crystal compound. A composition is prepared by measuring weight of the components such as the liquid crystal compounds, and then mixing the components. Accordingly, calculation of weight percent of the components is easy.

Example 1

Liquid crystal composition A was prepared by mixing liquid crystal compounds shown in a diagram below at ratios as described below. Correspondence to general formulas was described on right sides of structural formulas.

Liquid Crystal Composition A

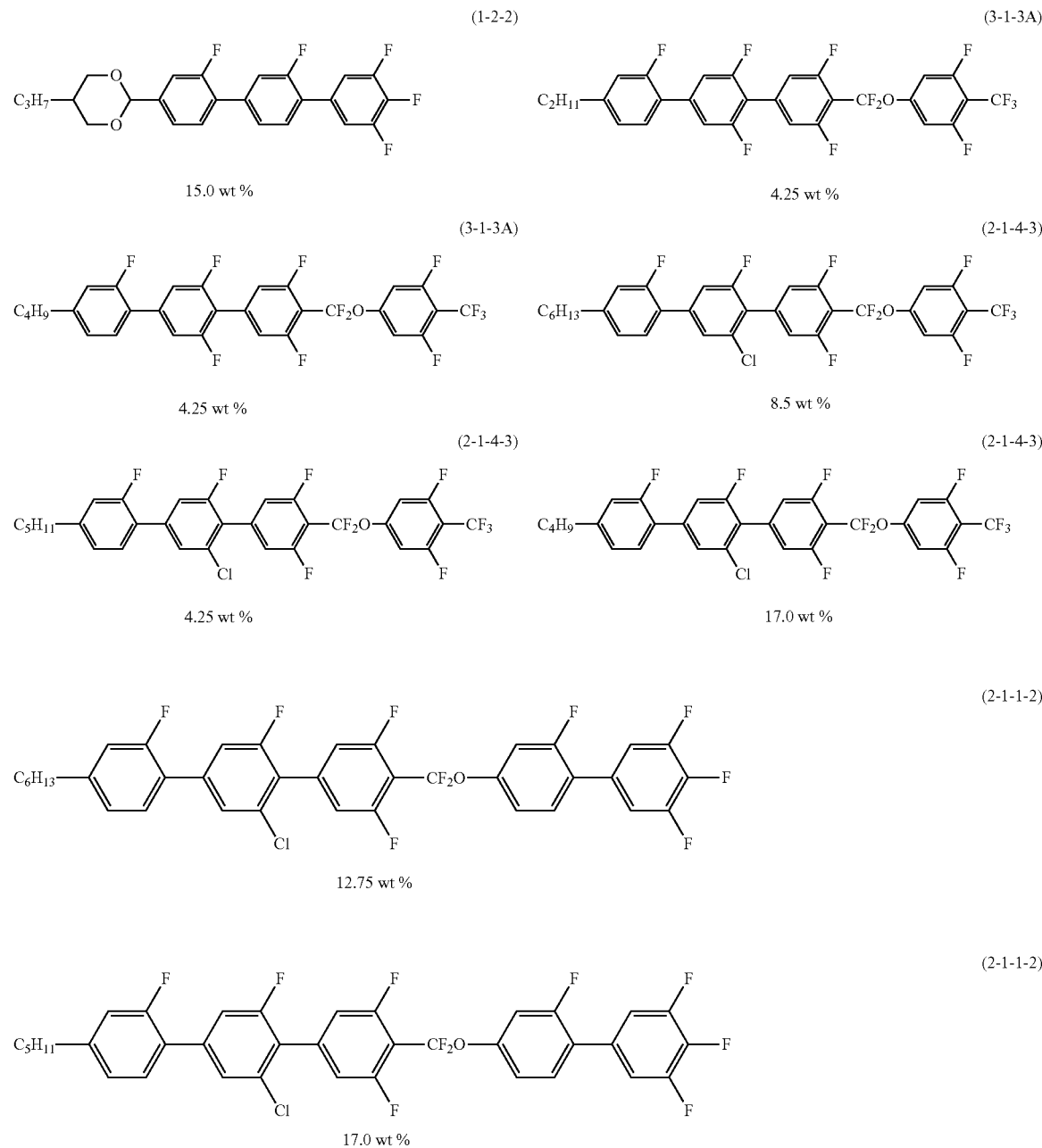

(18-1)

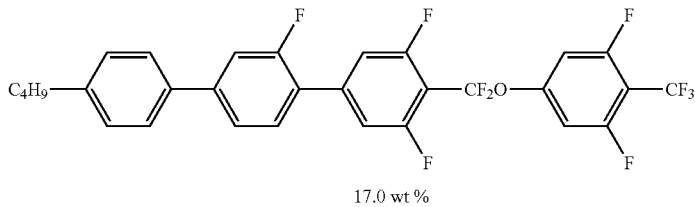

17.0 wt %

A phase transition temperature (° C.) of liquid crystal composition A was N 98.7 I.

Next, liquid crystal composition B including liquid crystal composition A (93.9 wt %), and chiral agents BN-H4 (3.05 wt %) and BN-H5 (3.05 wt %) as represented by formulas as described below was obtained. A phase transition temperature (° C.) of liquid crystal composition B was N* 87.4 BP 89.3 I.

In addition, BN-H4 and BN-H5 were obtained by performing esterification from (R)-(+)-1,1'-bi(2-naphthol) and each corresponding carboxylic acid by using dicyclohexylcarbodiimide (DCC).

BN-H4

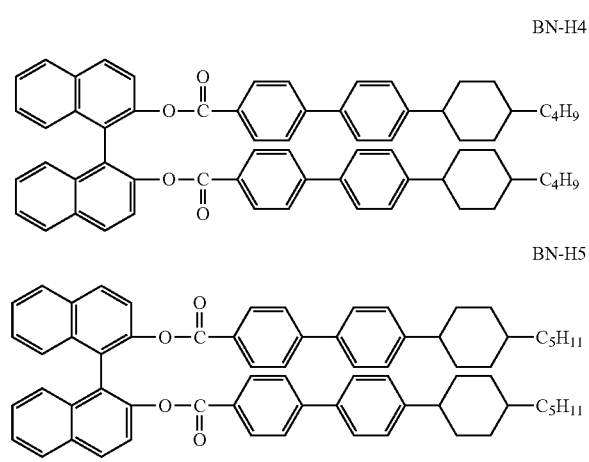

BN-H5

Example 2

Preparation of Mixture of Monomer and Liquid Crystal Composition

As a mixture of a monomer and a liquid crystal composition, liquid crystal composition B-1M was prepared in which 88.8% of liquid crystal composition B, 6.0% of n-dodecylacrylate, 4.8% of 1,4-di(4-(6-(acryloyloxy)hexyloxy)benzoyloxy)-2-methylbenzene (LCA-6), and 0.4% of 2,2'-dimethoxyphenylacetophenone as a photopolymerization initiator were mixed. A phase transition temperature (° C.) of the liquid crystal composition B-1M was N* 50.0 BP 55.4 BP+I 58.5 I, I 53.6 BP 44.8 N*. BP was exhibited also in a cooling process.

LCA-6

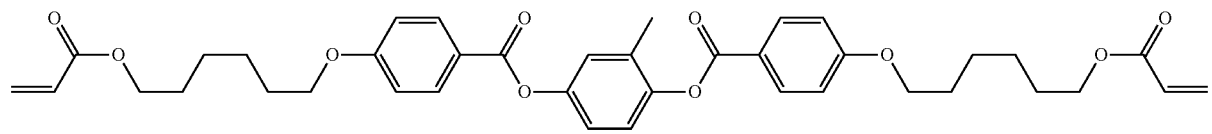

Preparation of Polymer/Liquid Crystal Composite Material

Liquid crystal composition B-1M was interposed between a comb-shaped electrode substrate not subjected to alignment treatment, and an opposite glass substrate (not provided with an electrode) (cell thickness: 10 μm), and a cell obtained was heated to a blue phase at 52.3° C. In the state, a polymerization reaction was performed by irradiating the resultant composition with ultraviolet light (intensity of ultraviolet light: 23 mWcm$^{-2}$ (365 nm)) for 1 minute.

The thus obtained polymer/liquid crystal composite material B-1P maintained an optically isotropic liquid crystal phase, even when cooled to room temperature.

In addition, as shown in FIG. 1, electrodes for the comb-shaped electrode substrate are arranged such that electrode 1 extended from an electrode part for connection on a left side and electrode 2 extended from an electrode part for connection on a right side are alternately arranged. When a potential difference exists between electrode 1 and electrode 2, a state in which electric fields of two directions, namely, an upward direction and a downward direction on a diagram, can be provided on the comb-shaped electrode substrate as shown in FIG. 1, if attention is paid to one electrode.

Example 3

Figure 2:
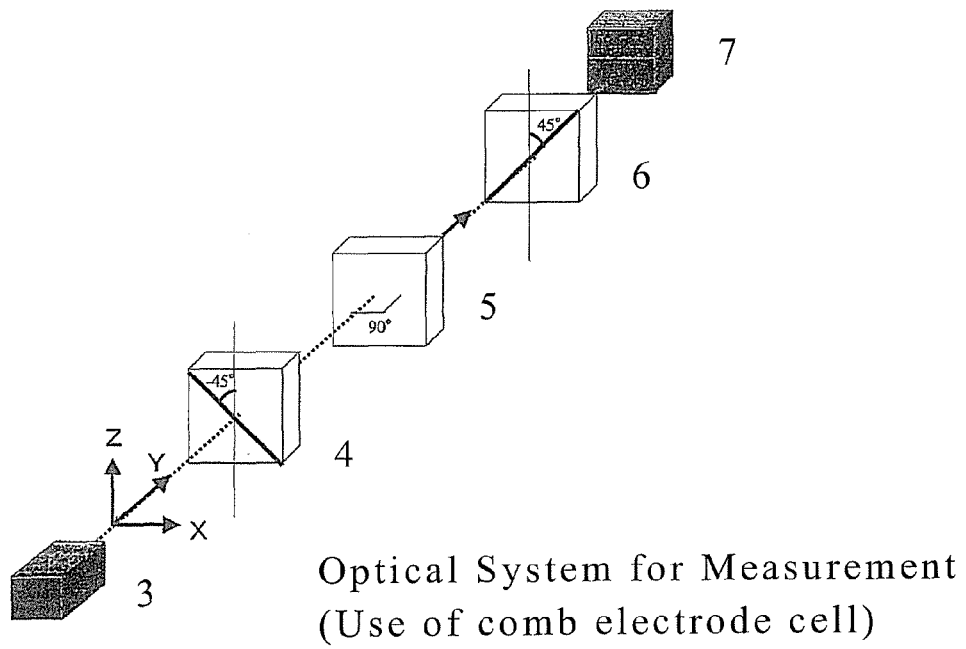
FIG. 2 shows an optical system used in Examples.

Comb-shaped electrode cell 5 having polymer/liquid crystal composite material D-1P interposed therebetween as obtained in Example 2 was set to an optical system including light source 3, polarizer 4, and analyzer 6 as shown in FIG. 2, and electro-optic characteristic were measured. As light source 3, a white light source of a polarizing microscope (ECLIPSE LV100POL, made by Nikon Corporation) was used, and the cell 5 was arranged in the optical system such that an angle of incidence was perpendicular to a cell plane, and a line direction of the comb-shaped electrode was 45 degrees relative to polarizer 4 (Polarizer) and analyzer 6 (Analyzer), respectively. A relationship between applied voltage and transmittance was investigated at room temperature. When rectangular waves having a voltage of 52 V were applied, transmittance became 87% and intensity of transmitted light was saturated. In addition, He—Ne laser can also be used as light source 3, for example.

Comparative Example 1

Liquid crystal composition C was prepared by mixing liquid crystal compounds shown in the diagram below at ratios as described below. Liquid crystal composition C was obtained by excluding the compound represented by formula (I-2-2) from liquid crystal composition A. Correspondence to general formulas was described on right sides of structural formulas.

Liquid Crystal Composition C

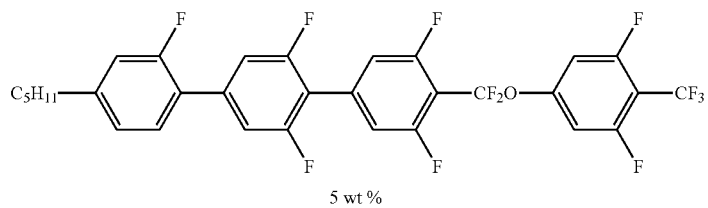

(3-1-3A)

5 wt %

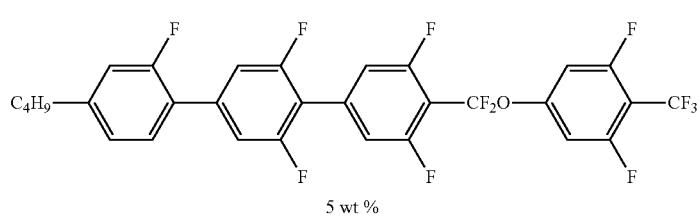

(3-1-3A)

5 wt %

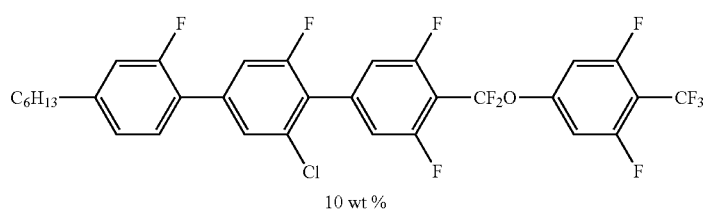

(2-1-4-3)

10 wt %

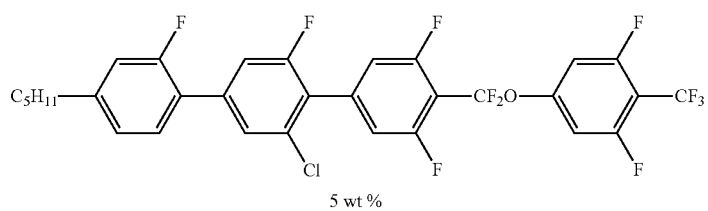

(2-1-4-3)

5 wt %

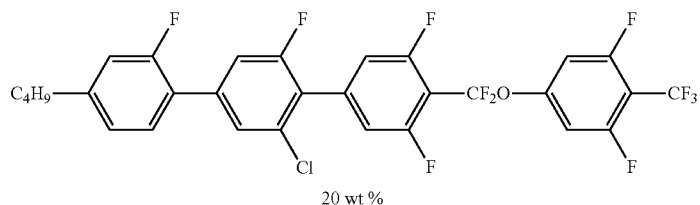

(2-1-4-3)

20 wt %

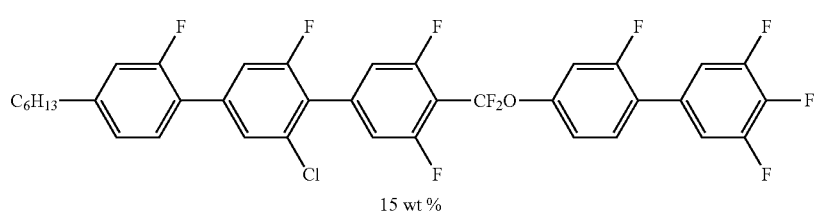

(2-1-1-2)

15 wt %

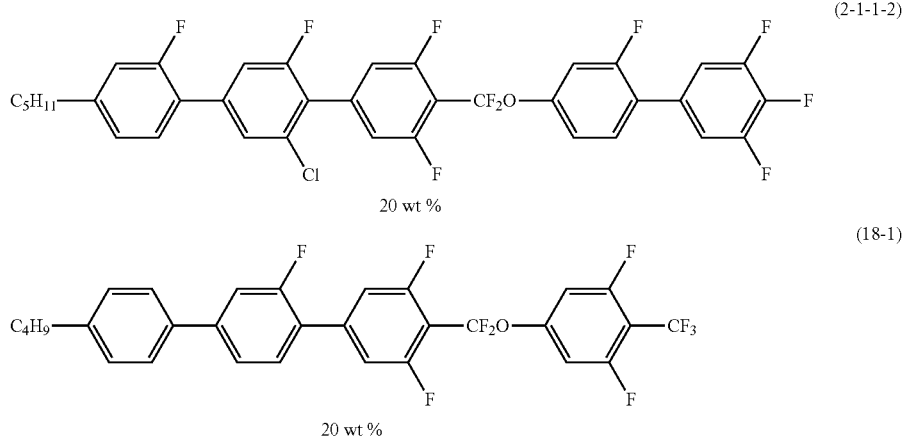

20 wt %

A phase transition temperature (° C.) of the liquid crystal composition C was N 90.5 I.

Next, liquid crystal composition D including liquid crystal composition C (93.9 wt %), and chiral agents BN-H4 (3.05 wt %) and BN-H5 (3.05 wt %) represented by formulas as described below was obtained. A phase transition temperature (° C.) of the liquid crystal composition B was N* 76.4 BP 79.9 I.

Comparative Example 2

Preparation of Mixture of Monomer and Liquid Crystal Composition

As a mixture of a liquid crystal composition and a monomer, liquid crystal composition D-1M was prepared in which 88.8% of liquid crystal composition D, 6.0% of n-dodecylacrylate, 4.8% of 1,4-di(4-(6-(acryloyloxy)hexyloxy)benzoyloxy)-2-methylbenzene (LCA-6), and 0.4% of 2,2'-dimethoxyphenylacetophenone as a photopolymerization initiator were mixed. A phase transition temperature (° C.) of the liquid crystal composition D-1M was N* 37 BP 45.9 I, I 44.0 N*. Thus, no BP exhibited in a cooling process.

Preparation of Polymer/Liquid Crystal Composite Material

Liquid crystal composition D-1M was interposed between a comb-shaped electrode substrate not subjected to alignment treatment, and an opposite glass substrate (not provided with an electrode) (cell thickness: 10 μm), and a cell obtained was heated to a blue phase at 37.5° C. In the state, a polymerization reaction was performed by irradiating the resultant composition with ultraviolet light (intensity of ultraviolet light: 23 mWcm$^{-2}$ (365 nm)) for 1 minute.

The thus obtained polymer/liquid crystal composite material D-1P maintained an optically isotropic liquid crystal phase, even when cooled to room temperature.

In addition, as shown in FIG. 1, electrodes for the comb-shaped electrode substrate are arranged such that electrode 1 extended from an electrode part for connection on a left side and electrode 2 extended from an electrode part for connection on a right side are alternately arranged. When a potential difference exists between electrode 1 and electrode 2, a state in which electric fields of two directions, namely, an upward direction and a downward direction on a diagram, can be provided on the comb-shaped electrode substrate as shown in FIG. 1, if attention is paid to one electrode.

Comparative Example 3

Comb-shaped electrode cell 5 having polymer/liquid crystal composite material D-1P interposed therebetween as obtained in Example 2 was arranged in an optical system including light source 3, polarizer 4, and analyzer 6 as shown in FIG. 2, and electro-optic characteristic were measured. As light source 3, a white light source of a polarizing microscope (ECLIPSE LV100POL, made by Nikon Corporation) was used, and the cell 5 was arranged in the optical system such that an angle of incidence to cell 5 was perpendicular to a cell plane, and a line direction of the comb-shaped electrode was 45 degrees relative to polarizer 4 (Polarizer) and analyzer 6 (Analyzer), respectively. A relationship between applied voltage and transmittance was investigated at room temperature. When rectangular waves having a voltage of 61 V were applied, transmittance became 83% and intensity of transmitted light was saturated. In addition, He—Ne laser can also be used as light source 3, for example.

As described above, the optical device of the invention is superior to a conventional art in capability of low voltage driving, and exhibition of BP in the cooling process. In addition, exhibition of BP in the cooling process facilitates adjustment of the polymer/liquid crystal composite material in a process for manufacturing the optical device to show usefulness of the optical device of the invention.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

Industrial Applicability

The invention can be applied to a liquid crystal material and a liquid crystal device using the liquid crystal material, for example.

What is claimed is:

1. A liquid crystal composition that exhibits an optically isotropic liquid crystal phase and contains achiral component T containing at least one compound selected from the group of compounds represented by formula (1) as a first component, and a chiral agent:

(1)

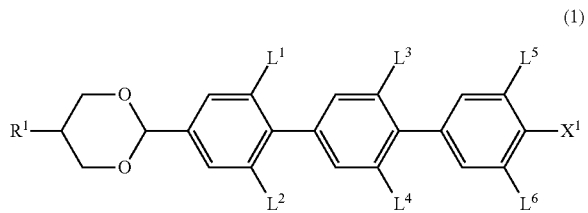

wherein R¹ is hydrogen or alkyl having 1 to 20 carbons, arbitrary —CH₂— in the alkyl may be replaced by —O—, —S—, —COO—, —OCO—, —CH=CH—, —CF=CF— or —C≡C—, and arbitrary hydrogen in the alkyl or in a group obtained by replacing arbitrary —CH₂— in the alkyl by —O—, —S—, —COO—, —OCO—, —CH=CH—, —CF=CF— or —C≡C— may be replaced by halogen; L¹, L², L³, L⁴, L⁵ and L⁶ are independently hydrogen or fluorine; X¹ is hydrogen, halogen, —SF₅ or alkyl having 1 to 10 carbons, arbitrary —CH₂— in the alkyl may be replaced by —O—, —S—, —CH=CH— or —C≡C—, and hydrogen in the alkyl or in a group obtained by replacing arbitrary —CH₂— in the alkyl by —O—, —S—, —COO—, —OCO—, —CH=CH—, —CF=CF— or —C≡C— may be replaced by fluorine, the liquid crystal composition shows a chiral nematic phase with a helical pitch of 700 nanometers or less in at least part of the temperature range from 70 to –20° C.

2. The liquid crystal composition according to claim 1, wherein the first component is at least one compound selected from the group of compounds represented by formula (1-1) to formula (1-3):

(1-1)

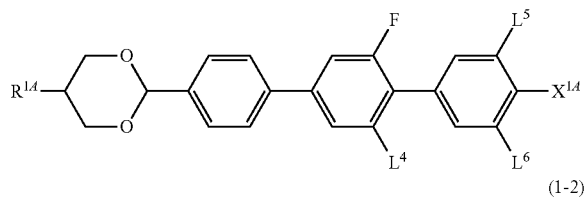

(1-2)

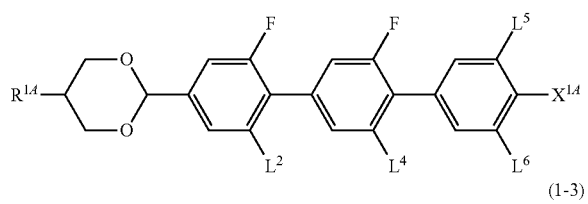

(1-3)

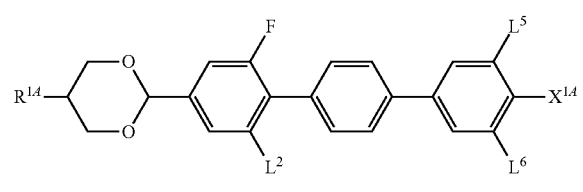

wherein R¹ᴬ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; L², L⁴, L⁵ and L⁶ are independently hydrogen or fluorine; and X¹ᴬ is fluorine, chlorine, —CF₃ or —OCF₃.

3. The liquid crystal composition according to claim 2, wherein the first component is at least one compound selected from the group of compounds represented by formula (1-2).

4. The liquid crystal composition according to claim 1, wherein the first component is at least one compound selected from the group of compounds represented by formulas (1-1-1), (1-1-2), (1-2-1) to (1-2-4), (1-3-1) and (1-3-2):

(1-1-1)

(1-1-2)

(1-2-1)

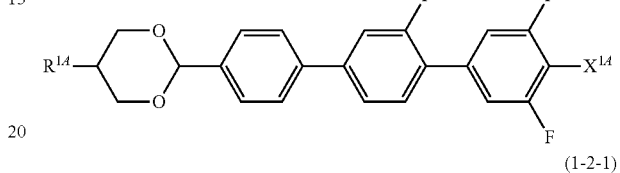

(1-2-2)

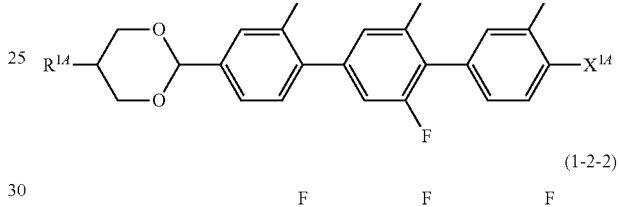

(1-2-3)

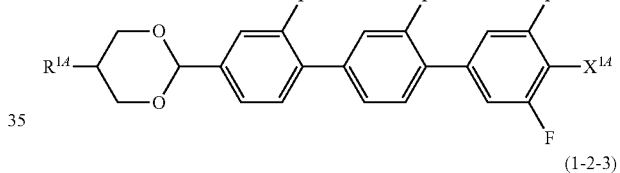

(1-2-4)

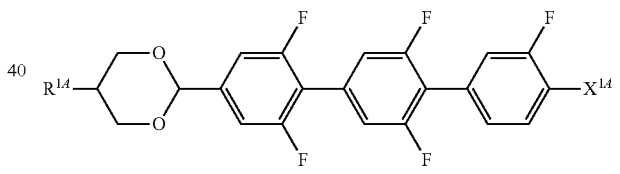

(1-3-1)

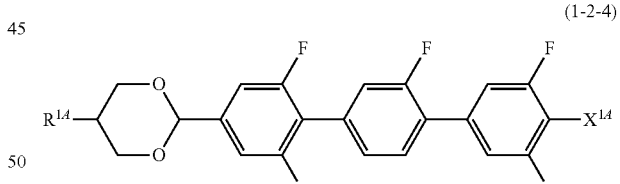

(1-3-2)

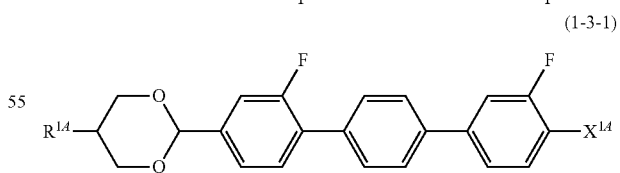

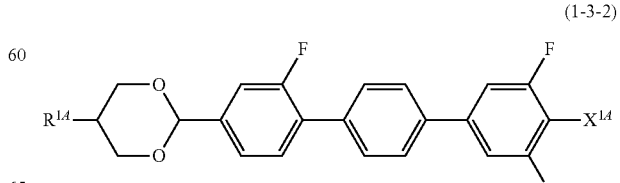

wherein R$^{14}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; and X$^{14}$ is fluorine, chlorine or —OCF$_3$.

5. The liquid crystal composition according to claim 1, wherein a ratio of the first component is in the range of 0.5% by weight to 50% by weight based on the total weight of achiral component T.

6. The liquid crystal composition according to claim 1, further containing at least one of a second component and a third component, wherein the second component is at least one compound selected from the group of compounds represented by formula (2) and the third component is at least one compound selected from the group of compounds represented by formula (3):

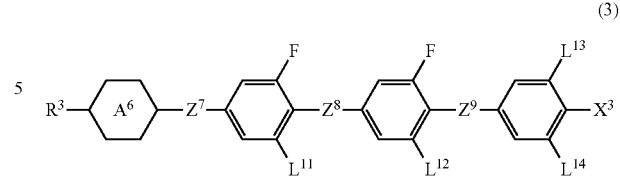

wherein, in formula (3), R$^3$ is hydrogen or alkyl having 1 to 20 carbons, arbitrary —CH$_2$— in the alkyl may be replaced by —O—, —S—, —COO—, —OCO—, —CH=CH—, —CF=CF— or —C≡C—, and arbitrary hydrogen in the alkyl or in a group obtained by replacing arbitrary —CH$_2$— in the alkyl by —O—, —S—, —COO—, —OCO—,

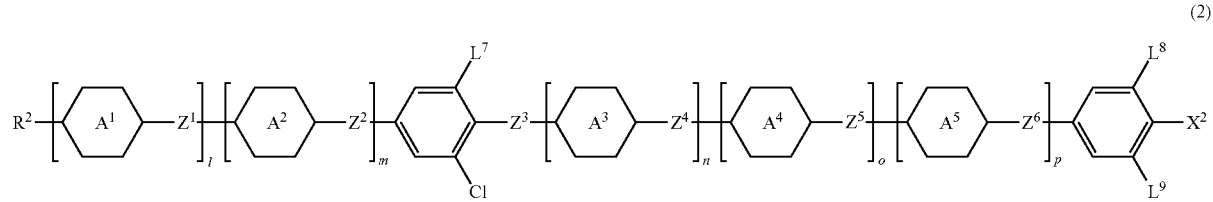

wherein R$^2$ is hydrogen or alkyl having 1 to 20 carbons, arbitrary —CH$_2$— in the alkyl may be replaced by —O—, —S—, —COO—, —OCO—, —CH=CH—, —CF=CF— or —C≡C—, and arbitrary hydrogen in the alkyl or in a group obtained by replacing arbitrary —CH$_2$— in the alkyl by —O —, —S—, —COO—, —OCO—, —CH=CH—, —CF=CF— or —C≡C— may be replaced by halogen; ring A$^1$, ring A$^2$, ring A$^3$, ring A$^4$ and ring A$^5$ are independently 1,4-cyclohexylene, 1,3-dioxane-2,5-diyl, 1,4-phenylene, 1,4-phenylene in which one or two of hydrogen is replaced by fluorine, 1,4-phenylene in which two of hydrogen is replaced by fluorine and chlorine, respectively, pyridine-2,5-diyl or pyrimidine-2,5-diyl; Z$^1$, Z$^2$, Z$^3$, Z$^4$, Z$^5$ and Z$^6$ are independently a single bond or alkylene having 1 to 4 carbons, and arbitrary —CH$_2$— in the alkylene may be replaced by —O—, —COO— or —CF$_2$O—; L$^7$, L$^8$ and L$^9$ are independently hydrogen or fluorine; X$^2$ is fluorine, chlorine, —CF$_3$ or —OCF$_3$; and l, m, n, o and p are independently 0 or 1, and satisfy an expression: 2≤l+m+n+o+p≤3, —CH=CH—, —CF=CF— or —C≡C— may be replaced by halogen; ring A$^6$ is 1,4-phenylene in which at least one of hydrogen is replaced by fluorine, or 1,3-dioxane-2,5-diyl; Z$^7$, Z$^8$ and Z$^9$ are independently a single bond, —COO— or —CF$_2$O—, but at least one Z$^7$, Z$^8$ and Z$^9$ is —CF$_2$O—; L$^{11}$, L$^{12}$, L$^{13}$ and L$^{14}$ are independently hydrogen or fluorine; X$^3$ is hydrogen, halogen, —SF$_5$, or alkyl having 1 to 10 carbons, arbitrary —CH$_2$— in the alkyl may be replaced by —O—, —S—, —CH=CH— or —C≡C—, and arbitrary hydrogen in the alkyl or in a group obtained by replacing arbitrary —CH$_2$— in the alkyl by —O—, —S—, —COO—, —OCO—, —CH=CH—, —CF=CF— or —C≡C— may be replaced by fluorine.

7. The liquid crystal composition according to claim 6, wherein the second component is at least one compound selected from the group of compounds represented by formulas (2-1-1-2), (2-1-2-1), (2-1-3-1), (2-1-3-2), (2-1-4-2) and (2-1-4-3):

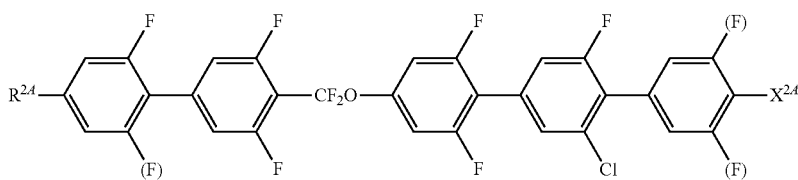

(2-1-3-1)

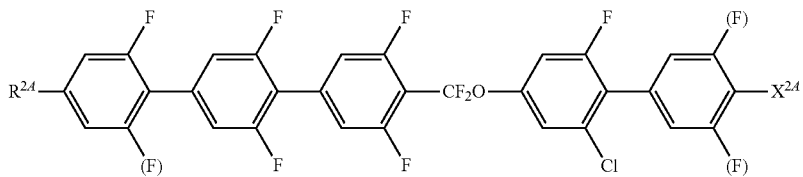

(2-1-3-2)

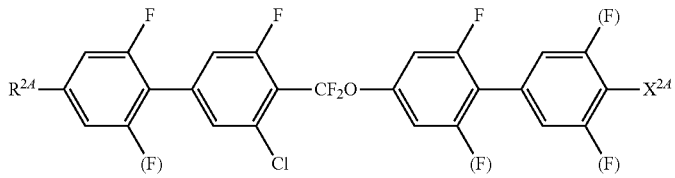

(2-1-4-2)

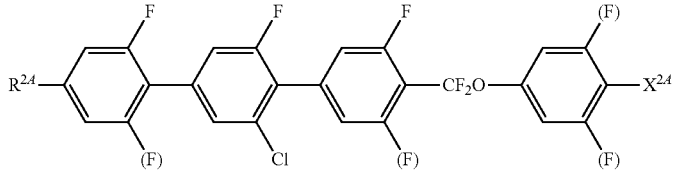

(2-1-4-3)

wherein $R^{2A}$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine;

(F) is independently hydrogen or fluorine; and $X^{2A}$ is fluorine, chlorine, —$CF_3$ or —$OCF_3$.

8. The liquid crystal composition according to claim 7, wherein the second component is at least one compound selected from the group of compounds represented by formula (2-1-1-2).

9. The liquid crystal composition according to claim 7, wherein the second component is at least one compound selected from the group of compounds represented by formula (2-1-4-3).

10. The liquid crystal composition according to claim 7, wherein the second component is a mixture of at least one compound selected from the group of compounds represented by formula (2-1-1-2) and at least one compound selected from the group of compounds represented by formula (2-1-4-3).

11. The liquid crystal composition according to claim 6, wherein a ratio of the second component is in the range of 5% by weight to 70% by weight based on the total weight of achiral component T.

12. The liquid crystal composition according to claim 6, wherein the third component is at least one compound selected from the group of compounds represented by formula (3-2) to formula (3-5):

(3-2)

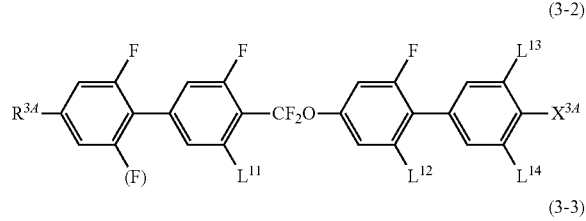

(3-3)

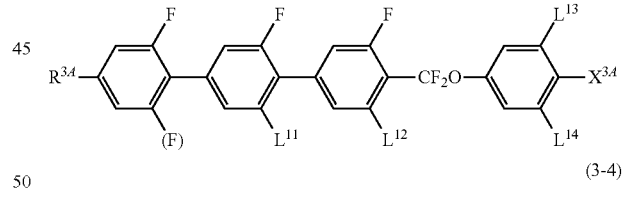

(3-4)

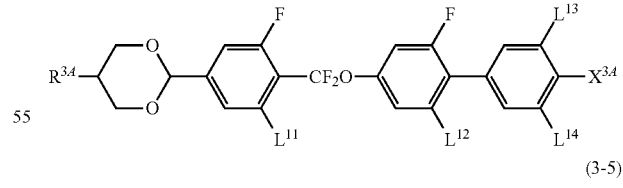

(3-5)

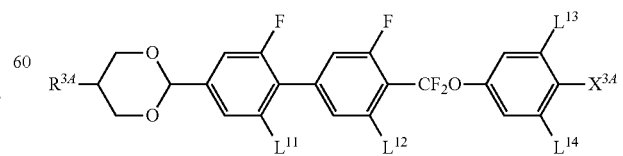

wherein $R^{3A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^{3.4}$ is fluorine, chlorine, —$CF_3$ or —$OCF_3$, and $L^{11}$ to $L^{14}$ are independently hydrogen or fluorine.

13. The liquid crystal composition according to claim 12, wherein the third component is at least one compound selected from the group of compounds represented by formula (3-2).

14. The liquid crystal composition according to claim 12, wherein the third component is at least one compound selected from the group of compounds represented by formula (3-3).

15. The liquid crystal composition according to claim 12, wherein the third component is at least one compound selected from the group of compounds represented by formula (3-4).

16. The liquid crystal composition according to claim 13, wherein the third component is at least one compound selected from the group of compounds represented by formula (3-5).

17. The liquid crystal composition according to claim 6, wherein a ratio of the third component is in the range of 5% by weight to 70% by weight based on the total weight of achiral component T.

18. The liquid crystal composition according to claim 6, wherein a ratio of the first component is in the range of 1% by weight to 30% by weight, a ratio of the second component is in the range of 10% by weight to 50% by weight, and a ratio of the third component is in the range of 10% by weight to 50% by weight, based on the total weight of achiral component T.

19. The liquid crystal composition according to claim 6, further containing at least one of a fourth component and a fifth component, wherein the fourth component is at least one compound selected from the group of compounds represented by formula (4) and the fifth component is at least one compound selected from the group of compounds represented by formula (5):

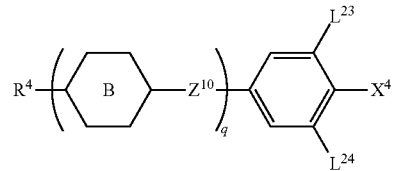

(4)

wherein $R^4$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring B is independently 1,4-cyclohexylene, 1,3-dioxane-2,5-diyl, 1,4-phenylene, 2-fluoro-1,4-phenylene, 3-fluoro-1,4-phenylene, 3,5-difluoro-1,4-phenylene, 3,5-dichloro-1,4-phenylene or pyrimidine-2,5-diyl; $Z^{10}$ is independently a single bond, ethylene, —COO—, —OCO—, —$CF_2O$— or —$OCF^2$; $L^{23}$ and $L^{24}$ are independently hydrogen or fluorine; $X^4$ is fluorine, chlorine, —$CF_3$ or —$OCF_3$; q is 1, 2, 3 or 4, however, when q is 3 or 4, one of $Z^{10}$ is —$CF_2O$— or —$OCF_2$—; and when q is 3, ring B is not 1,3-dioxane-2,5-diyl, and all of ring B is not fluorine-substituted 1,4-phenylene,

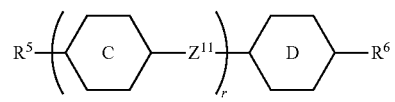

(5)

wherein $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring C and ring D are independently 1,4-cyclohexylene, 1,4-phenylene, 2-fluoro-1,4-phenylene, 3-fluoro-1,4-phenylene or 2,5-difluoro-1,4-phenylene; $Z^{11}$ is independently a single bond, ethylene, —COO— or —OCO—; and r is 1, 2 or 3.

20. The liquid crystal composition according to claim 19, wherein the fourth component is at least one compound selected from the group of compounds represented by formula (4-1) to formula (4-9):

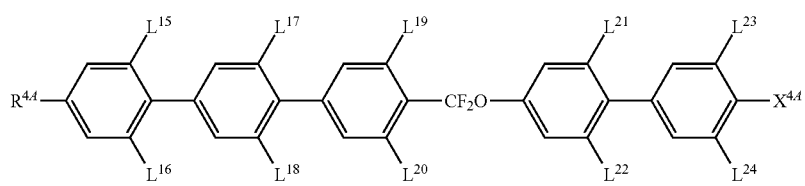

(4-1)

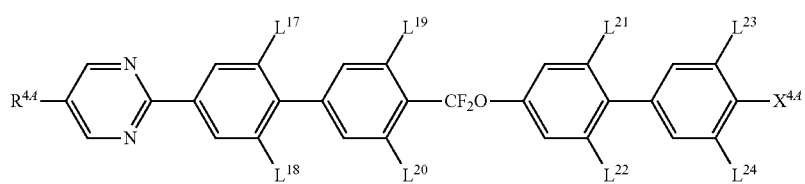

(4-2)

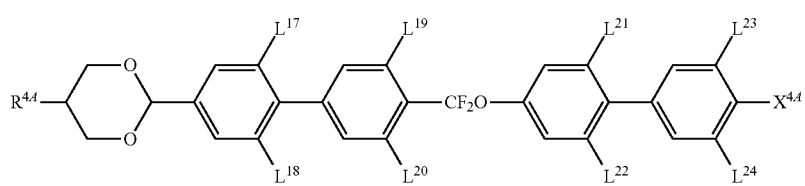

(4-3)

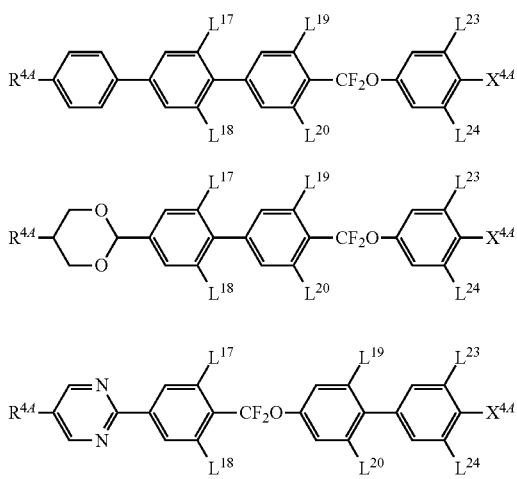
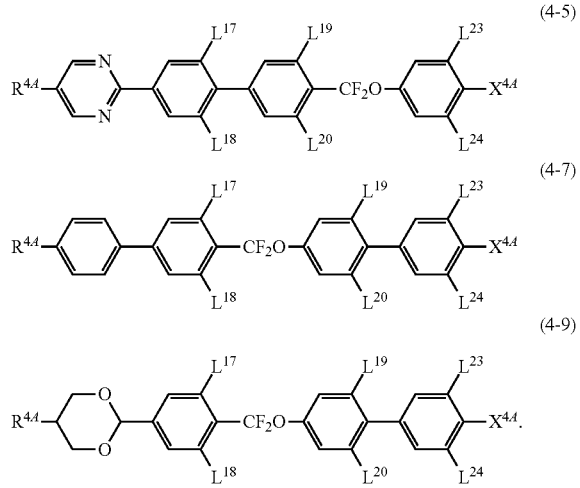

wherein $R^{4A}$ is independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine, $X^{4A}$ is fluorine, chlorine, —$CF_3$ or —$OCF_3$, and $L^{15}$ to $L^{24}$ are independently hydrogen or fluorine.

21. The liquid crystal composition according to claim 19, wherein the fifth component is at least one compound selected from the group of compounds represented by formula (5-1) to formula (5-13):

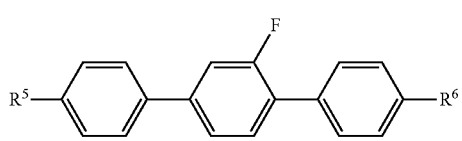
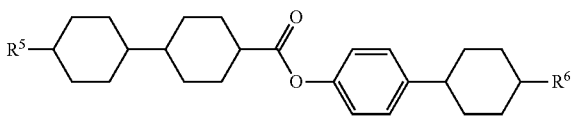

wherein $R^5$ and $R^6$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

22. The liquid crystal composition according to claim 21, wherein the fifth component is at least one compound selected from the group of compounds represented by formula (5-3).

23. The liquid crystal composition according to claim 21, wherein the fifth component is at least one compound selected from the group of compounds represented by formula (5-8).

24. The liquid crystal composition according to claim 21, wherein the fifth component is at least one compound selected from the group of compounds represented by formula (5-13).

25. The liquid crystal composition according to claim 19, wherein a ratio of the fifth component is in the range of 1% by weight to 20% by weight based on the total weight of the liquid crystal composition.

26. The liquid crystal composition according to claim 1, wherein the chiral agent contains at least one compound selected from the group of compounds represented by each of formula (K1) to formula (K5):

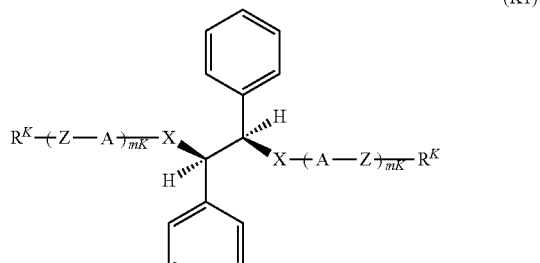
(K1)

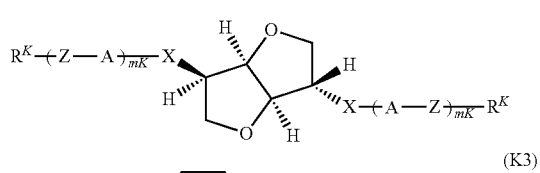
(K2)

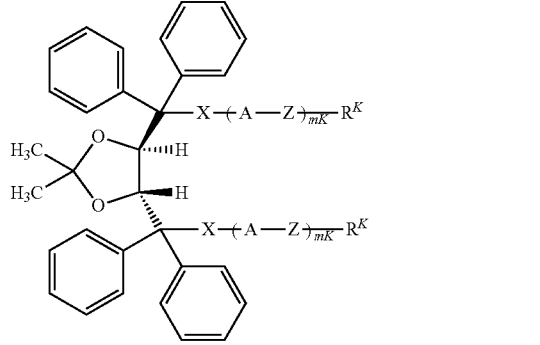
(K3)

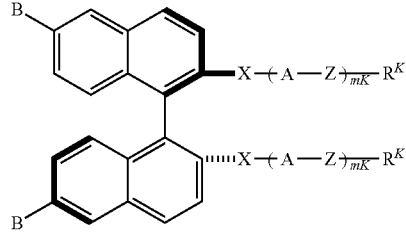
(K4)

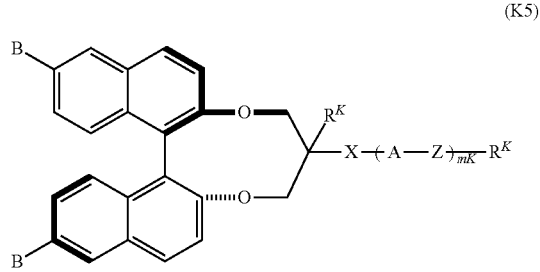
(K5)

wherein $R^K$ is independently hydrogen, halogen, —C≡N, —N═C═O, —N═C═S or alkyl having 1 to 20 carbons, arbitrary —CH$_2$— in the alkyl may be replaced by —O—, —S—, —COO— or —OCO—, arbitrary —CH$_2$—CH$_2$— in the alkyl may be replaced by —CH═CH—, —CF═CF— or —C≡C—, and arbitrary hydrogen in the alkyl may be replaced by halogen; A is independently an aromatic or non-aromatic three-membered to eight-membered ring, or a condensed ring having 9 or more carbons, arbitrary hydrogen in the rings may be replaced by halogen, alkyl or haloalkyl each having 1 to 3 carbons, —CH$_2$— of the ring may be replaced by —O—, —S— or —NH—, and —CH═ may be replaced by —N═; B is independently hydrogen, halogen, alkyl having 1 to 3 carbons, haloalkyl having 1 to 3 carbons, an aromatic or non-aromatic three-membered to eight-membered ring or a condensed ring having 9 or more carbons, arbitrary hydrogen of the rings may be replaced by halogen, alkyl or haloalkyl each having 1 to 3 carbons, —CH$_2$— may be replaced by —O—, —S— or —NH, and —CH═ may be replaced by —N═; Z is independently a single bond or alkylene having 1 to 8 carbons, arbitrary —CH$_2$— may be replaced by —O—, —S—, —COO—, —OCO—, —CSO—, —OCS—, —CH═N— or —N═CH—, arbitrary —CH$_2$—CH$_2$— in the alkyl may be replaced by —CH═CH—, —CF═CF— or —C≡C—, and arbitrary hydrogen may be replaced by halogen; X is a single bond, —COO—, —OCO—, —CH$_2$O—, —OCH$_2$—, —CF$_2$O—, —OCF$_2$— or —CH$_2$CH$_2$—; and mK is an integer from 1 to 4.

27. The liquid crystal composition according to claim 26, wherein the chiral agent contains at least one compound selected from the group of compounds represented by each of formulas (K4-1) to (K4-6) and (K5-1) to (K5-3):

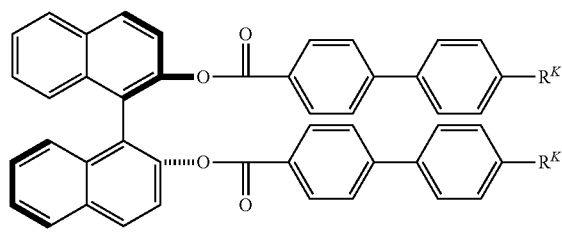
(K4-1)

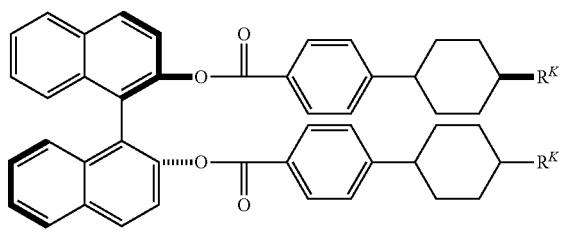
(K4-2)

-continued

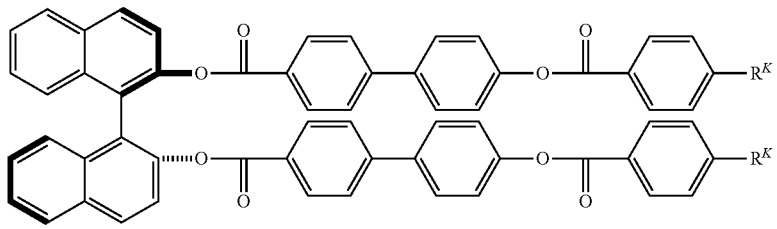
(K4-3)

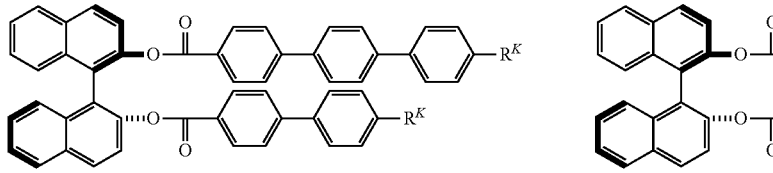
(K4-4)

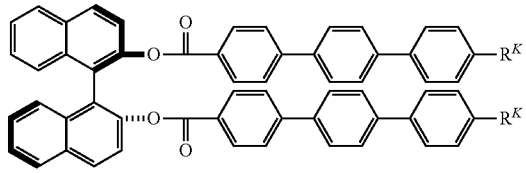
(K4-5)

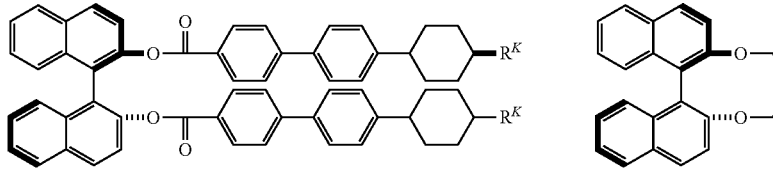
(K4-6)

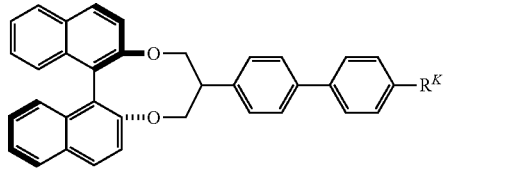
(K5-1)

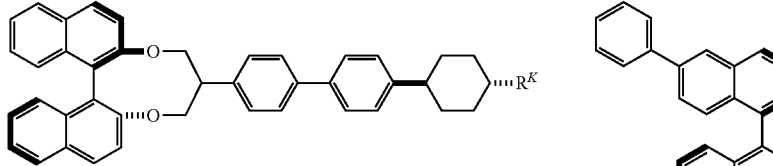
(K5-2)

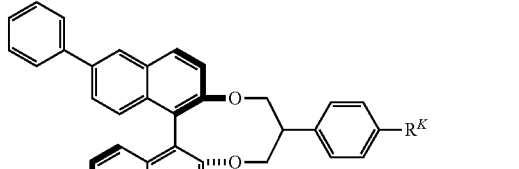
(K5-3)

wherein $R^K$ is independently alkyl having 3 to 10 carbons, alkylic —CH$_2$— adjacent to a ring may be replaced by —O—, and arbitrary —CH$_2$— in the alkyl or in a group obtained by replacing arbitrary alkylic —CH$_2$— adjacent to the ring by —O— may be replaced by —CH═CH—.

28. The liquid crystal composition according to claim 1, wherein a ratio of the chiral agent is in the range of 1% by weight to 40% by weight based on the total weight of the liquid crystal composition.

29. The liquid crystal composition according to claim 1, containing at least one antioxidant and/or ultraviolet light absorber.

30. A mixture, containing the liquid crystal composition according to claim 1 and a polymerizable monomer.

31. A polymer/liquid crystal composite material, obtained by polymerizing the mixture according to claim 30, and used for a device to be driven in an optically isotropic liquid crystal phase.

32. A polymer/liquid crystal composite material, obtained by polymerizing the mixture according to claim 30 in a non-liquid crystal isotropic phase or an optically isotropic liquid crystal phase.

33. An optical device having a substrate with an electrode arranged on one face or on both faces of the substrate, a liquid crystal medium arranged between the substrates, and an electric field applying means for applying an electric field to the liquid crystal medium through the electrode, wherein the liquid crystal medium is the liquid crystal composition according to claim 1 or a polymer/liquid crystal composite material obtained by polymerizing a mixture containing the liquid crystal composition according to claim 1 and a polymerizable monomer, and used for a device to be driven in an optically isotropic liquid crystal phase.

34. An optical device having a set of substrates, at least one of which is transparent, with an electrode arranged on one face or on both faces thereof, a liquid crystal medium arranged between the substrates, a polarizing plate arranged outside the substrate, and an electric field applying means for applying an electric field to the liquid crystal medium through the electrode, wherein the liquid crystal medium is the liquid crystal composition according to claim 1 or a polymer/liquid crystal composite material obtained by polymerizing a mixture containing the liquid crystal composition according to claim 1 and a polymerizable monomer, and used for a device to be driven in an optically isotropic liquid crystal phase.

35. The optical device according to claim 33, wherein the electrodes are constituted so as to allow application of an electric field at least in two directions at least on one substrate of a set of substrates.

36. The optical device according to claim 33, wherein the electrodes are constituted so as to allow application of an electric field at least in two directions on one substrate or both substrates of a set of substrates arranged in parallel to each other.

37. The optical device according to claim 33, wherein the electrodes are arranged in a matrix to constitute pixel electrodes, each pixel has an active device, and the active device is a thin film transistor (TFT).

* * * * *